(12) United States Patent
Kakutani

(10) Patent No.: US 7,796,303 B2
(45) Date of Patent: Sep. 14, 2010

(54) IMAGE PROCESSING SYSTEM, IMAGE PROCESSING DEVICE, DOT DATA PROCESSING DEVICE, AND METHOD AND PROGRAM PRODUCT THEREFOR

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 804 days.

(21) Appl. No.: 11/169,225

(22) Filed: Jun. 27, 2005

(65) Prior Publication Data

US 2006/0227379 A1    Oct. 12, 2006

(30) Foreign Application Priority Data

Jun. 28, 2004    (JP)    ............... 2004-189869

(51) Int. Cl.
G06K 15/00    (2006.01)
H04N 1/40    (2006.01)

(52) U.S. Cl. ............... 358/3.13; 358/3.09; 358/3.14; 358/3.21

(58) Field of Classification Search ............... 358/1.1, 358/1.9, 3.01, 3.06, 3.23, 3.13
See application file for complete search history.

(56) References Cited

U.S. PATENT DOCUMENTS

| | | | | | |
|---|---|---|---|---|---|
| 5,258,849 | A | * | 11/1993 | Tai et al. ............... | 358/3.12 |
| 5,287,209 | A | * | 2/1994 | Hiratsuka et al. ............... | 358/1.9 |
| 5,642,439 | A | * | 6/1997 | Sato et al. ............... | 382/254 |
| 6,208,432 | B1 | * | 3/2001 | Kohtani et al. ............... | 358/444 |
| 6,801,337 | B2 | * | 10/2004 | Bhaskar et al. ............... | 358/1.9 |
| 7,251,060 | B2 | | 7/2007 | Tonami et al. | |

(Continued)

FOREIGN PATENT DOCUMENTS

JP    2002-185785    6/2002

(Continued)

OTHER PUBLICATIONS

Abstract of Japanese Patent Publication No. 2002-185789, Pub. Date: Jun. 28, 2002, Patent Abstracts of Japan.

(Continued)

*Primary Examiner*—Mark K Zimmerman
*Assistant Examiner*—Ming Hon
(74) *Attorney, Agent, or Firm*—Martine Penilla & Gencarella, LLP

(57) ABSTRACT

Sets of multiple pixels are grouped into pixel groups, and on the basis of tone value distribution in each pixel group, it is decided whether to divide the pixel group. For pixel groups that are not divided, a representative tone value is determined for the pixel group, and for pixel groups that are divided, a representative tone value is determined for each region created by the division. Next, from multilevel halftoning result values derived by multilevel halftoning of the representative tone values, the dot on-off state is determined for each pixel in the pixel groups, and the image is output. At this time, for divided pixel groups, the dot on-off state is determined for each pixel in the regions, based on the multilevel halftoning result value for each region. With multilevel halftoning result values, data creation and transfer can be performed rapidly. Additionally, since the dot on-off state can be determined for each pixel in a pixel group even in instances where the pixel group has a tone value distribution, images of high picture quality can be output rapidly by unit of a simple process.

2 Claims, 40 Drawing Sheets

U.S. PATENT DOCUMENTS

| | | |
|---|---|---|
| 7,268,919 B2 | 9/2007 | Katsuyama |
| 2002/0039441 A1* | 4/2002 | Klassen .................... 382/166 |
| 2004/0085553 A1* | 5/2004 | Couwenhoven et al. ...... 358/1.9 |

FOREIGN PATENT DOCUMENTS

| JP | 2002-185789 | 6/2002 |
|---|---|---|
| JP | 2003-219168 | 7/2003 |

OTHER PUBLICATIONS

Abstract of Japanese Patent Publication No. 2002-185785, Pub. Date: Jun. 28, 2002, Patent Abstracts of Japan.

Abstract of Japanese Patent Publication No. 2003-219168, Pub. Date: Jul. 31, 2003, Patent Abstracts of Japan.

* cited by examiner

→ 128 PIXELS

↓ 64 PIXELS

| 1 | 177 | 58 | 170 | 70 | 186 | 79 | 161 | 94 | 171 | 16 | 164 | 24 | 158 | 227 | 6 | 133 | 157 |
|---|---|---|---|---|---|---|---|---|---|---|---|---|---|---|---|---|---|
| 255 | 109 | 212 | 42 | 242 | 5 | 223 | 48 | 209 | 67 | 248 | 81 | 234 | 132 | 56 | 120 | 253 | |
| 123 | 33 | 127 | 181 | 83 | 155 | 105 | 140 | 30 | 150 | 119 | 182 | 40 | 89 | 220 | 163 | 44 | |
| 219 | 91 | 237 | 22 | 121 | 198 | 61 | 188 | 111 | 215 | 3 | 98 | 201 | 140 | 10 | 95 | | |
| 11 | 195 | 53 | 136 | 227 | 37 | 247 | 12 | 233 | 52 | 192 | 135 | 32 | 246 | 113 | 194 | | |
| 99 | 144 | 107 | 184 | 68 | 172 | 97 | 151 | 77 | 173 | 84 | 237 | 123 | 61 | 167 | 46 | | |
| 225 | 40 | 251 | 6 | 217 | 116 | 28 | 196 | 125 | 35 | 207 | 17 | 153 | 203 | 24 | | | |
| 87 | 169 | 78 | 162 | 59 | 146 | 211 | 64 | 254 | 142 | 72 | 178 | 87 | 118 | 228 | | | |
| 190 | 15 | 202 | 111 | 238 | 19 | 93 | 169 | 8 | 110 | 221 | 49 | 249 | 2 | 144 | | | |
| 74 | 246 | 134 | 43 | 174 | 128 | 230 | 50 | 216 | 154 | 26 | 168 | 79 | 184 | | | | |
| 176 | 30 | 98 | 219 | 86 | 34 | 139 | 195 | 101 | 56 | 241 | 127 | 213 | 37 | | | | |
| 69 | 148 | 196 | 2 | 159 | 247 | 89 | 11 | 136 | 185 | 92 | 14 | 108 | | | | | |
| 187 | 41 | 126 | 226 | 106 | 57 | 190 | 115 | 235 | 36 | 208 | 121 | 229 | | | | | |
| 81 | 214 | 92 | 53 | 145 | 204 | 27 | 166 | 74 | 157 | 82 | 165 | 31 | | | | | |
| 232 | 21 | 170 | 240 | 13 | 132 | 252 | 51 | 222 | 4 | 245 | 48 | | | | | | |
| 130 | 155 | 55 | 115 | 183 | 78 | 122 | 196 | 102 | 180 | 65 | 173 | | | | | | |
| 72 | 252 | 100 | 211 | 45 | 231 | 20 | 148 | 39 | 133 | 205 | | | | | | | |
| 202 | 32 | 179 | 5 | 163 | 95 | 191 | 86 | 239 | 111 | 29 | | | | | | | |
| 104 | 143 | 58 | 243 | 70 | 218 | 63 | 161 | 9 | 209 | | | | | | | | |
| 64 | 236 | 129 | 110 | 151 | 25 | 199 | 49 | 172 | 68 | | | | | | | | |
| 171 | 17 | 208 | 38 | 225 | 131 | 99 | 254 | 113 | | | | | | | | | |
| 80 | 191 | 87 | 174 | 76 | 189 | 13 | 143 | | | | | | | | | | |
| 247 | 35 | 152 | 2 | 248 | 55 | | | | | | | | | | | | |
| 140 | 108 | 197 | 127 | 96 | | | | | | | | | | | | | |
| 13 | 215 | 46 | 229 | | | | | | | | | | | | | | |
| 164 | 90 | 180 | | | | | | | | | | | | | | | |
| 52 | 253 | | | | | | | | | | | | | | | | |
| 205 | | | | | | | | | | | | | | | | | |

Fig.8a

| 97 | 97 | 97 | 97 | 97 | 97 | 98 | 98 |
|----|----|----|----|----|----|----|----|
| 97 | 97 | 97 | 97 | 97 | 97 | 98 | 98 |
| 97 | 97 | 97 | 97 | 97 | 97 | 97 | 97 |
| 96 | 97 | 97 | 97 | 97 | 97 | 97 | 97 |

Fig.8b

| 1   | 177 | 58  | 170 | 70  | 186 | 79  | 161 |
|-----|-----|-----|-----|-----|-----|-----|-----|
| 255 | 109 | 212 | 42  | 242 | 5   | 223 | 48  |
| 123 | 33  | 127 | 181 | 83  | 155 | 105 | 140 |
| 219 | 91  | 237 | 22  | 121 | 198 | 61  | 188 |

|   |   |
|---|---|
| 3 | 4 |
| 3 | 2 |

Fig.9a
| 3 | 4 |
|---|---|
| 3 | 2 |
Fig.9b
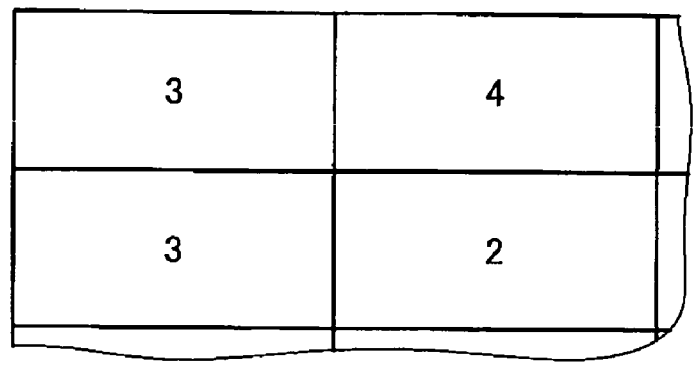
Fig.9c
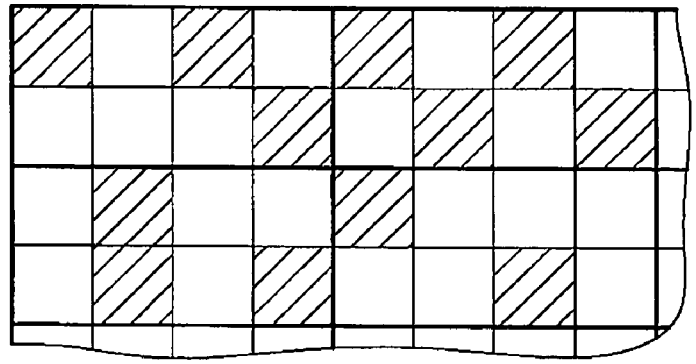
Fig.9d
| 1 | 6 | 3 | 5 | 3 | 6 | 4 | 5 |
|---|---|---|---|---|---|---|---|
| 8 | 4 | 7 | 2 | 8 | 1 | 7 | 2 |
| 4 | 2 | 5 | 6 | 2 | 6 | 3 | 5 |
| 7 | 3 | 8 | 1 | 4 | 8 | 1 | 7 |

Fig.14a
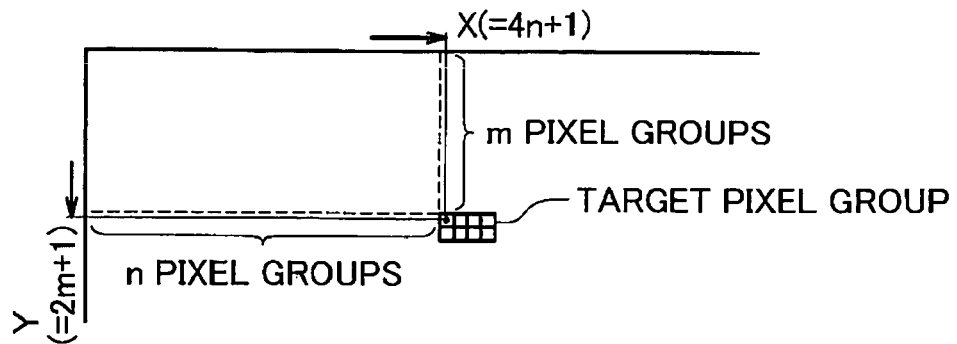
Fig.14b
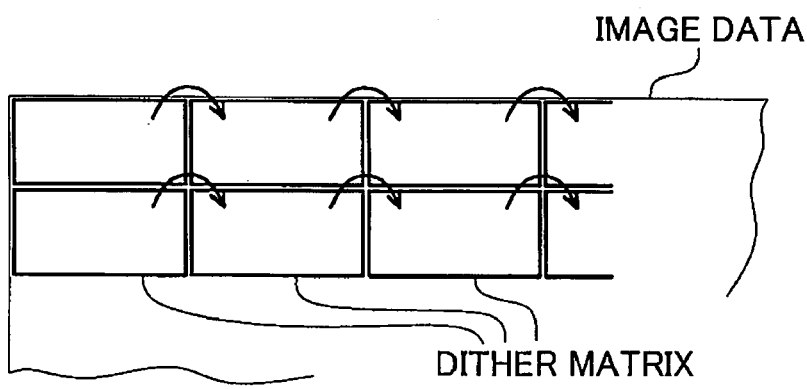
Fig.14c
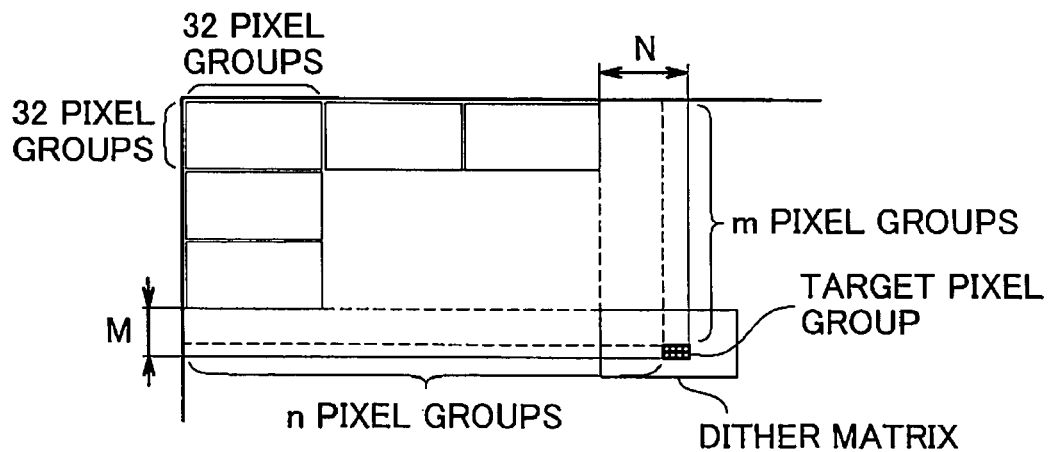
Fig.14d
$$\begin{cases} N = n - \text{int}(n/32) \times 32 + 1 \\ M = m - \text{int}(m/32) \times 32 + 1 \end{cases}$$

Fig.15

(a) X : | 1 | 2 | 3 | 4 | 5 | 6 | 7 | 8 | 9 | 10 |
⟩ 2-BIT SHIFT RIGHT (b) n : | 0 | 0 | 1 | 2 | 3 | 4 | 5 | 6 | 7 | 8 |
⟩ 5-BIT SHIFT RIGHT (c) int (n/32) : | 0 | 0 | 0 | 0 | 0 | 0 | 0 | 1 | 2 | 3 |
⟩ 5-BIT SHIFT LEFT (d) int (n/32) × 32 : | 0 | 0 | 1 | 2 | 3 | 0 | 0 | 0 | 0 | 0 |

(e) n − int (n/32) × 32 : | 0 | 0 | 0 | 0 | 0 | 4 | 5 | 6 | 7 | 8 |

(f) MASK DATA : | 0 | 0 | 0 | 0 | 0 | 1 | 1 | 1 | 1 | 1 |

(g) MASK DATA : | 0 | 0 | 0 | 1 | 1 | 1 | 1 | 1 | 0 | 0 |

Fig.16

| CLASSIFICATION NUMBER | REPRESENTATIVE TONE VALUE | | | | | | ..... | | | |
|---|---|---|---|---|---|---|---|---|---|---|
| | 0 | 1 | 2 | 3 | 4 | 5 | | 253 | 254 | 255 |
| 1 | 0 | 1 | 1 | 1 | 1 | 1 | | 7 | 7 | 8 |
| 2 | 0 | 0 | 0 | 0 | 0 | 1 | | 8 | 8 | 8 |
| 3 | 0 | 0 | 0 | 0 | 0 | | | 8 | 8 | 8 |
| 4 | 0 | 0 | 0 | 0 | | | | 8 | 8 | 8 |
| 5 | 0 | 0 | 0 | 0 | | | | 8 | 8 | 8 |
| 6 | 0 | 0 | 0 | | | | | 8 | 8 | 8 |
| 7 | 0 | 0 | | | | | | | | |
| 8 | 0 | | | | | | | | | |
| 9 | 0 | | | | | | | | | |
| 10 | | | | | | | | | | |

↓
TO #1024

Fig.22a
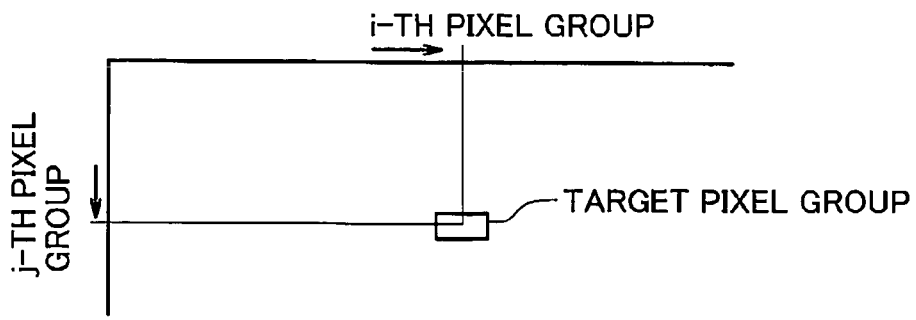
Fig.22b
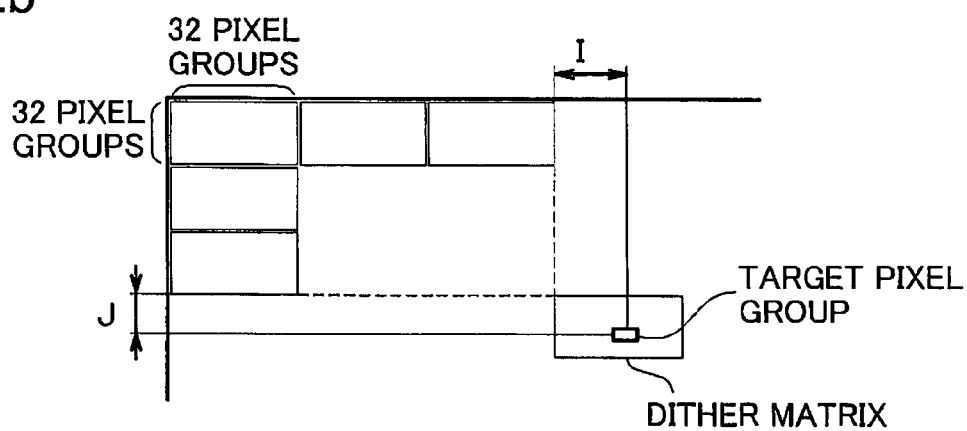
Fig.22c
$$\begin{cases} I = i - \text{int}(i/32) \times 32 \\ J = j - \text{int}(j/32) \times 32 \end{cases}$$
Fig.23
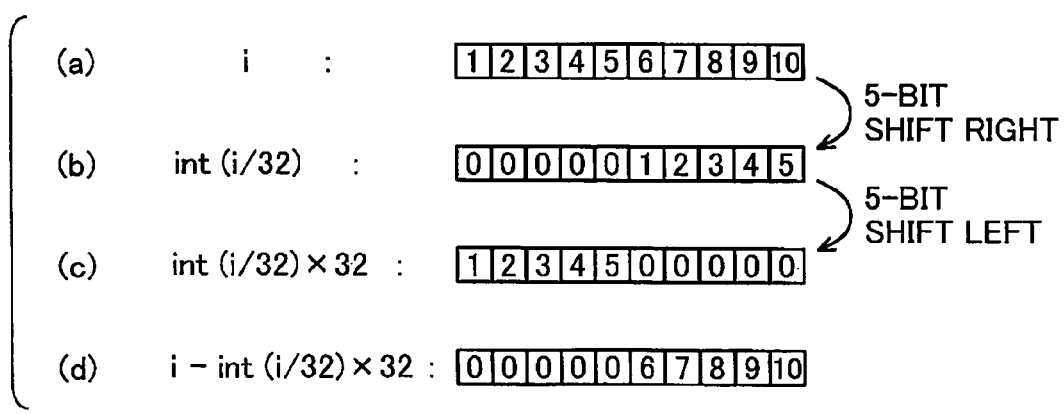

Fig.24
| CLASSIFICATION NUMBER | REPRESENTATIVE TONE VALUE | | | | | | |
|---|---|---|---|---|---|---|---|
| | | 0 | 1 | 2 | 3 | 4 | 5 | 6 |
| | 1 | DD(1,0) | DD(1,1) | DD(1,2) | DD(1,3) | DD(1,4) | DD(1,5) | DD(1,6) |
| | 2 | DD(2,0) | DD(2,1) | DD(2,2) | DD(2,3) | DD(2,4) | DD(2,5) | D |
| | 3 | DD(3,0) | DD(3,1) | DD(3,2) | DD(3,3) | DD(3,4) | DD(3,5) | |
| | 4 | DD(4,0) | DD(4,1) | DD(4,2) | DD(4,3) | DD(4,4) | DD(4,5) | |
| | 5 | DD(5,0) | DD(5,1) | DD(5,2) | DD(5,3) | DD(5,4) | | |
| | 6 | DD(6,0) | DD(6,1) | DD(6,2) | DD(6, | | | |
| | 7 | DD(7 | | | | | | |
↓
TO #1024
Fig.25a
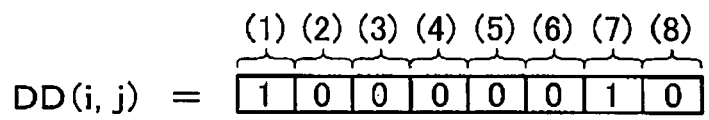
Fig.25b
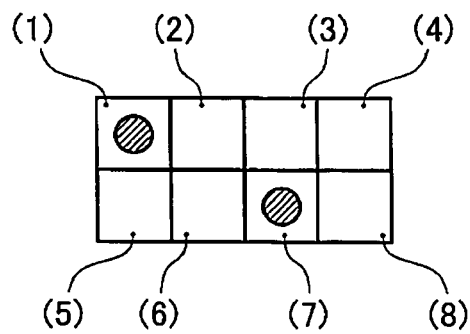

Fig.35

| (LARGE, MEDIUM, SMALL)=(1,2,1) | (0,4,0) | (0,3,1) |
|---|---|---|
| (0,3,0) | (0,2,1) | (1,1,0) |
| (0,2,3) | (1,2,1) | (0,3,0) |

Fig.36

| DOT COUNT | | | MULTILEVEL HALFTONING RESULT VALUE |
|---|---|---|---|
| LARGE | MEDIUM | SMALL | |
| 0 | 0 | 0 | 0 |
| 0 | 0 | 1 | 1 |
| 0 | 0 | 2 | 2 |
| 0 | 0 | 3 | 3 |
| 6 | 2 | 0 | 160 |
| 7 | 0 | 0 | 161 |
| 7 | 0 | 1 | 162 |
| 7 | 1 | 0 | 163 |
| 8 | 0 | 0 | 164 |

TO #1024

| 8-BIT DATA | DATA CONTENT | 8-BIT DATA | DATA CONTENT |
|---|---|---|---|
| 0 | MULTILEVEL HALFTONING RESULT VALUE | 128 | MULTILEVEL HALFTONING RESULT VALUE |
| 1 | | ⋮ | |
| 2 | | | |
| 3 | | 164 | |
| 4 | | 165 | FREE |
| ⋮ | | ⋮ | |
| 126 | | 254 | |
| 127 | | 255 | ESC CODE |

Fig.40a

PIXEL GROUP A | PIXEL GROUP B | PIXEL GROUP C

| 97 | 97 | 97 | 97 | 97 | 97 | 135 | 135 | 135 | 135 | 135 | 135 |
|----|----|----|----|----|----|-----|-----|-----|-----|-----|-----|
| 97 | 97 | 97 | 97 | 97 | 97 | 135 | 135 | 135 | 135 | 135 | 135 |

Fig.40b

| PIXEL GROUP A | PIXEL GROUP B | | PIXEL GROUP C |
|---|---|---|---|
| 97 | 97 | 135 | 135 |

Fig.40c

| PIXEL GROUP A | PIXEL GROUP B | | | PIXEL GROUP C |
|---|---|---|---|---|
| 85 | 255 | 92 | 141 | 132 |

Fig.45

| CLASSIFICATION NUMBER | REPRESENTATIVE TONE VALUE | | | | | | | 253 | 254 | 255 |
|---|---|---|---|---|---|---|---|---|---|---|
| | 0 | 1 | 2 | 3 | 4 | 5 | ••••• | | | |
| 1 | 0 | 0 | 0 | 0 | 1 | 1 | | 15 | 15 | 15 |
| 2 | 0 | 1 | 1 | 1 | 1 | 1 | | 17 | 17 | 17 |
| 3 | 0 | 0 | 0 | 0 | 0 | | | 20 | 20 | 21 |
| 4 | 0 | 0 | 1 | 1 | | | | | 19 | 19 |
| 5 | 0 | 0 | 0 | 0 | | | | | 22 | 22 |
| 6 | 0 | 0 | 0 | | | | | | 20 | 20 |
| 7 | 0 | 0 | | | | | | | | |
| 8 | 0 | | | | | | | | | |
| 9 | 0 | | | | | | | | | |
| 10 | | | | | | | | | | |

↓
TO #1024

| 5-BIT DATA | DATA CONTENT | 5-BIT DATA | DATA CONTENT |
|---|---|---|---|
| 0 | MULTILEVEL HALFTONING RESULT VALUE | 16 | MULTILEVEL HALFTONING RESULT VALUE |
| 1 | | 17 | |
| 2 | | ⋮ | |
| ⋮ | | ⋮ | |
| 14 | | 29 | |
| 15 | | 30 | FREE |
| | | 31 | ESC CODE |

Fig.52

| REPRESENTATIVE TONE VALUE | 0 | 1 | 2 | 3 |
|---|---|---|---|---|
| 1 | 2 | 15 | 18 | 24 |
| 2 | 12 | 21 | 35 | — |
| 3 | 10 | 17 | 26 | 47 |
| 4 | 8 | 19 | 23 | 40 |
| 5 | 5 | 12 | 22 | 31 |
| 6 | 11 | 23 | 31 | — |
| 7 | 8 | 15 | — | — |
| 8 | 12 | — | — | — |
| 9 | 10 | — | — | — |
| 10 | — | — | — | — |

⋮

| | CLASSIFICATION NUMBER | | | | | | | |
|---|---|---|---|---|---|---|---|---|
| | 14 | 15 | 16 | 17 | 18 | 19 | 20 | 21 |
| | 243 | 255 | — | — | — | — | — | — |
| | 225 | 228 | 237 | 255 | — | — | — | — |
| | 224 | 231 | 240 | 255 | — | — | — | — |
| | 160 | 168 | 183 | 193 | 207 | 243 | — | — |
| | 211 | 220 | 229 | 240 | 244 | 255 | 255 | — |
| | 229 | 242 | 255 | — | 255 | — | — | — |
| | 220 | 232 | 193 | 241 | 225 | 234 | 240 | 248 |
| | 182 | 220 | 211 | 211 | 237 | 244 | 255 | — |
| | 201 | 207 | 224 | 225 | 243 | 255 | — | — |
| | 207 | — | — | 237 | — | — | — | — |

⋮

| | 30 | 31 |
|---|---|---|
| | — | — |
| | — | — |
| | — | — |
| | — | — |
| | — | — |
| | — | — |
| | — | — |
| | — | — |
| | — | — |
| | — | — |

IMAGE PROCESSING SYSTEM, IMAGE PROCESSING DEVICE, DOT DATA PROCESSING DEVICE, AND METHOD AND PROGRAM PRODUCT THEREFOR

CLAIM OF PRIORITY

The present application claims priority from Japanese application P2004-189869 filed on Jun. 28, 2004, the content of which is hereby incorporated by reference into this application.

BACKGROUND

1. Field of the Invention

The present invention relates to technology for outputting images based on image data, and in particular relates to technology for outputting images by performing specific image processing on image data to generate appropriate dot density.

2. Description of the Related Art

Image output devices for outputting images by forming dots on various types of output media such as a printing medium or liquid crystal display are widely used as output devices for various types of imaging devices. With these image output devices, images are handled in a form divided into minute regions known as pixels, and the dots are formed on these pixels. Where dots are formed on pixels, on the individual pixel level, it is of course only possible for a pixel to assume either a state in which a dot is formed or one in which no dot is formed. However, on the level of an area of certain size, it is possible to produce a higher or lower density of formed dots, making it possible to output multi-tone images by unit of varying the density of the dots formed. For example, when forming dots from black ink on printing paper, areas in which dots are formed densely will appear darker, while conversely areas in which dots are sparse will appear lighter. Where luminescent spot dots are formed on a liquid crystal screen, areas in which dots are formed densely will appear lighter, while areas in which dots are sparse will appear darker. Consequently, appropriate control of density at which dots are formed enables output of multi-tone images. Data for controlling formation of dots so as to give appropriate formation density in this way is created by executing specific image processing on the images for output.

Recent years have seen demand for larger size and higher picture quality in output images from these image outputting devices. With regard to demand for higher picture quality, it is effective to divide images into finer pixels. Making the pixels smaller affords higher picture quality because the dots that make up the images become indiscernible. The demand for larger images is handled by increasing the number of pixels. While it is of course possible to make an output image larger by increasing the size of individual pixels, doing so would lead to a reduction in picture quality, so increasing the number of pixels is an effective response to the demand for larger images.

Naturally, when the number of pixels making up an image is increased, more time is required for image processing, making it difficult to output images quickly. Accordingly, there has been proposed a technology able to perform imaging processing quickly (Japanese Unexamined Patent Application Publication 2002-185789).

However, even where image processing can be performed quickly, time is required for transfer of the original image data, and for transfer of the processed image data, so there is a limit to the effectiveness of the aforementioned technology in speeding up the output of images.

In recent years there has also arisen a demand to be able to take image data shot with a digital camera or the like, and to supply the data directly to a printer or other image output device in order to output an image immediately. In such cases, it is not possible to perform image processing using an image processing device with high processing capability, such as a personal computer. Consequently, there is an increased need for image processing that while simple enough to be performed by a digital camera or other image capture device, an image output device, or jointly between the two, also affords excellent picture quality.

SUMMARY

In view of the drawbacks of the existing technology, it is an object of the present invention to provide a simple image processing technology whereby image processing and data transfer can be performed at high speed, while maintaining satisfactory output picture quality.

To address the aforementioned drawbacks at least in part, the image output system according to the invention employs the following structure. Specifically, it resides in an image processing system for performing certain image processing on image data and based on the results of said image processing, outputting dot data for forming dots on a recording medium, comprising:

encoding preparation unit that, on the basis of representative tone values which are tone values representing pixel groups composed of multiple pixels, prepares in advance multiple classes of encoding correspondence relationships for the purpose of acquiring code values associated with the results of multilevel halftoning for the pixels making up said pixel groups;

representative tone value determining unit that divides said pixel groups extracted sequentially from said image into multiple regions, and determines for each region a representative tone value representing the tone value of said region;

encoding unit that, using said determined representative tone value for each region, derives a code value for each said region by unit of referring to said encoding correspondence relationship assigned to said pixel group to which said region belongs, said correspondence relationship being any one of said multiple classes;

decoding preparation unit that prepares in advance multiple classes of decoding correspondence relationships for the purpose of acquiring, from code values assuming a certain range of values, an output dot arrangement representing the dot on-off state for each pixel within said pixel group;

decoding unit that, for each pixel group, receives said code value acquired for each region belonging to said pixel group, and that on the basis of said received code value, refers to said decoding correspondence relationship corresponding to said encoding correspondence relationship assigned to said pixel group to which said region belongs, and acquires said output dot arrangement; and output unit for outputting said acquired output dot arrangement as dot data.

The image processing method of the invention corresponding to the image processing system described above resides in a method for performing certain image processing on image data, and based on the results of said image processing, outputting dot data for forming dots on a recording medium, comprising the steps of:

on the basis of representative tone values which are tone values representing pixel groups composed of multiple pixels, preparing in advance multiple classes of encoding correspondence relationships for the purpose of acquiring code values associated with the result of multilevel halftoning, for the pixels making up said pixel groups;

from code values that assume values within a predetermined range, preparing multiple classes of decoding correspondence relationships for the purpose of acquiring output dot arrangements representing dot on-off state for each pixel in said pixel groups;

dividing said pixel groups extracted sequentially from said image into multiple regions, and determining for each region a representative tone value representing the tone value of said region;

using said determined representative tone value for each region, deriving a code value for each said region by unit of referring to said encoding correspondence relationship assigned to said pixel group to which said region belongs, wherein said correspondence relationship is any one from among said multiple classes;

for each pixel group, receiving said code value acquired for each region belonging to said pixel group, and on the basis of said received code value, referring to said decoding correspondence relationship corresponding to said encoding correspondence relationship assigned to said pixel group to which said region belongs, and acquiring said output dot arrangement; and outputting said acquired output dot arrangement as dot data.

In the image processing system and image processing method of the present invention, representative tone values for representing the tone value of each region are established for a plurality of regions into which the groups of pixels have been divided. Here pixel groups may always contain the same number of pixels, or instead contain pixels in different numbers according to a specific pattern or a specific decision rule, for example. Next, by referring to one of the multiple classes of encoding correspondence relationships, namely the encoding correspondence relationship assigned to the pixel group to which the region in question belongs, representative tone values determined for each region are converted into code values associated with results of multilevel halftoning. Since encoding correspondence relationships associate representative tone values with code values that correspond to the results of multilevel halftoning derived by multilevel halftoning of the representative tone values, by unit of referring to encoding correspondence relationships it is possible to quickly convert representative tone values to code values associated with results of multilevel halftoning thereof.

Encoding correspondence relationships can assume any of a variety of forms, provided that once a representative tone value and a pixel group have been determined, it is possible to determine a single corresponding code value. For example, they can take the form of correspondence table or a mathematical functions. Or, as described later, they can take the form of threshold values stored in memory, for comparison with representative tone values for the purpose of determining code values. Code values may be multilevel halftoning result values that directly express results of multilevel halftoning; or code values have a predetermined code system associated with results of multilevel halftoning. Since encoding correspondence relationships associate, on a pixel group-by-group basis, representative tone values with code values corresponding to results of multilevel halftoning, code values can be designed to be interpretable only in combination with the pixel group that gave the code value in question, or constituted from result values interpretable with the code value alone, without depending on the pixel group.

Determination of dot on-off state for each pixel within a pixel group is made from code values obtained for each pixel group in this manner. Determination of the dot on-off state is carried out as follows. First, a plurality of decoding correspondence relationships associating code values with dot on-off state for pixels within a pixel group are prepared. Next, from the code value derived for each region into which the pixel group has been divided, by unit of referring to decoding correspondence relationship that corresponds to the encoding correspondence relationship assigned during encoding of the pixel group, dot on-off state for each pixel is determined on a region-by-region basis. An output dot arrangement representing dot on-off states for pixels derived in this manner is output. A process of outputting an image by forming dots on the basis of this output dot output dot arrangement may be carried out concomitantly. For example, by forming dots on a medium such as a printing medium or a liquid crystal screen, images can be output on these media.

Although the details will be discussed later, code values typically enable representation with a smaller amount of data, as compared to data that represents dot on-off state for all pixels in an image. It is therefore possible to handle the data faster, and hence to output images faster. During multilevel halftoning of representative tone values, by carrying out multilevel halftoning while referring to encoding correspondence relationships, it is possible to carry out multilevel halftoning faster.

Additionally, in the encoding correspondence relationships referred to during multilevel halftoning of representative tone values, representative tone values and code values are associated with one another, and multiple classes of these relationships are prepared. Since encoding correspondence relationships are assigned individually to pixel groups to which regions belong, if the pixel groups are different, multilevel halftoning to the identical code values is possible, even if the representative tone values are different. Thus, it is possible to reduce the number of code values that can be assumed, as compared to the case of simply associating representative tone values and code values. By reducing the number of assumable values the amount of data needed to represent the code values can be reduced, and transfer of data can be made faster to a corresponding extent, hence making faster image output possible.

Dot on-off state for each pixel is determined on a region-by-region basis, based on the code value created for each region. Specifically, despite the fact that a series of processes is carried out for each region into which a pixel group has been divided, the encoding correspondence relationship referred to during the processes is one that has been established on a pixel group-by-pixel group basis. This unit that even where the regions which constitute the processing units differ in size, it is possible to use identical encoding correspondence relationships. Thus, according to the image processing system and image processing method discussed above, it is possible to provide a highly versatile system and method that are relatively unaffected by the size of the regions which constitute processing units.

Additionally, the image processing system and image processing method described above are not merely highly versatile, but also have the advantage that the amount of data of the encoding correspondence relationships can be reduced. Specifically, the size of a pixel group can be larger than the size of the regions which constitute the processing units. Although the details will be discussed later, larger pixel group size reduces the number of classes of pixel group. Here, since the encoding correspondence relationships associate representative tone values with code values, fewer classes of pixel group will mean a reduction in the amount of data of the encoding correspondence relationships. Thus, according to the image processing system and image processing method discussed above, it is possible to also derive the advantage of being able to store the encoding correspondence relationships in memory in a relatively small space.

Additionally, since code values and dot on-off state for pixels in a pixel group are associated with one another in the form of decoding correspondence relationships, dot on-off state of pixels can be quickly determined from code values. This makes fast image output possible. Additionally, since the process entails dividing a pixel group into several regions, even in the event that tone value magnitudes differ within a pixel group, it is nevertheless possible to appropriately determine dot on-off state on the basis of code values derived on a region-by-region basis, whereby it is possible to output data for outputting an image of higher picture quality.

The process of generating code values and the process of determining dot on-off state of each pixel can each entail fairly simple process content, namely, of referring to pre-established correspondence relationships. Thus, even in a device lacking a high level of processing power, such as a digital still camera or a printer by itself, it is nevertheless possible to carry out processing at sufficiently practical speed. Accordingly, it becomes possible to output images appropriately by unit of supplying image data directly to an image processing device rather than via a computer or the like, and to have image processing of the image data performed internally by the image processing device.

With this kind of image processing system and image processing method, the determination as to whether to divide a pixel group may made on the basis of tone value of pixels within the pixel group, and for undivided pixel groups, the region and the pixel group may be considered to be equal in size, and a code value calculated making reference to encoding correspondence relationship from representative tone value representing the pixel group in question. For pixel groups that have received a single code value only, the pixel group may be considered to be undivided into regions, determining dot on-off states for the pixels in the pixel group, and outputting an output dot arrangement.

By so doing, for an undivided pixel group it suffices to output just a single code value, whereby code values can be handled faster than in the case where a code value is output for each region in a pixel group. As a result, faster image output is possible.

The image processing system described above can be realized as a single device, or realized through an arrangement where it is distributed to several devices connected to one another by cables or wirelessly.

Additionally, an arrangement that not only outputs output dot arrangements, but that is also furnished with unit for forming dots on printing media so as to be able to carry out actual dot formation, is possible as well.

A further advantage is that even where the process of encoding representative tone values or the process of determining dot on-off state from code values is being performed on regions differing in size, identical encoding correspondence relationships and decoding correspondence relationships can be used nonetheless.

The invention may also be understood as an image processing device constituted by the encoding side included in the image processing system described above. This image processing device resides in an image processing device for creating control data for use by an image output device that forms dots to output an image, for the purpose of determining formation of said dots, and outputting this data to said image output device, comprising:

encoding preparation unit that, on the basis of representative tone values which are tone values representing pixel groups composed of multiple pixels, prepares in advance multiple classes of encoding correspondence relationships for the purpose of acquiring code values associated with the results of multilevel halftoning for the pixels making up said pixel groups;

representative tone value determining unit that divides said pixel groups extracted sequentially from said image into multiple regions, and determines for each region a representative tone value representing the tone value of said region;

encoding unit that, using said determined representative tone value for each region, derives a code value for each said region by unit of referring to said encoding correspondence relationship assigned to said pixel group to which said region belongs, wherein said correspondence relationship is any one from among said multiple classes; and control data output unit for outputting said acquired code values as said control data, to said image output device.

The invention herein may also be understood analogously as a method corresponding to this image processing device. According to this image processing device and method, on the basis of representative tone values which are tone values representing pixel groups composed of multiple pixels, there are prepared in advance multiple classes of encoding correspondence relationships for the purpose of acquiring code values associated with the results of multilevel halftoning for the pixels making up said pixel groups; pixel groups extracted sequentially from the image are divided into multiple regions; and representative tone values representing the tone values of the regions are determined on a region-by-region basis. Using these representative tone values determined for each region, by referring to the encoding correspondence relationship assigned to the pixel group to which said region belongs—this correspondence relationship being selected from among said multiple classes—a code value is acquired for each region. The acquired code values are output as the control data, to the image output device. Thus, according to this image processing device and method, for each region making up a pixel group, a representative tone value can be used to acquire a code value, and these can be output. Since code values are associated with the results of multilevel halftoning for each region, data can be output quickly to an image output device able to parse and utilize it.

An encoding correspondence relationship can be defined as a threshold value group which is a set of threshold values corresponding in number to the pixels contained in the pixel group; and the multiple classes of correspondence relationships discussed above can be prepared by constituting this threshold value group from a number of threshold values selected, while sequentially changing the acquisition location, from a dither matrix in which threshold values differing in value are arranged according to a specific characteristic. By so doing, the characteristics of the dither matrix can be reflected in the decision for the pixel group.

This dither matrix can be a global dither matrix containing threshold values in larger number than the number of tones of the image. Where a global dither matrix is employed, repeated patterns in dot formation subsequent to multilevel halftoning are less likely to occur. It is also easy to achieve masking of characteristics such as blue noise or green noise.

Classification numbers identifying correspondence relationships can be assigned to the plurality of encoding correspondence relationships, according to the location from which the threshold value is acquired from a dithering matrix of this type. In this case, the classification number of a correspondence relationship used to generate a code value for a pixel group can be determined depending on the location of the pixel group in the image, and thus a decoding correspondence relationship can be identified by the classification number as well. That is, using the location of the pixel group within the image, it possible to associate the correspondence relationship during encoding with the correspondence relationship during decoding. As a result, the amount of data transferred can be reduced, through the use of information regarding positions of pixel groups within the image.

In this sort of image processing device, classification numbers classifying pixel groups into at least 100 classes or more can be assigned, and encoding correspondence relationships prepared for each pixel group assigned a classification number.

Where encoding is carried out on per-pixel group basis, the derived code values may wind up repeating in a given pattern over a number of pixel groups. Of course, since a plurality of encoding correspondence relationships have been prepared, and during encoding of the regions of each pixel group, any one of the encoding correspondence relationships is used for each pixel group to which regions belong, it is unlikely that a given pattern will appear. However, where there are too few classes of encoding correspondence relationship, it may prove difficult to adequate prevent a pattern from occurring. In order to avoid the occurrence of a pattern, it is preferable to have as many classes of encoding correspondence relationship as possible prepared and available for assignment to pixel groups; experience has shown that where 100 or more classes are prepared, the appearance of patterns can be suppressed to the point that it is not a problem.

Alternatively, in this sort of image processing device, the value obtained by multiplying the number of types of encoding correspondence relationship by the number of pixels in pixel groups can be set to at least 1000.

The invention may also be understood as a dot data processing device constituted to include the arrangement for carrying out processing of decoding relationships in the image processing system as described above. Specifically, the dot data processing device of the invention resides in a dot data processing device that, for image data expressing an image represented by predetermined tone number, acquires code values associated with the results of multilevel halftoning of pixel groups composed of a plurality of pixels, and converts these to data for forming dots on a medium, wherein said code values are created by referring, on the basis of representative tone values representing tone of each of a plurality of regions into which said pixel groups are divided, to one correspondence relationship selected from among a plurality of encoding correspondence relationships prepared in advance for representative tone values which are tone values representing said pixel groups and the results of multilevel halftoning for the pixels making up said pixel groups;

said dot data processing device comprising:

decoding preparation unit that prepares in advance multiple classes of decoding correspondence relationships for the purpose of acquiring, from code values assuming a certain range of values, an output dot arrangement representing the dot on-off state for each pixel within said pixel group;

code value receiving unit that, on a per-pixel group basis, receives a said code value for each of the plurality of regions in which said pixel group has been divided;

decoding unit that, for each said region, refers to said decoding correspondence relationship corresponding to said encoding correspondence relationship assigned to said pixel group to which said region belongs, and acquires an output dot arrangement; and dot data output unit that from said acquired output dot arrangement for each said region, synthesizes dot data representing the dot on-off state for each pixel making up said pixel group, and outputs said dot data.

The dot data processing method invention corresponding to the dot data processing device set forth above resides in a dot data processing method that, for image data expressing an image represented by predetermined tone number, acquires code values associated with the results of multilevel halftoning of pixel groups composed of a plurality of pixels, and converts these to data for forming dots on a medium, wherein said code values are created by referring, on the basis of representative tone values representing tone of each of a plurality of regions into which said pixel groups are divided, to one correspondence relationship selected from among a plurality of encoding correspondence relationships prepared in advance for representative tone values which are tone values representing said pixel groups and the results of multilevel halftoning for the pixels making up said pixel groups;

comprising the steps of:

preparing in advance multiple classes of decoding correspondence relationships for the purpose of acquiring, from code values assuming a certain range of values, an output dot arrangement representing the dot on-off state for each pixel within said pixel group;

receiving on a per-pixel group basis a said code value for each of the plurality of regions in which said pixel group has been divided;

for each said region, referring to said decoding correspondence relationship corresponding to said encoding correspondence relationship assigned to said pixel group to which said region belongs, and acquiring an output dot arrangement; and from said acquired output dot arrangement for each said region, synthesizing dot data representing the dot on-off state for each pixel making up said pixel group, and outputting said dot data.

With the dot data processing device and processing method of the invention, when code values are obtained for each of a plurality of regions into which a pixel group has been divided, by unit of referring to decoding correspondence relationships, a dot on-off state is determined for each of the pixels in the pixel group. The decoding correspondence relationships associate code values with dot on-off state for each pixel in pixel groups. Accordingly, by referring to decoding correspondence relationships, dot on-off states can be quickly determined from code values. In decoding correspondence relationships, code values and dot on-off state for each pixel are specified in correspondence with the encoding correspondence relationship assigned to that pixel group, whereby code values can be received in a form interpretable only in combination with the pixel group, or received in a form interpretable without depending on the pixel group.

As compared to data which expresses the dot on-off state for each pixel, code values can be represented with a much smaller amount of data, thereby making it possible to handle data quickly, and hence to output images faster. Additionally, since code values are handled on the basis of each region into which a pixel group has been divided, and dot on-off states are determined on a region-by-region basis, dot on-off states can be determined appropriately even where tone values vary appreciably within a pixel group. It is accordingly possible to output images of high picture quality.

In this dot data processing device, code values are received on a per-pixel group basis, commensurate with the number of regions thereof; for a pixel group for which only a single code value has been received, the dot on-off state for the entire pixel group may be determined on the basis of that code value.

By so doing, image data can be received faster, as compared to the case where code values are received for each individual region into which a pixel group has been divided. Thus, it is possible to output images faster.

In this dot data processing device, code values for pixel groups may be received while identifying each pixel group by a classification number. Dot on-off state for pixels may be determined by referring to decoding correspondence relationships that associate code values with dot on-off state for each pixel in a pixel group, on a per-classification number basis.

By using classification numbers, each pixel group can be identified appropriately without unnecessarily increasing the number of pixel group classes. Additionally, where pixel groups are identified by classification numbers, if code values and dot on-off states are associated with one another on a per-classification number basis, it becomes possible to hold down the amount of data established in the decoding correspondence relationships. Classification numbers for identifying pixel groups may be given according to the locations of pixel groups within the image. By so doing, classification numbers can be given appropriately depending on location within the image, making it possible to generate dots appropriately and output an image of high picture quality.

In this dot data processing device, the dot on-off state for each pixel in a pixel group may be determined as follows. First, by referring to the decoding correspondence relationships to decode each code value, dot on-off states for all pixels in a pixel group are acquired in groups corresponding in number to the code values. A dot on-off state for each pixel in the pixel group can then be determined from the results of decoding multiple groups obtained in this way, by selecting dot on-off state in each region giving the respective code value.

By so doing, during decoding of code values into dot on-off state data, decoding can be accomplished without keeping track of the region that gave the code value, making the decoding process more simple. Since dot on-off states in each region are selected after decoding the code values, the dot on-off state of each pixel in a region can be determined easily. Thus, it becomes possible to determine dot on-off states for all pixels within a pixel group, by unit of a simple process.

During determination of the dot on-off state of each pixel in a pixel group, it would be possible to make determination in the following manner, instead of the method described previously. First, when decoding the code values, only the portion equivalent to the region giving the respective code value is decoded. Then, by combining the dot on-off states obtained thereby, the dot on-off state for each pixel in a pixel group can be determined. With this approach, since only the required portion is decoded, decoding results can be combined promptly, and as a result it becomes possible to rapidly determine the dot on-off state of each pixel in a pixel group.

In this dot data processing device, the dot on-off state of each pixel in pixel groups can be determined in the following manner. Specifically, with pixel groups are divided into a plurality of regions in a predetermined form, dot on-off states may be determined for each region.

By predetermining the form in which pixel groups will be divided, the dot on-off state of each pixel in a pixel group can be determined easily, on the basis of multiple code values.

It hardly need be mentioned that in preferred practice, the number of code values received for a single pixel group will equal the number of regions created when a pixel group is divided in a predetermined form. However, even where the number of code values received exceeds the number of regions created, if proper selection is made from among code values, picture quality remains improved over what it would be if pixel groups were not divided.

The predetermined form of dividing the pixel groups will preferably be one in which a pixel group is divided into a plurality of regions of equal size. Here, regions that are equal in size to one another unit that each region contains the same number of pixels. Where each region is equal in size, the process of determining the dot on-off state of each pixel from code values will be a substantially similar process for each region. Thus, the process of determining the dot on-off state for each pixel in a pixel group can be a simple one.

The predetermined form of dividing the pixel groups can be one in which pixel groups are divided into two equal regions, and the decoding process is carried out in accordingly.

Typically, in image data, tone value tends to be the same or similar among pixels in proximity to one another. Thus, dividing a single pixel group into three or more regions, as compared to dividing it into two regions, is exceedingly rare. Thus, where a form whereby a pixel group is divided in two is placed in memory, it will be applicable in most instances. Additionally, where these two regions are equal in size to one another, it will be applicable in even more instances.

Where pixel groups are rectangular in shape, pixel groups may be divided in two on the lengthwise sides. For example, a pixel group that is rectangular and elongated laterally may be divided into two left and right regions, and decoded accordingly. A pixel group that is rectangular and elongated vertically may be divided into two upper and lower regions. Since a greater distance between pixels unit it is more likely that pixel tone values will be farther apart, in preferred practice the predetermined form of division will be one in which pixel groups are divided on their lengthwise sides, since this is applicable to more situations.

The dot data processing device may also receive, together with the code values, a division pattern representing a form for dividing pixel groups. Then, when determining the dot on-off state of each pixel in a pixel group, once the pixel group is divided according to the form indicated by the division pattern, the dot on-off state of each pixel in the pixel group will be determined.

By so doing, once a plurality of code result values have been received, by then selecting an appropriate division pattern and dividing the pixel group, it is possible to appropriately determine the dot on-off state for each pixel. Thus, it becomes possible to output images of higher quality.

In the various types of devices discussed previously, data composed of values indicating the dot on-off state of each pixel, arranged in a specific sequence according to pixel location with the pixel group, is associated with code values, and in this form is established as a decoding correspondence relationship.

By establishing such data in the decoding correspondence relationships, dot on-off state for each pixel in a pixel group can be determined simply by referring to decoding correspondence relationships from code values. That is, since dot on-off state can be determined quickly by a simple operation, it becomes possible to output images quickly.

Additionally, in the various types of dot data processing devices discussed previously, where multiple types of dots with different representable tone values can be formed for any one dot, output images may be output in the following manner. First, code values and dot on-off states for the multiple types of dots are associated with one another and stored in memory in a decoding correspondence relationship. Then, when a code value is received, the dot on-off state for each pixel within the pixel group is determined by referring to this decoding correspondence relationship, and the image output.

By so doing, since dots can be formed on the basis of on-off states of various types of dots determined from code values, images of high picture quality can be output quickly. In this type of dot data processing device able to produce multiple types of dots, receiving code values is effective in terms of achieving fast image output, for the following reasons. First, where it is possible to produce multiple types of dots, the data representing the dot on-off state for each pixel on a per-dot type basis will necessarily entail a large amount of data, and transfer of this data will be time-consuming. Additionally, a larger number of dot types tends to result in more time being needed to determine the dot on-off states, making it difficult to output images rapidly. Where code values are received, on the other hand, it is possible to supply data rapidly, even with a large number of dot types. Also, since dot on-off states are determined with reference to the decoding correspondence relationship, it becomes possible to quickly determine the dot on-off state for each pixel, and hence to output images rapidly.

It is further possible for the present invention to be realized using a computer, by having a computer read a program for realizing any of the image processing methods or dot data processing methods discussed above. Accordingly, the invention also includes program products composed of program code, and recording media having such a program recorded thereon.

Where such a program product or program recorded on a recording medium is read by a computer, and the various functions discussed above are realized using the computer, it becomes possible to rapidly output images of high picture quality.

BRIEF DESCRIPTION OF THE DRAWINGS

FIG. 8a through FIG. 8d are explanatory diagrams illustrating conversion of image data to data representing dot on-off state, using a dither method.

FIG. 9a through FIG. 9d are explanatory diagrams illustrating creation of data representing dot on-off state for each pixel, from data indicating dot count.

FIG. 14a through FIG. 14d are explanatory diagrams depicting a method of determining classification numbers for pixel groups.

FIG. 15 is an explanatory diagram depicting a specific method for determining the classification number of a pixel group of interest.

FIG. 16 is an explanatory diagram illustrating conceptually the multilevel halftoning table of First Embodiment, for obtaining multilevel halftoning result values from representative tone values and pixel group classification numbers.

FIG. 22a through FIG. 22c are explanatory diagrams depicting a method for determining the classification number of a pixel group.

FIG. 23 is an explanatory diagram depicting a specific method for calculating the location of a pixel group within a dither matrix, from the coordinates (i, j) of the pixel group.

FIG. 24 is an explanatory diagram illustrating conceptually a decoding table referred to in the dot on-off state determination process of First Embodiment.

FIG. 25a and FIG. 25b are explanatory diagrams depicting the data structure of dot data established in the decoding table of First Embodiment.

FIG. 35 is an explanatory diagram illustrating conceptually large dot, medium dot, and small dot formation counts having been derived for each pixel group.

FIG. 36 is an explanatory diagram illustrating a correspondence relationship between multilevel halftoning result values and combinations of counts of each type of dot to be formed in a pixel group, in the second embodiment.

FIG. 40a through FIG. 40c are explanatory diagrams depicting creation of multilevel halftoning result values for three pixel groups.

FIG. 45 is an explanatory diagram illustrating the multilevel halftoning table referred to in the multilevel halftoning result value creation process of the third embodiment.

FIG. 52 is an explanatory diagram depicting conceptually the threshold value table referred to in the multilevel halftoning result value creation process of an alternative embodiment of the third embodiment.

DESCRIPTION OF THE PREFERRED EMBODIMENTS

A fuller understanding of the effects and advantages of the invention will be provided through the following description of the embodiments of the invention, in the sequence indicated below.

A. Overview of the Embodiments:

B. Structure of the Device:

C. Overview of Image Printing Process of First Embodiment:
   C-1. Basic Principle by which Pixel Location is Determinable from Count Data:
   C-2. Multilevel Halftoning Result Value Creation Process of First Embodiment
   C-3. Classification Number Determination Process:
   C-4. Multilevel Halftoning Table
   C-5 Data Format of Multilevel Halftoning Result Values
   C-6. Dot On-off State Determination Process of First Embodiment:
   C-7. Alternative Embodiments of First Embodiment:

D. Second Embodiment
   D-1. Overview of Image Printing Process of Second Embodiment:
   D-2. Multilevel Halftoning Result Value Creation Process of Second Embodiment:
      D-2-1. Large/Medium/Small Dot Count Determination Process Using Dither Method
      D-2-2. Specifics of Multilevel Halftoning Result Value Creation Process of Second Embodiment:
   D-3. Dot On-off State Determination Process of Second Embodiment:

E. Third Embodiment:
   E-1. Multilevel Halftoning Result Value Creation Process of Third Embodiment:
   E-2. Dot On-off State Determination Process of Third Embodiment:
   E-3. Multilevel Halftoning Table Setup Process of Third Embodiment:
   E-4. Modifications of Third Embodiment:

A. Overview of the Embodiments

Figure 1:
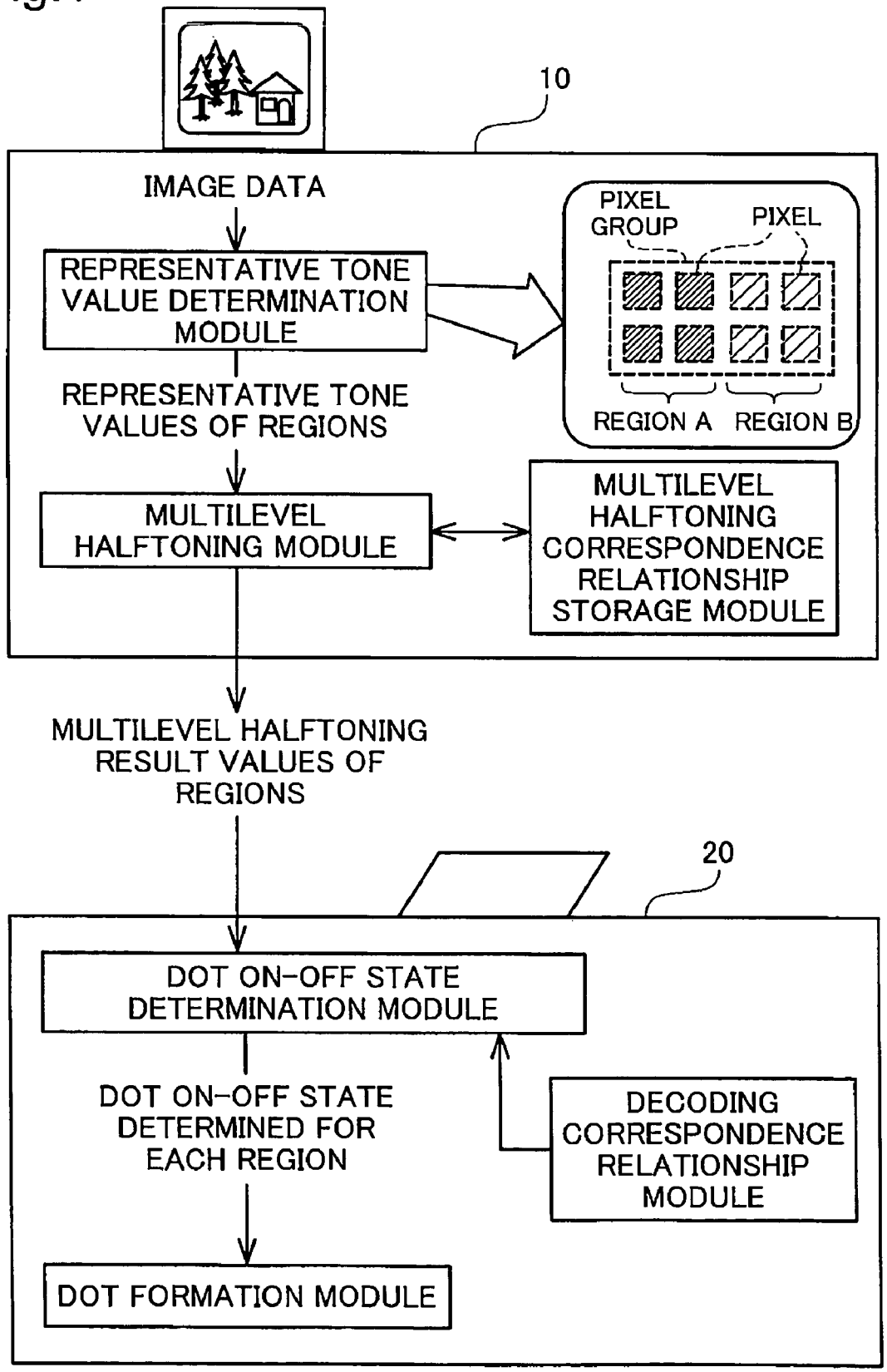
FIG. 1 is an explanatory diagram depicting an overview of the embodiments, taking the example of a printing system.

Before proceeding on to a detailed description of the embodiments, an overview of the embodiments will be described. FIG. 1 is an explanatory diagram depicting an overview of the embodiments, taking the example of a printing system. The printing system comprises a computer 10 as the image processing device, and a printer 20 as the image output device; when a specific program is loaded and executed by the computer 10, the computer 10 and the printer 20 function as a whole as an integrated image processing system. The printer 20 prints images by forming dots on a print medium. The computer 10 performs specific image processing of image data for images to be printed, and to generate data for controlling the formation of dots on each pixel by the printer 20, which data is then sent to the printer 20.

In a typical printing system, an image is printed as follows. First, by unit of the execution of a specific image process by the computer, image data is converted to data indicating dot on-off state on a pixel-by-pixel basis. Next, the data obtained thereby is provided to the printer, and the printer prints an image by unit of forming dots according to the data that has been provided. If the pixel count of the image to be printed is large, the time required for image processing increases commensurately, and it becomes difficult to print images rapidly. Moreover, at higher pixel counts, the amount of data needed to represent dot on-off states for pixels increases as well, so that a longer time is required to output data from the computer to the printer, increasing the time required for printing to a corresponding degree.

In view of this point, in the printing system illustrated in FIG. 1, images are printed in the following manner. First, in the computer 10, the pixels that make up the image are grouped together in groups of predetermined number to generate pixel groups. Next, for the plurality of regions into which a pixel group is divided, a representative tone value representing the tone value of each individual region is determined. FIG. 1 illustrates conceptually a situation where a pixel group is split into two regions. In the drawing, the small rectangles shown with dotted lines conceptually represent pixels. In the example in the drawing, the pixel group is composed of eight pixels, and is divided into two regions, namely Region A which is marked by closely-spaced diagonal lines, and Region B which is marked by diagonal lines spaced further apart. In a representative tone value determination module, a representative tone value is determined for each of these regions. It should be noted that a pixel group need not necessarily be divided; the decision as to whether or not to divide the pixel group may be made based on the tone values within the pixel group. In such cases, where the decision is made to not split the pixel group, only a single representative tone value would be determined.

Representative tone values obtained in this way are provided to a multilevel halftoning module, and converted into code values indicating the results of multilevel halftoning. Hereinbelow, these code values shall be referred to a multilevel halftoning result values. Multilevel halftoning of representative tone values is performed with reference to multilevel halftoning correspondence relationships stored in memory in a multilevel halftoning correspondence relationship storage module. In the embodiments described hereinbelow, multilevel halftoning correspondence relationships that associate representative tone values with multilevel halftoning result values on a per-pixel group basis are used as the encoding correspondence relationships. Multiple classes of encoding correspondence relationships may be prepared, and it is not always necessary for values to be pre-associated on a per-pixel group basis. It suffices to carry out encoding by applying a single encoding correspondence relationship to a selected pixel group, and then carrying out decoding by applying the corresponding decoding correspondence relationship. The correspondence relationships used for encoding and for decoding need not necessarily be the same, but it is necessary that there be some sort of association between the two. A simple method for carrying out association is to link these correspondence relationships on a per-pixel group basis. By so doing, mutual correspondence relationships can be identified easily. Accordingly, in the embodiments hereinbelow, encoding correspondence relationships are associated with decoding correspondence relationships via the classification numbers assigned to pixel groups. Code values acquired using an encoding correspondence relationship need only reflect the result of multilevel halftoning for the pixel group; and as long as an output dot arrangement can be created using the decoding correspondence relationship, code values defined by any system may be used. In the embodiments hereinbelow, the results of multilevel halftoning, obtained count data, or the like is used for the encoding correspondence relationships, and thus the encoding correspondence relationships shall be referred to as "multilevel halftoning relationships." The decoding correspondence relationship is the same as the decoding correspondence relationship. In this embodiment, representative tone values can be quickly converted to multilevel halftoning result values, by referring to the multilevel halftoning correspondence relationship. Since representative tone values are determined on a region-by-region basis with a pixel group, the multilevel halftoning result values are also obtained on a region-by-region basis. Of course, where on the basis of a decision as to whether to divide a pixel group it has been decided not to divide the pixel group, only a single multilevel halftoning resultant value will be obtained. The computer 10 outputs the multilevel halftoning result values thus obtained to the computer 20.

In the printer 20, once multilevel halftoning result values have been received for each region in a pixel group, the dot on-off states of pixels are determined on a region-by-region basis. Dot on-off state is determined in the following manner. First, a decoding correspondence relationship that associates, on a per-pixel group basis, multilevel halftoning result values with data representing dot on-off states for pixels in a pixel group is pre-stored in memory in a decoding correspondence relationship memory module. Next, a dot on-off state determining module, by referring to the decoding correspondence relationship from the multilevel halftoning result value derived for each region in the pixel group, determines the dot on-off state of each pixel, on a region-by-region basis. Of course, for a pixel group for which on the basis of a decision as to whether to divide the pixel group, it has been decided not to divide it and that consequently has only a single multilevel halftoning resultant value, existing dot on-off states for pixels in the pixel group may be adopted as-is in the determination. In accordance with the results of determination of dot on-off state made in this way, a dot formation module forms dots to print the image.

Here, as compared to the case of data representing dot on-off state on a pixel-by-pixel basis, the per-pixel group multilevel halftoning result values afford ample reduction in the amount of data. Accordingly, rather the computer 10 providing the printer 20 with data representing the dot on-off state for each individual pixel, by instead providing multilevel halftoning result values for each pixel, it is possible to increase the speed of data transfer enormously.

Additionally, by unit of referencing the multilevel halftoning correspondence relationship associating representative tone values with multilevel halftoning result values, the multilevel halftoning result values can be derived rapidly. With regard to the dot on-off state of each pixel as well, this can be determined rapidly by referring to the decoding correspondence relationship from the multilevel halftoning result values. Thus, combined with the ability to rapidly supply the printer 20 with the multilevel halftoning result values that have been produced, unit that images can be printed quickly, even if the images contain a large pixel count.

Furthermore, the process of creating multilevel halftoning result values, or the process of determining the dot on-off state for each pixel, can each be carried out by extremely simple process, by unit of making reference to a dedicated correspondence relationship. As a result, either process can be carried out without internally in, for example, the printer 20 or a digital camera, or without the aid of a device that has sophisticated processing capabilities, such as the computer 10.

Moreover, since the dot on-off state of each pixel is determined on a region-by-region basis, after multilevel halftoning of the representative tone values of each of the regions into which a pixel group has been divided, it becomes possible to appropriately determine the dot on-off states even in instances of appreciable variation in tone values within a pixel group, and thus to output images of high picture quality. Several embodiments of the invention will be described hereinbelow, taking this kind of printing system as an example.

B. Structure of the Device

Figure 2:
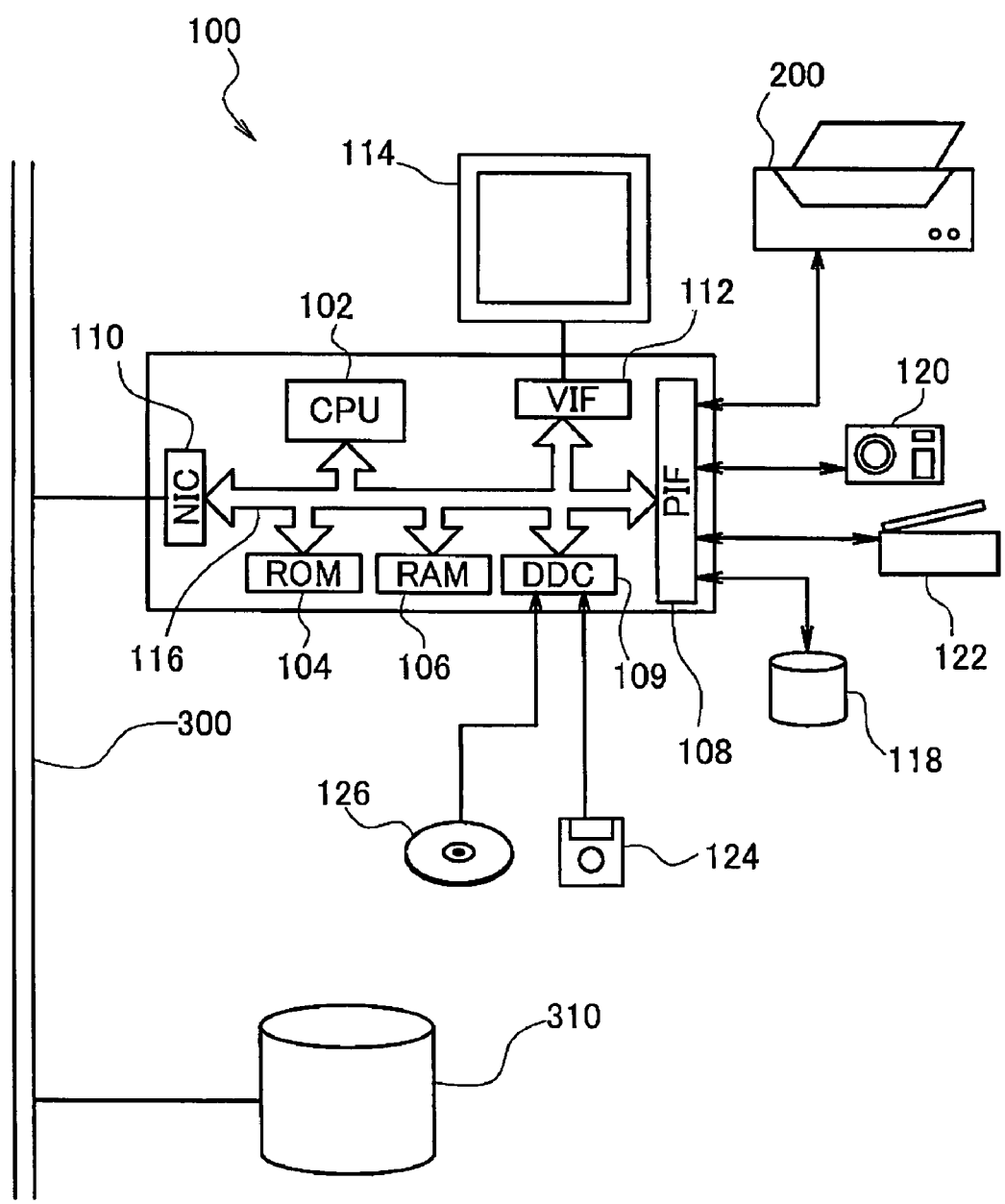
FIG. 2 is an explanatory diagram illustrating the structure of a computer as the image processing device.

FIG. 2 is an explanatory diagram illustrating the structure of a computer 100 as an image processing device according to the present embodiment. The computer 100 is a well-known computer structured through the interconnections of a ROM 104, a RAM 106 and so forth, around a CPU 102.

A disk controller DDC1 for reading data from a flexible disk 124 or a compact disk 126, or the like, a peripheral device interface PIF 108, for exchanging data with peripheral devices, and a video interface VIF 112, for driving a CRT 114 and the like are connected to a computer 100. A color printer 200, described below, and a hard disk 118, and the like, are connected to the PIF 108. Connecting a digital camera 120, a color scanner 122, or the like to the PIF 108 enables the printing of images captured by the digital camera 120 or the color scanner 122, or the like. Installing a network interface card NIC 110 enables the computer 100 to connect to a communication line 300, enabling data stored in a memory device 310, connected to the communications line, to be obtained.

Figure 3:
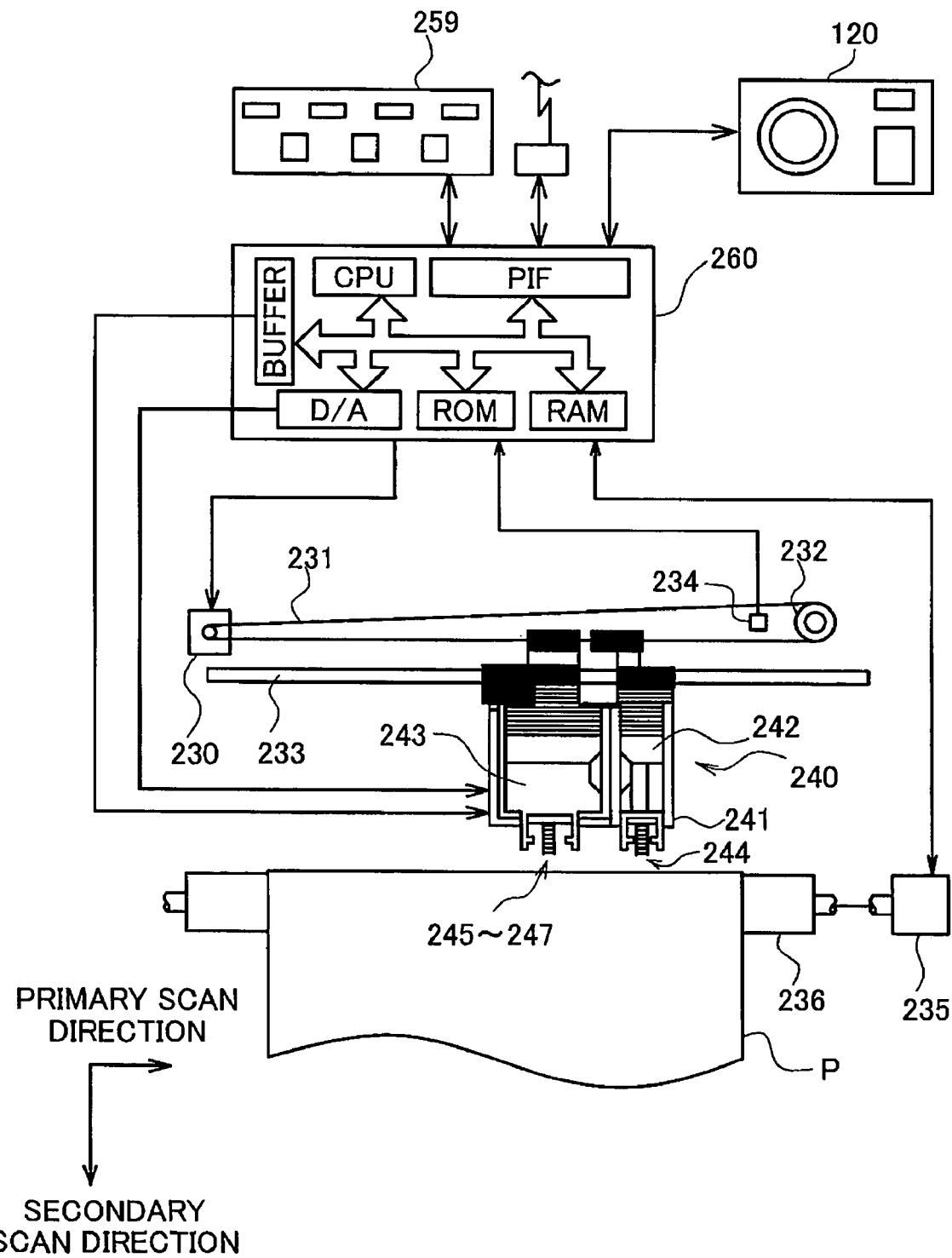
FIG. 3 is an explanatory diagram illustrating the schematic structure of a color printer.

FIG. 3 is an explanatory diagram illustrating the schematic structure of a color printer 200 according to the present embodiment. The color printer 200 is an ink jet printer that can form four colors of ink dots: cyan, magenta, yellow, and black. Of course, an ink jet printer capable of forming ink dots in a total of six colors may be used instead, where in addition to these four colors of ink there is also a cyan ink (light cyan) with a low density of dye or pigment, and a magenta (light magenta) ink with a low density of dye or pigment. Note that in some cases in the below, the cyan ink, magenta ink, yellow ink, black ink, light cyan ink, and light magenta ink may be abbreviated, respectively as C ink, M ink, Y ink, K ink, LC ink, and LM ink.

The color printer 200, as shown in the figure, comprises a mechanism that moves a print head 241, mounted in a carriage 240, and sprays ink to form dots, a mechanism wherein the carriage 240 is moved in a reciprocating motion in the axial direction of a platen 236 by a carriage motor 230, a mechanism wherein printer paper P is fed by a fed motor 135, a control circuit 260 that controls the formation of dots, the movement of the carriage 240, and the feeding of the printer paper, and the like.

An ink cartridge 242, containing the K ink, and an ink cartridge 243, containing the C ink, the M ink, and the Y ink, are installed in the carriage 240. When the ink cartridges 242 and 243 are installed in the carriage 240, the various inks within the cartridge are conveyed by injector tubes, not shown, and supplied to the ink jet heads 244 through 247 for the respective colors, equipped on the bottom surface of the print head 241.

Figure 4:
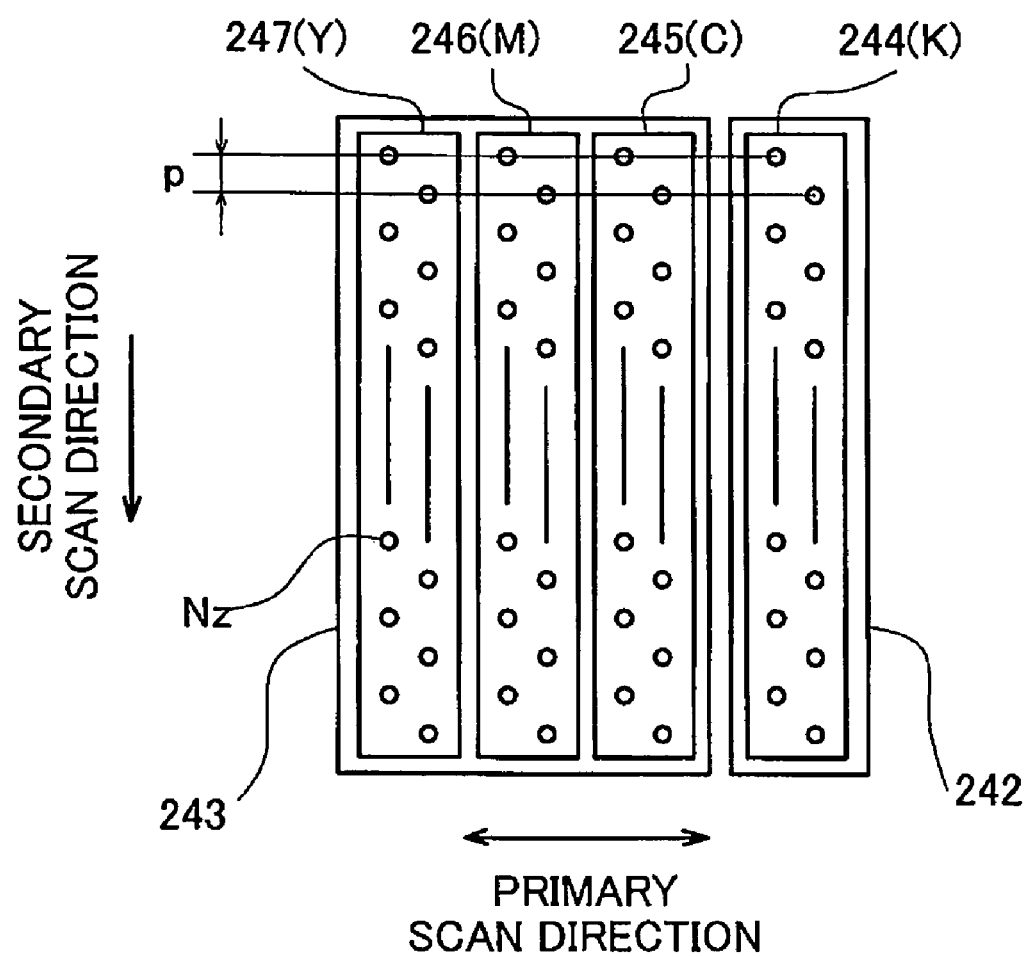
FIG. 4 is an explanatory diagram illustrating the arrangement of ink jet nozzles on an ink jet head.

FIG. 4 is an explanatory diagram illustrating an array of ink jet nozzles Nz in the ink jet heads 244 through 247. As is shown in the figure, an array of four sets of nozzles for spraying the C, M, Y and K colored ink are formed on the bottom surface of the ink jet heads, where 48 nozzles Nz are arrayed with a constant nozzle pitch k in each set of nozzles.

In the control circuit 260, a CPU, a ROM, a RAM, a PIF (peripheral device interface), and the like, are interconnected by a bus. The control circuit 260 not only controls the main scanning motion and secondary scanning motion of the carriage 240 through controlling the motion of the carriage motor 230 and the paper feed motor 235 but also controls the spraying of ink droplets, with the appropriate timing, from each nozzle, based on the print data that is supplied from the computer 100.

Note that a variety of different methods can be used for spraying ink droplets from each of the color ink jet heads. In other words, a method wherein ink droplets are sprayed through the use a piezo element, or a method wherein ink droplets are sprayed through the creation of bubbles in an ink pathway using a heater equipped on the ink pathway, or the like, may be used. Moreover, a printer may be used that, instead of spraying ink droplets, uses a method wherein ink dots are formed on the printer paper through the use of a phenomenon such as thermal transfer, or a printer of the type wherein toner particles of each color are adhered to the printing paper through the use of static electricity.

In a color printer 200 having a hardware configuration such as described above the carriage 230 is driven to cause each of the color ink jet heads 244 through 247 to move in the primary scan direction relative to the printer paper P, or, by driving the paper feed motor 235, to move the printer paper P in the secondary scan direction. The control circuit 260 synchronizes the motion of the carriage 240 in the primary scan and secondary scan directions while driving the nozzles with the appropriate timing to spray the ink droplets, so that the color printer 200 will print a color image on the printer paper thereby.

Note that the color printer 200 is also equipped with a CPU, a RAM, a ROM, and the like in the control circuit 260, enabling processes performed within the computer 100 to be performed within the color printer 200. In this case, supplying the image data for the images captured by the digital camera 120, or the like, directly to the color printer 200 and performing the required image processes within the control circuit 200 enables the printing of images directly from the color printer 200.

C. Summary of the Process for Printing an Image According to the First Embodiment The image processes (the image printing processes) performed within the computer 100 and the color printer 200, described above, for printing an image will be described below. To facilitate understanding, at this point an simple overall image of the image printing process will be explained first, after which the principles that enable the image printing process will be explained. Lastly, the details of the individual processes will be explained as well.

Note that, in the below, the image printing process is explained as the first half of the process being performed by the computer 100 and the second half of the process being performed by the color printer 200; however, these processes may be performed within the color printer 200, or may be performed within the device that generates the image data, such as the digital camera 120. Conversely, the first half of the image printing processes may instead be performed within the digital camera 120, or the like, and a second half of the processes may be performed within the color printer 200, of course. In other words, as will be explained in detail below, the image printing processes according to the present embodiment can enormously simplify the first-half processes and the second-half processes. Consequently, even when a device such as a color printer 200 or a digital camera 120, or the like, that does not have the sophisticated processing capabilities of the computer 100 is used, image printing processes can still be performed rapidly, enabling the structuring of a fully practical printing system that does not use the computer 100.

Figure 5:
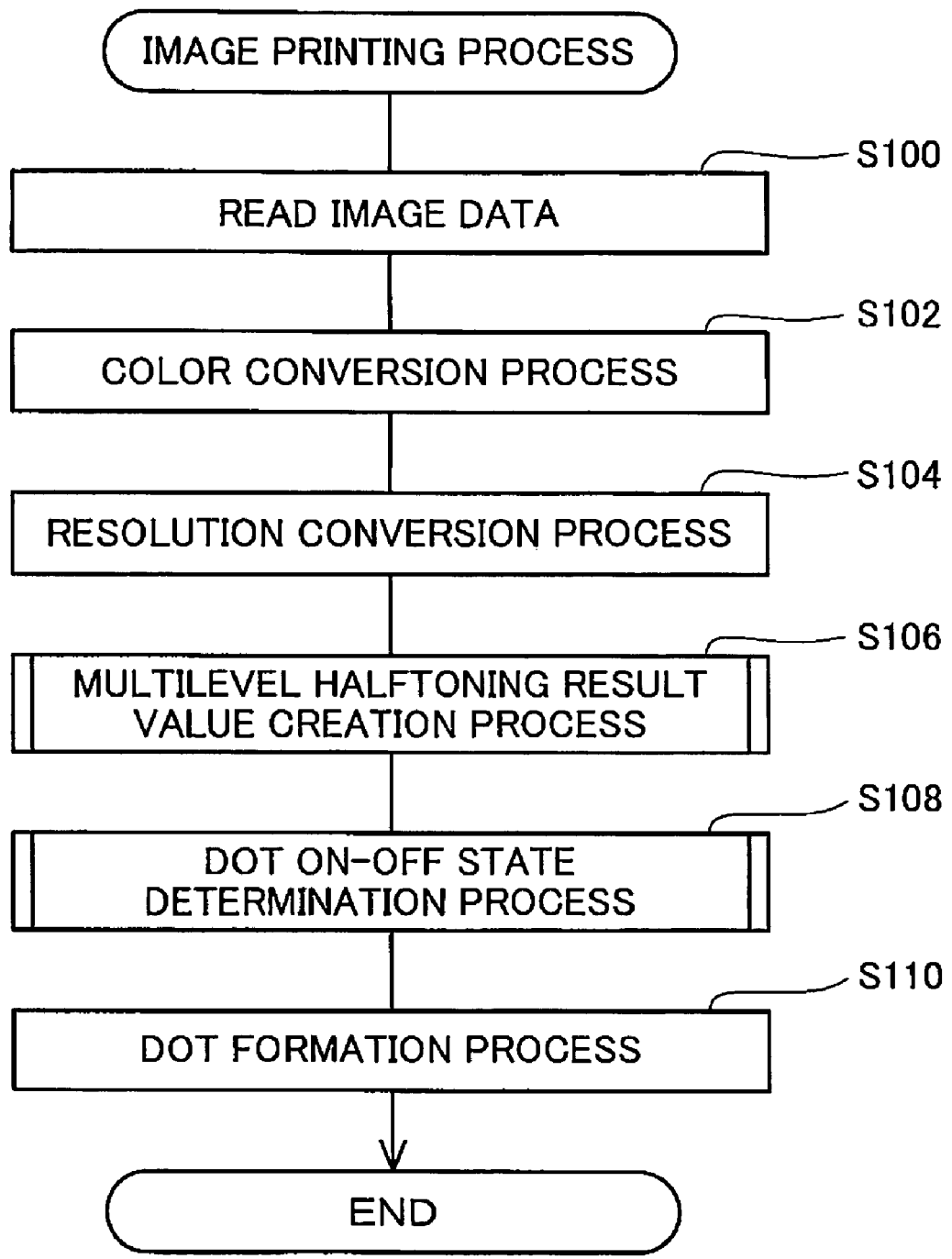
FIG. 5 is a flow chart illustrating the overall flow of the image printing process of First Embodiment.

FIG. 5 is a flow chart illustrating the overall flow of the image printing process in the first example embodiment. The overall image of the image printing process will be explained briefly below, referencing FIG. 5. When starting the image printing process according to the first embodiment, the computer 100 starts by first reading in the image data (Step S100). Although the image data is described here as RGB color image data, the image data is not limited to color image data, but the present invention applies equally to monochrome image data as well. The present embodiment can also be applied similarly to monochrome printers, rather than being limited to color printers.

The color conversion process is performed after the color image data has been read in (Step S102). The color conversion process is the process of converting the RGB color image data which is expressed by a combination of R, G, and B tone values, into image data that is expressed by combinations of tone values for each of the ink colors that are used for printing. As described above, the color printer 200 prints images using four colors of ink: C, M, Y, and K. Given this, the image data expressed by the RGB colors is converted into data expressed in terms of tone values for the C, M, Y, and K colors in the color conversion process in the first example embodiment. The color conversion process is performed by referencing a 3-dimensional table known as a color conversion table (LUT). The LUT stores, in advance, the individual C, M, Y, and K tone values obtained through color conversion of the RGB color image data. In the process in Step S102, this LUT is referenced to enable the rapid conversion of the RGB color image data into C, M, Y and K color image data.

The resolution conversion process (Step S104) is performed when the color conversion process has been completed. The resolution conversion process is a process that converts the color data resolution into the resolution in which the printer 200 will print the image (the printer resolution). If the resolution of the image data is lower than the print resolution, then new image data is generated between the pixels, but, conversely, if the resolution of the image data is higher than the print resolution, then a process is performed to reduce the data by a specific proportion to cause the resolution of the image data to match the printer resolution.

Given today's demands for higher image qualities and for larger image sizes, often, in the resolution conversion process, the conversion is to a printer resolution that has high resolution than the image data. In this case, interpolation calculations may be performed to generate new image data between the pixels; however, the new image data may instead by produced through simply splitting a single pixel into a plurality of pixels. Of course, when increasing the resolution through simply splitting the individual pixels, the result will not appear as a smooth transition of tone from one pixel to the adjacent pixel, so this approach does not actually increase the resolution, but rather merely increases the apparent resolution. However, when printing image by forming dots, the number of tones that can be expressed by a single pixel is no more than a few tones at best, and is very low when compared to the number of tones that can be expressed in the image data, and thus even this type of resolution conversion is effective in improving the image quality, and so resolution conversion processes that simply increase the apparent resolution through splitting pixels are common.

After the resolution has been converted to the printer resolution, as described above, the computer 100 begins the multilevel halftoning resultant value generation process (Step S106). The details of the process for generating the multilevel halftoning resultant values will be described below; only a summary will be described at this point. In this process, pixels that have specific positional relationships with each other are grouped together, in groups of a specific size, to form groups of pixels, dividing one image into a plurality of groups of pixels. The number of pixels grouped into a group of pixels need not necessarily be the same for all of the groups of pixels, but rather the number of pixels may change according to a rule, or the number of pixels that are grouped into a group of pixels may vary depending upon the position in the image; however, for ease in understanding, the explanation here will be of the case wherein all groups of pixels have the same number of pixels, the most simple case.

Next, in a first example embodiment described below, a decision is made whether or not to split the group of pixels based on the image data in each of the individual pixels that are grouped into the group of pixels. For those groups of pixels that are not split, a tone value (the representative tone value) that represents the image data within the group of pixels is determined. On the other hand, for those groups of pixels for which the decision is made to split the group of pixels, tone values that represent the image data within each of the regions that are produced by splitting the group of pixels will be derived and determined as the representative tone pixels for the respective regions. In other words, the groups of pixels will include groups of pixels that will be split and a plurality of representative tone values will be determined, and there will be those groups of pixels that are not split, so only a single representative tone value will be determined. It is also possible to do away altogether with the decision as to whether or not to split the groups of pixels, and handle all of the groups of pixels as being subject to splitting. In such a case, a plurality of representative tone values will be determined for everyone of the groups of pixels. Considering as the standard the case wherein a plurality of representative tone values will always be obtained, in the process in the first embodiment, described below, the case wherein only a single representative tone value is obtained can be considered to be an additional case. Consequently, from this perspective the process wherein the groups of pixels are always split can be viewed as the pure process. However, in order to understand the technical significance of always splitting the groups of pixels, it is more convenient to first understand the case wherein the pixels are not split. Given this, an example embodiment will be explained, as the first embodiment, wherein decisions are made as to whether or not to split the groups of pixels, and then, as another example of the first embodiment, an explanation will be made of an embodiment wherein the groups of pixels are always split.

Once the representative tone value has been determined for the group of pixels or for each region into which the group of pixels is split, then the representative tone value is converted into a multilevel halftoning resultant value through performing multilevel halftoning. Although the details indicated by the multilevel halftoning resultant value may be any type of details, here the multilevel halftoning resultant value is data indicating the number of dots that should be formed within the group of pixels. In other words, because the representative tone value is a tone value that represents the image data for each of the pixels within the group of pixels, the higher the representative tone value, the greater the number of dots to be formed within the group of pixels. Consequently, the process of determining the number of dots to be formed within a group of pixels from the representative tone vale for that groups of pixels can be viewed as a form of multilevel halftoning, and in this case the number of dots is the multilevel halftoning resultant value. Note that the multilevel halftoning resultant value may instead be a value that can be converted into the number of dots. In other words, the multilevel halftoning resultant value need not necessarily be the number of dots itself, but may instead be a value that indicates the number of dots indirectly.

As will be explained in detail below, the process for performing multilevel halftoning on the representative tone value can be performed quickly through referencing a table for multilevel halftoning wherein a correspondence is defined, for each group of pixels, between the representative tone values and the multilevel halftoning resultant values. Once the multilevel halftoning resultant value has been obtained, the value is outputted to the printer 200. At this point, if the group of pixels has been split into a plurality of regions, then a plurality of representative tone values will be obtained, and a plurality of multilevel halftoning resultant values will be obtained as well. Consequently, for this type of group of pixels, a plurality of multilevel halftoning resultant values will be outputted to the color printer 200. In the process of generating the multilevel halftoning resultant values, one or more multilevel halftoning resultant values are generated for each group of pixels based on the image data for each pixel, after which the value or values are supplied to the color printer 200.

When the CPU that is housed in the control circuit 260 of the color printer 200 has received the multilevel halftoning resultant values from the computer 100, then the process of determining whether or not to form a dot is commenced (Step 108). In other words, because the color printer 200 prints the image by forming dots for each pixel that forms the image, prior to printing the image it is necessary to determine, for each pixel, whether or not to form a dot. Given this, when the multilevel halftoning resultant value (or values) is received for each pixel from the computer 100, a process is performed for determining whether or not to form a dot for each of the pixels within the group of pixels.

At this point, the so-called density pattern method is a well-known method for determining, for each pixel within the group of pixels, whether or not to form a dot, based on the multilevel halftoning resultant value; however, in the process for determining whether or not to form a dot according to the present embodiment, there is a major point of difference in that the determination of whether or not to form a dot is done using the sequence value that has been determined for each group of pixels. Determining, for each pixel, whether or not to form a dot in this way enables the huge benefits described below. In the typical density pattern method, the actual resolution drops to the resolution of the groups of pixels on which the multilevel halftoning was performed, tending to lead to a reduction in image quality. In contrast, in the process of determining whether or not to form dots according to the present embodiment, the decision as to whether or not to form dots is made while referencing the sequence values that have been stored for each group of pixels, so there is no reduction in image quality depending on the size of the group of pixels. Moreover, this approach enables the printing of high quality images wherein the dots are dispersed well, achieved such as through the use of the so-called "blue noise mask" and "green noise mask" dithering matrices. The details of the process for determining whether or not to form dots, according to the present embodiment, and the reason why these types of characteristics are obtained through determining whether or not to form dots through performing this process will be explained below.

After whether or not to form dots has been determined for each pixel within the group of pixels as described above, then a process is performed to form the dots, on the output medium, according to the decisions as to whether or not to form dots (Step S110). In other words, as was explained using FIG. 3, the ink jet head is driven to spray ink droplets as the carriage 240 reciprocates in the primary scan direction and the secondary scan direction to form ink dots on the printer paper. The formation of dots in this way prints an image according to the image data.

Although, in this type of image printing process according to the first embodiment, the computer 100 provides multilevel halftoning resultant values to the color printer 200, the computer 100 does not provide to the color printer 200 data that indicates whether or not dots are formed for each individual pixel. When compared to expressing whether or not to form dots, for each individual pixel, the multilevel halftoning resultant values can be expressed in far less data, and thus the use of this type of method enables the data to be provided from the computer 100 to the color printer 200 extremely rapidly.

For example, let us assume that there is one type of dot that can be formed in each pixel. In this case, the data length for each pixel is one bit, because, for each pixel, all that is communicated is the status of whether or not to form the dot for the pixel. If one group of pixels is defined as grouping together eight individual pixels, then an 8-bit data length is required for expressing whether or not to form dots for each of the pixels within the group of pixels. However, the number of dots to be formed within a group of pixels can be only one of 9 possibilities, from 0 to 8. If there are 9 possibilities, then the number of dots can be expressed in only 4 bits. Consequently, performing multilevel halftoning on the representative tone values of the groups of pixels to form data for the number of dots can achieve a 4-bit data length for the multilevel halftoning resultant values. When compared with the data that expresses, for each individual pixel, whether or not to form a dot, the multilevel halftoning resultant values can be expressed in a substantially smaller amount of data, enabling the provision of data from the computer 200 to the color printer 200 to be performed extremely rapidly. Of course, when a group of pixels is split, a plurality of multilevel halftoning resultant values must be provided for each group of pixels; however, as will be described below, because there is a tendency in image data for adjacent pixels to have similar tone values, the proportion of groups of pixels that require splitting is trivial. Because of this, the increase in the amount of data that is provided to the color printer 200 for the entire image is no more than trivial, enabling the multilevel halftoning resultant values to be provided rapidly.

In addition, as will be described in detail below, if the decision as to whether or not to form dots are made appropriately for each pixel, there will be no reduction of image quality, even when the multilevel halftoning resultant values are provided. In particular, the exact same results can be obtained, under specific conditions, as in the case wherein data is supplied indicating whether or not to form dots for each specific pixel. Additionally, because the groups of pixels can be split, based on the image data in each of the individual pixels within the group of pixels, and multilevel halftoning resultant values can be generated and supplied to the color printer 200 for each of the regions, the images can be printed without a reduction in quality even when there are large variances in the image data within a group of pixels.

Moreover, the use of the algorithm described below enables the process for generating the multilevel halftoning resultant values and the process for determining whether or not to form dots for each of the pixels, from the multilevel halftoning resultant values, to be achieved using an extremely simple process, and also enables the execution to be performed extremely quickly. The result is the ability to execute these processes within the digital camera 120 or within the color printer 200, or the like, without using an image processing device that has sophisticated processing capabilities, such as the computer 100. In such a case, the image data captured by the digital camera 120 can be provided directly to the color printer 200 to print a high quality color image.

C-1. Principles that Enable the Determination of the Pixel Position from the Number Data The principle that enables the printing of images, without a loss of image quality even when determinations have been made as to whether or not to form dots, for each individual pixel within the group of pixels, based on multilevel halftoning resultant values that are supplied from computer 100 to a color printer 200, and which indicate the number of dots to form in the group of pixels when using the method described above will be explained below.

For convenience in the explanation, the dithering method will be explained first. The dithering method is a typical method that is used to convert image data into data that indicates, for each individual pixel, whether or not to form a dot. In this method, thresholds are set up in a matrix known as the "dithering matrix," the tone values for the image data are compared, for each individual pixel, to the threshold values in the dithering matrix, and, for each pixel in the image data for which the tone value is grater than the threshold value, a decision is made to form a dot, but a decision is made to not form a dot for the other pixels. Making this type of decision for each of the individual pixels within the image converts the image data into data that indicates whether or not to form dots for the individual pixels.

Figures 6, 7:
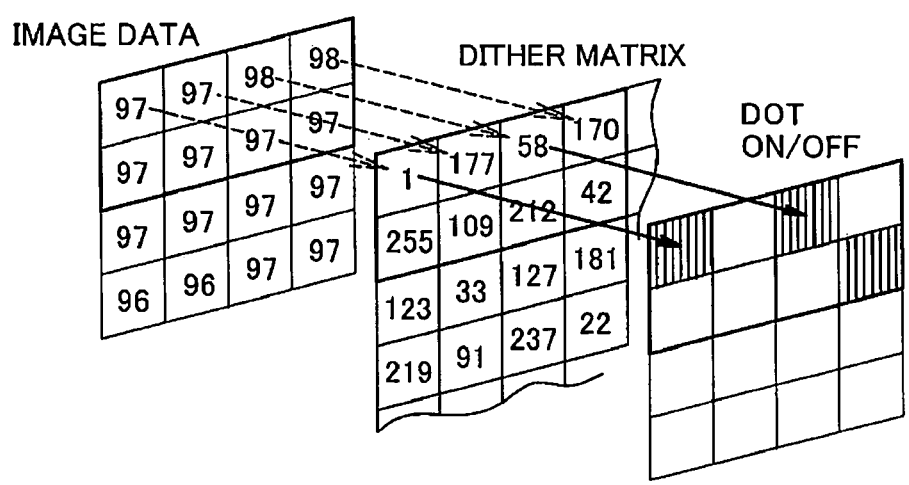
FIG. 6 is an explanatory diagram illustrating conceptually a portion of a dither matrix.
FIG. 7 is an explanatory diagram illustrating conceptually determinations of dot on-off state being made for each pixel, with reference a dither matrix.

FIG. 6 is an explanatory diagram, illustrating conceptually a portion of the dithering matrix. In the matrix that is shown, threshold values, selected at random from a range of tone values between 1 and 255 are stored at random in 8,192 pixels, with the matrix 128 pixels in the horizontal direction (the primary scan direction) and 65 pixels in the lengthwise direction (the secondary scan direction). Here the selection of the tone values for the threshold values from the range of 1 to 255, in the present embodiment, is applied to the 1 byte of data wherein the image data can have a range of tone values from 0 to 255, where if the tone value of the image data is equal to the threshold value, then the decision is to form a dot in that pixel.

In other words, when the pixels wherein dots are to be formed are limited to those wherein the tone value of the image data is greater than the threshold value (in other words, no dot will be formed for those pixels wherein the tone value is equal to the threshold value), then dots will never be formed for those pixels that have the threshold values that are the same as the maximum possible tone value in the image data. In order to avoid such a situation, the range of possible thresholds is arranged that excludes the maximum tone value from the range of possible image data. Conversely, when a dot will be formed in a pixel when the tone value of the image data equals the threshold value, then those pixels that have threshold values that are the same as the minimum possible value for the image data will always have a dot formed. In order to avoid such a situation, the range of possible threshold values is a range that excludes the minimum tone value from the range that is possible for image data. In the present embodiment, the tone values that can be obtained by image data range from 0 to 255, and because a dot is formed for those pixels wherein the image data is equal to the threshold value, the range for the possible threshold values is between 1 and 255. Note that the size of the dithering matrix is not limited to the size suggested in FIG. 6, but rather a variety of sizes, including matrices wherein the number of pixels in the horizontal axis equals the number of pixels in the vertical axis, may be used.

FIG. 7 is an explanatory diagram illustrating conceptually the situation when determining whether or not to form dots for individual pixels by referencing the dithering matrix. When determining whether or not to form dots, first the pixel for which the decision is to be made is selected, and then the tone value for the image data for that pixel is compared to the threshold value stored in the corresponding position in the dithering matrix. In FIG. 7, the arrow with the thin dotted line represents conceptually the comparison of the tone values for the image data with the threshold values stored in the dithering matrix for each individual pixel. For example, for the pixel at the top left corner of the image data, the tone value for the image data is 97 and the dithering matrix threshold value is 1, and so a decision is made to form a dot for the pixel. In FIG. 7, the arrow shown with the solid line illustrates conceptually the situation wherein the decision is made to form a dot for the pixel, and the decision results are written to memory. On the other hand, for the pixel to the right of this pixel, the tone value of the image data is 97 and the threshold value in the dithering matrix is 177, so it is the threshold value that is larger, and the decision is made so as to not form a dot for this pixel. In the dithering method, decisions are made as to whether or not to form dots for the individual pixels while referencing this type of dithering matrix, to thereby convert the image data to data indicating whether or not to form dots for each individual pixel.

FIG. 8 is an explanatory diagram showing the situation wherein the dithering method is used to convert image data into data that indicates whether or not to form dots. FIG. 8a is an expanded view of a part of the image data, where the small squares in the figure are pixels and the number display in each square indicates the tone value for the image data for that pixel. As is shown in the figure, the image data tends to have approximately the same (or exactly the same) tone value assigned to adjacent pixels. Recently there has been a tendency towards higher resolution image data, due to demands for higher resolution, and this tendency to have approximately the same or exactly the same tone values assigned to adjacent pixels becomes more apparent the higher the level of resolution of the image data. Moreover, as has already been stated, when converting the resolution of the image data to the printer resolution, if a pixel is split into a plurality of pixels to increase the resolution, the pixels that are generated by splitting off of the same pixel will all have the same tone value.

FIG. 8b shows the situation wherein threshold values are established in positions corresponding to the dithering matrix. The tone values of the image data shown in FIG. 8a are compared, for each individual pixel, to the threshold values in the dithering matrix shown in FIG. 8b to determine whether or not to form dots. FIG. 8c shows the results of the determination as to whether or not to form dots, performed for each individual pixel, where the pixels marked by the diagonal lines are the pixels for which it has been determined that dots will be formed.

Here nearby pixels are gathered, a given number of pixels at a time, into groups of pixels, and one can consider counting the number of pixels within the group of pixels for which the decision has been made to form dots. As one example, each group of eight pixels, four pixels in the primary scan direction (the horizontal direction in FIG. 8) and two pixels in the secondary scan direction (the vertical direction in FIG. 8) are grouped together to form the group of pixels. FIG. 8d shows the number of dots obtained through counting the number of pixels for which the decision has been made to form dots, for each of the groups of pixels gathered in this way. In the image printing process according to the first embodiment, the multilevel halftoning resultant values provided to the color printer 200 from the computer 100 are data on the number of dots obtained in this way for each group of pixels. The multilevel halftoning resultant values that show the numbers of dots do not include information regarding the pixel positions wherein the dots will be formed. However, doing the following will enable the creation of data that indicates whether or not dots are formed, for the individual pixels, through restoring, from the number of dots, information on the positions of the pixels for which the dots are to be formed.

FIG. 9 is an explanatory diagram showing the situation wherein data is generated that indicates, for the individual pixels, whether or not dots are to be formed, generated from the data indicating the number of dots. FIG. 9a shows the value obtained through counting the number of dots to be formed for each group of pixels in FIG. 8. Moreover, FIG. 9b indicates the dithering matrix that was referenced in order to determine whether or not to form dots for the individual pixels in FIG. 8. In the dithering method described above, the tone values from the image data are compared to the threshold values established at the corresponding pixel positions in the dithering matrix, where the larger the tone value in the image data, the more likely a decision to form a dot at that pixel, and the smaller the threshold value in the dithering matrix, the more likely a dot is to be formed. Given this, the dithering matrix can be thought of as indicating a sequence value for the pixels for which dots are to be formed.

Focusing on these characteristics in the dithering matrix, the decisions as to whether or not to form dots for the individual pixels can be made from the number of dots to be formed within the group of pixels. For example, for the group of pixels at the corner furthest to the upper left in FIG. 9a, three dots are to be formed in this group of pixels. Referencing the dithering matrix shown in FIG. 9b, the pixel position at the upper-left corner within this group of dots, or in other words, the pixel position wherein the threshold value is 1, is the pixel wherein the formation of dots is the most likely. Consequently, of the three dots to be formed within this set of pixels, 1 can be thought of as being formed in the pixel at the upper left. Similarly, for the remaining two dots, the second dot within the group of pixels can be through of as being formed in the next most likely position for the formation of a dot (or in other words, the pixel wherein the dithering matrix threshold value is set as 42 in FIG. 9b) and the third dot can be thought of as being formed in the pixel wherein dot formation is next most likely (the pixel wherein the threshold value has been set to 58.

Of course, whether or not to form dots is influenced not only by the thresholds that have been set for the dithering matrix, but also by the tone values for the image data, and thus if the tone values of the image data are extremely large, then dots may be formed prior to the pixels for which the smallest threshold values are set.

However, because there is a tendency to assign tone values that are approximately equal to (or exactly equal to) those of the adjacent pixels in image data, as described above, in most cases dots can be through of as being made beginning with the pixel for which dots can be made most easily (in other words, beginning with the pixel for which the threshold value is low in the dithering matrix).

Even in the other groups of pixels shown in FIG. 9a, similarly, the decision as to whether to form dots, for individual pixels, is made based on the number of dots and on the thresholds in the dithering matrix.

For example, when it comes to the group of pixels below the group of pixels described above in FIG. 9a (the second group of pixels on the left edge), there are three dots and by referencing the dithering matrix in FIG. 9b, these three dots can be through of as being formed in the pixel for which the threshold value 22 is established, the pixel for which the threshold value 33 is established, and the pixel for which the threshold value 91 is established.

For the four groups of pixels shown in FIG. 9a, determining the positions of the pixels wherein to form dots from the data on the number of dots in this way enables the results shown in FIG. 9c to be produced. In FIG. 9c, the pixels marked with the diagonal lines are the pixels for which decisions have been made to form dots. As is clear from a comparison of FIG. 9c and FIG. 8c, the distribution of dots determined based on the number of dots is the same distribution of dots determined by comparing the image data and the threshold values for each individual pixel. This shows the ability to determine appropriately whether or not to form dots for each of the individual pixels based on the number of dots and on the dithering matrix, even without knowing the positions of the pixels, merely by referencing the dithering matrix to determine whether or not to form dots for each of the individual pixels and by knowing the number of dots that are to be formed within the group of pixels. Given this, even when the multilevel halftoning resultant values that indicate the number of dots to be formed within the group of pixels are supplied from the computer 100 to the color printer 200 the decisions regarding whether or not to form dots can be made as appropriate on the color printer 200 side, thus enabling high quality printing without a detone in the image quality.

Moreover, in order to determine appropriately, from the number data, the positions of the pixels wherein to form dots, there should be no large variations in the tone values in the image data within the group of pixels. As described above, image data has a characteristic wherein adjacent pixels have similar tone values, where this condition occurs in nearly all cases, and thus even when the multilevel halftoning resultant values indicating the number of dots are provided to the color printer 200 and decisions are made, based on the multilevel halftoning resultant values, as to whether or not to form dots, there will be the ability to print images without a loss of image quality.

In particular, the fulfillment of the following two conditions enables the results of decisions, for each individual pixel, as to whether or not to form a dot, through comparing the tone values of the image data to the dithering matrix threshold value, to obtain absolutely identical dot layouts. The first condition is that all of the pixels within the group of pixels have the exact same tone values, and the second condition is that the dithering matrix referenced when determining whether or not to form dots, for each individual pixel, on the computer 100 side is identical to the dithering matrix referenced for determining the pixel positions, from the number data, on the color printer 200 side. Moreover, as will be described in detail below, in the process of generating the multilevel halftoning resultant values in the present embodiment, the groups of pixels may be split into a plurality of regions to generate the multilevel halftoning resultant values, in which case the tone values for the individual pixels within the split up regions should be identical. For example, even the case wherein each of the pixels within a group of pixels do not have the exact same tone values, splitting the group of pixels into a plurality of regions often can produce cases wherein each of the pixels within a region will have the exact same tone value. Because of this, the image quality can be improved through being able to generate the multilevel halftoning resultant values by splitting the groups of pixels.

Note that in the dithering method explained using FIG. 7 the decision as to whether or not to form dots is performed by comparing the threshold values in the dithering matrix to the tone values of the image data and seeing which values are the largest. In contrast, as was explained in FIG. 9, in the case wherein the determination as to whether or not to form dots for the individual pixels is based on the number of dots, the decision to form dots is made for those pixels wherein the sequence value for forming dots within the group of pixels is lower than the number of dots or equal to the number of dots, and the decision is not to form dots for all other pixels. In other words, there is no need for the threshold values themselves in determining the positions of the pixels, but rather there is only the need to simply know the order in which the dots will be formed within the group of pixels (or in other words, the sequence of dot formation). Given this, instead of the dithering matrix shown in FIG. 9b, the matrix that establishes values indicating the sequence in which the dots are formed (the sequence values) for each of the pixels within the group of pixels, as shown in FIG. 9d (where, in this specification, this type of matrix is termed the "sequence value matrix") is stored in advance, enabling the determination as to whether or not to form dots for the individual pixels to be made while referencing the sequence value matrix for each group of pixels.

In addition, when determining whether or not to form dots based on a dithering matrix in this way, a distribution of dots that is essentially the same as when determining whether or not to form dots through the application of the dithering method can be obtained. Given this, designing the characteristics of the dithering matrix appropriately can control the distribution of the dots. That is, the use of a matrix possessing the so-called blue noise mask characteristics or a matrix possessing the so-called green noise mask characteristics can produce an image wherein the dot distribution is dependent on the characteristics of the dithering matrix, regardless of the processing of the image data by the pixel group unit. This point will be explained somewhat more thoroughly below.

Figure 10:
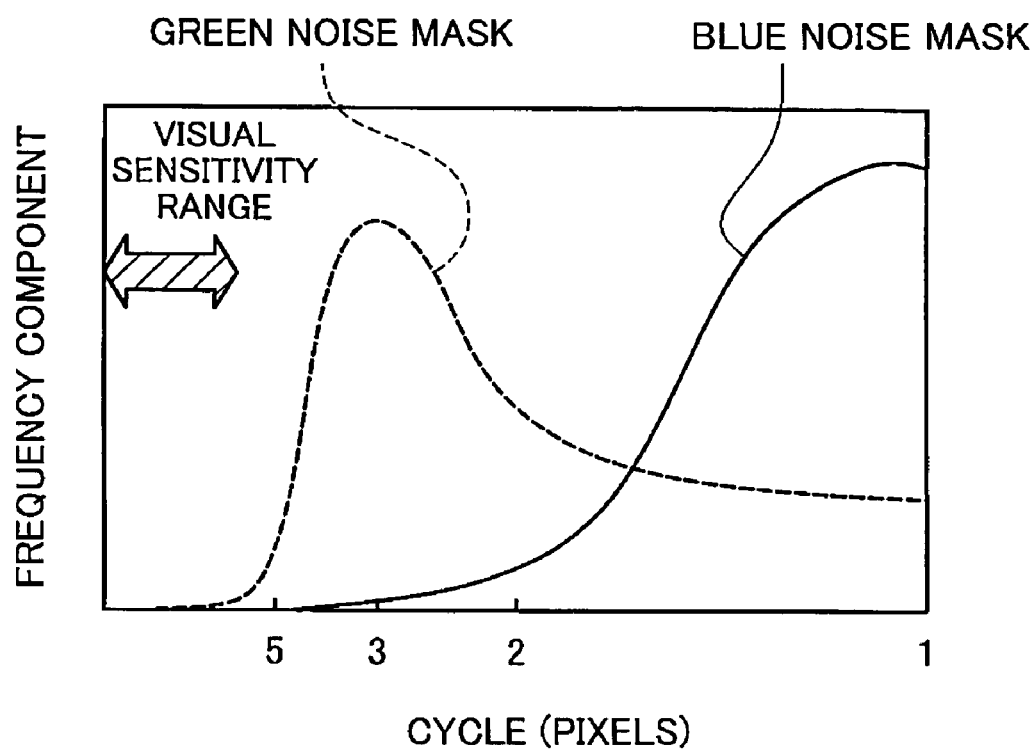
FIG. 10 is an explanatory diagram illustrating conceptually the spatial frequency characteristics of threshold values established in the matrix, for a dither matrix having blue noise masking characteristics and a dither matrix having green noise masking characteristics.

FIG. 10 is an explanatory diagram illustrating conceptually the spatial frequency characteristics of the thresholds established in the matrix for a dithering matrix that has blue noise mask characteristics and a dithering matrix that has green noise mask characteristics. In FIG. 10, for the convenience of illustration, the horizontal axis shows the period instead of the spatial frequency. Of course, the shorter the period, the higher the spatial frequency. The vertical axis in FIG. 10 shows the spatial frequency components for each period. Note that the frequency components shown in the figure are shown in a state wherein they have been smoothed so that, to some degree, the changes are smooth.

The solid line in the figure shows, conceptually, the spatial frequency components of the blue noise mask. As is shown in the figure, the blue noise mask has a frequency component that is the largest in a high frequency domain wherein the length of one period is less than two pixels. The blue noise mask threshold is set so as to have this type of spatial frequency characteristic, and thus when there is a determination as to whether or not to form dots, based on the blue noise mask, there will be a tendency to form dots that are separated from each other. Conversely, the dotted line in the figure shows, conceptually, the spatial frequency component of the green noise mask. As can be seen in the figure, the green noise mask has a frequency component that is the largest in the medium frequency domain wherein one period length is between two pixels and ten pixels. Because the green noise mask thresholds are set so as to have this type of spatial frequency characteristic, when determining whether or not to form dots based on the green noise mask, there is a tendency to form dots in a state wherein, over all, dots will be formed adjacent to each other in several-dot units, where these aggregations of dots will be scattered.

Consequently, determining the number data for the groups of pixels, or determining the pixel locations, based on dithering matrices having these types of blue noise mask characteristics or green noise mask characteristics enables the creation of dots so as to have a distribution that reflects the blue noise mask characteristics or green noise mask characteristics, regardless of the processing on the pixel group unit.

In the explanation above, it was explained that the decisions whether or not to form dots, for each of the individual pixels, was performed using a sequence value matrix corresponding to the group of pixels, after having received number data for the group of pixels, with a plurality of types of sequence value matrices, generated based on dithering matrices, stored in advance, as shown in FIG. 9. However, the determination as to whether or not to form dots can be performed more simply as follows. A plurality of sequence value matrices are stored in advance, and when the number data is obtained, one of the sequence value matrices, selected at random, is used for the group of pixels in order to make the determination as to whether or not to form dots for the individual pixels. Even more simply, only one sequence value matrix may be stored in advance to make the determination as to whether or not to form dots for the individual pixels using this matrix.

Figure 11:
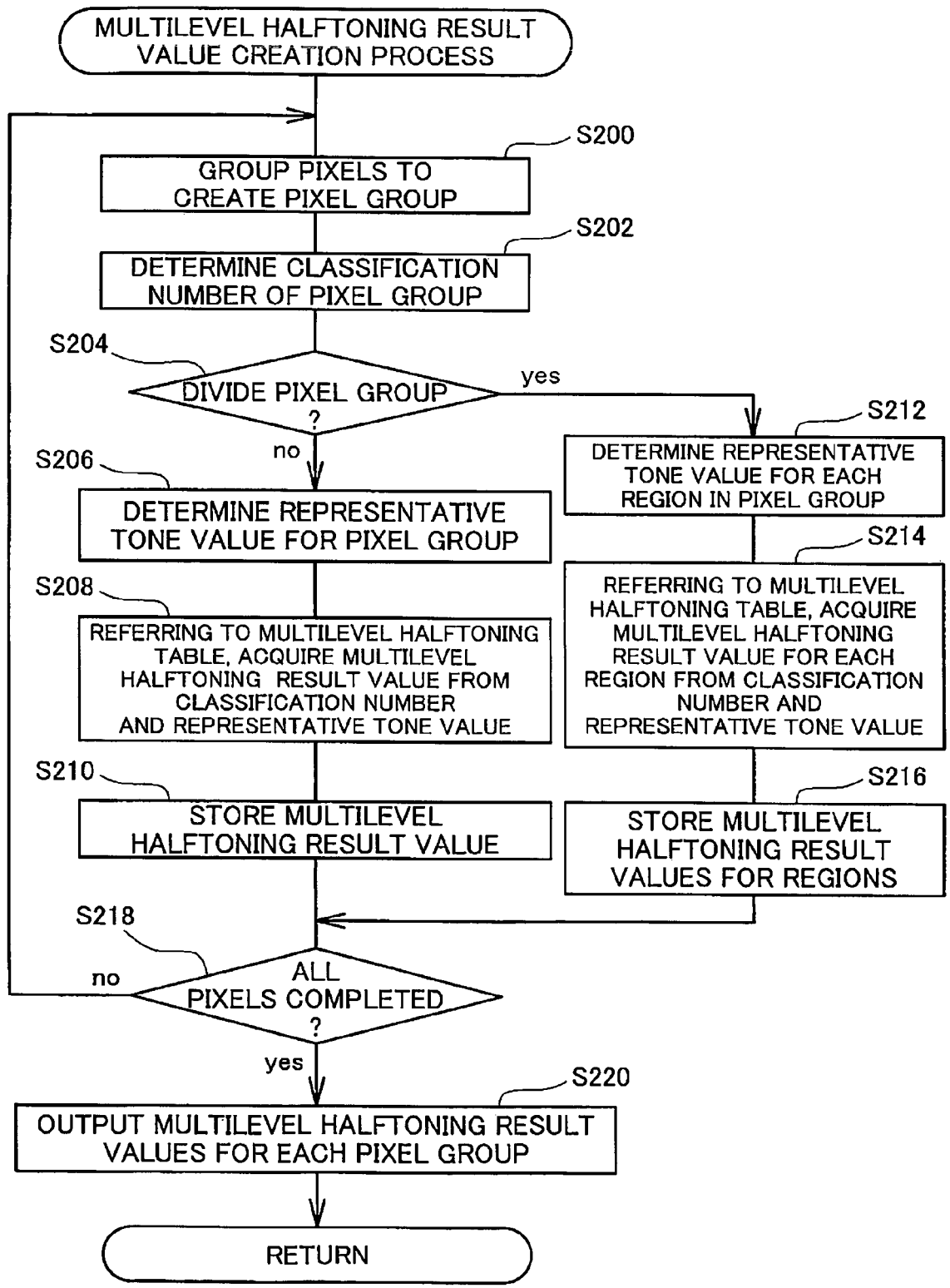
FIG. 11 is a flowchart illustrating the flow of the multilevel halftoning result value generation process in First Embodiment.

C-2. Process for Generating Multilevel Halftoning Resultant Values According to First Embodiment The process for generating the multilevel halftoning resultant values from the image data (Step S106) in the image printing process according to the first embodiment, shown in FIG. 5, will be described below. FIG. 11 is a flow chart illustrating the flow of the process for generating the multilevel halftoning resultant values in the first embodiment. Here the explanation will be of the process for generating the multilevel halftoning resultant values being performed in a computer 100, but, as will be explained below, the process for generating the multilevel halftoning resultant values can use a simple process, and thus can be performed within a color printer 200, a digital camera 120, or the like. The explanation below will follow the flow chart.

When the process for generating the multilevel halftoning resultant values in the first embodiment is started, first a certain number of neighboring pixels are grouped to produce a group of pixels (Step S200). Here a total of eight pixels, four pixels in the primary scan direction and two pixels in the secondary scan direction, are grouped into the group of pixels. Note that the pixels that are grouped as a group of pixels need not necessarily be pixels wherein the positions in the vertical and horizontal directions are lined up to form a rectangle, but instead any pixels can be grouped together to form a group of pixels insofar as the pixels are neighboring each other and have a specific positional relationship.

Next the classification number of the group of pixels is determined (Step S202). Although the significance of the classification number will be explained below, at this point the classification number can be considered to be a number that is used for identifying the group of pixels. The classification number of the group of pixels can be determined extremely easily using a method described below.

Next a decision is made, based on the tone values of the individual pixels that are grouped into the group of pixels, as to whether or not to split the group of pixels (Step S204), and if the decision is to not split the group of pixels (Step S204: NO), a representative tone value is determined for the group of pixels (Step S206). On the other hand, if the decision is to split the group of pixels (Step S204:YES), then representative tone values are determined for each of the regions generated by splitting the group of pixels (S212). Although there may be a variety of different states in which the groups of pixels may be split, or in other words, a variety of settings in terms of the number of regions, and sizes thereof, generated through splitting the groups of pixels, at this point, for convenience in understanding, the explanation will be for the simplest state, that state wherein the group of pixels is split into two equal regions, a left region and a right region.

FIG. 12 is an explanatory diagram illustrating, conceptually, the situation wherein a decision is made as to whether or not to split the group of pixels, based on the tone values of the individual pixels that are grouped together into the group of pixels, and the representative tone value is determined. The large rectangles shown in the figure represent groups of pixels, and the small squares within the groups of pixels represent individual pixels. Moreover, the numbers that are displayed within the squares that represent the pixels represent the tone values for the image data which is assigned to the individual pixel. As is shown on the left side of FIG. 12a, if each of the pixels within the group of pixels has the same tone value, then the decision is to not split the group of pixels, and the tone value of each of the pixels is used as the representative tone value of the group of pixels. The right side of FIG. 12a shows, conceptually, the situation when the tone value of each of the pixels is determined as the representative tone value of the group of pixels.

Figure 12A:
FIG. 12a through FIG. 12f are explanatory diagrams depicting conceptually determination of representative tone values, by deciding whether to divide a pixel group on the basis of the tone value of each pixel making up the pixel group.

As was described above, there is a tendency for adjacent pixels in image data to assume similar tone values, and so the tone values of the individual pixels within a group of pixels will often assume a distribution as shown in FIG. 12a. Moreover, if, in the process for converting the resolution of the image data to the printer resolution, a single pixels is split into a plurality of pixels in order to increase the resolution, most of the groups of pixels will assume this type of distribution of tone values. Moreover, if, when converting the resolution, a single pixel is split into four pixels in the primary scan direction (the horizontal direction in the figure) and split into two pixels in the secondary scan direction (the vertical direction in the figure) to increase the resolution, then all of the groups of pixels, of necessity, will assume the tone value distribution shown in FIG. 12a.

In contrast, if, as shown in FIG. 12, the tone values are split in two at the center of the group of pixels so that the region on the right is different than the region on the left, then the group of pixels may be split into two regions, on the left and the right. As is shown in FIG. 12b, the tone value in the region on the left of the group of pixels is 97, while the tone value in the region on the right is 135, and thus the representative tone values for the respective regions are the tone values 97 and 135. Moreover, even in this type of case, if there is not a large difference between the respective tone values of the left and right regions (for example, if the difference in tone values in no more than a specific value) then a decision may be made so as to not split the group of pixels. The tone value of either the left or the right region may be used as the representative tone value in such a case. Conversely, the average of the tone values may be used as the representative tone value, or the tone value that occurs in the highest number of pixels within the group of pixels may be used as the representative tone value.

Figure 12B:

Moreover, when converting the resolution of the image data to the printer resolution, frequently the resolution must be converted to at least twice as high in the primary scan direction. When this type of resolution conversion is performed, two pixels are generated in the primary scan direction from one pixel, and thus even in the case wherein there are different tone values for the individual pixels in the group of pixels, the distribution of tone values, as shown in FIG. 12b, will often be distributed so as to be divided into left and right sides at the center of the group of pixels. In particular, when a conversion is performed so as to double the resolution in not just the primary scan direction but in the secondary scan direction as well, a single pixel is converted into four pixels, two each in the vertical and horizontal directions, and thus even if different tone values are included within the group of pixels, of necessity the tone value distribution will be as shown in FIG. 12b.

Figure 12C:

Of course, when there is a distribution of tone values within the group of pixels, the distribution will not necessarily be as shown in FIG. 12b. For example, even when a resolution conversion has been performed so as to produce two pixels, lined up in the primary scan direction, from one pixels, if the tone values of the original pixels are different in the secondary scan direction, then there will be the tone value distribution such as shown in FIG. 12c. At this point, for convenience in understanding, the form wherein the group of pixels are split (the split pattern) in the present embodiment can assume only the pattern of two equal regions on the left and the right, and thus, in this type of tone value distribution, the decision is to split in the pattern shown in FIG. 12b, and for the representative tone value for the region on the left, any of the tone values included in the region may be selected. Note that when the tone value 135 is selected at this time, the representative tone values for both the left and right hand side regions will be the tone value 135, and so combining these regions enables the handling to be performed in the same manner as for the case wherein the decision was to not split the group of pixels.

Conversely, because the region on the left contains two tone values, tone values 97 and 135, the average of these tone values may be used as the representative tone value. When calculating the average value, either the average of the tone values may be calculated simply, or else a weighting that is appropriate to the number of pixels at each of the tone values may be applied to calculate the average. The right side of FIG. 12 illustrates, conceptually, the situation wherein the representative tone value of the region on the left is determined in this way.

Figure 12D:
Figure 12E:
Figure 12F:

Of course, the conversion to the printer resolution is not limited to a conversion that increases the resolution through splitting pixels, but rather there is the case wherein interpolation calculations are performed to generate new tone values between pixels, and also the case wherein resolution is reduced by selecting pixels with a specific ratio. In these cases, the tone value distribution within the groups of pixels can be considered to assume a variety of forms. FIGS. 12d through 12f show the situations wherein the representative tone values are determined after determining whether or not to split the groups of pixels when the tone value distributions assume these different forms.

For example, as shown in FIG. 12d, while the tone values are not necessarily always split into left and right regions exactly in the center, when divided in roughly the center, the group of pixels can be divided into two equal regions on the left and the right. Conversely, as is shown in FIG. 12e, in the case wherein some of the pixels within the group of pixels assume a different tone value while the rest of the group of pixels has the same tone value, the decision may be to not split the group of pixels. Moreover, as is shown in FIG. 12f, in the case wherein the tone value distribution has a tone, the group of pixels may be split into two regions, the left and the right. At this time, the average value of the tone values within each individual region can be used as the representative tone value for the respective region. Conversely, the tone values of pixels selected from each of the regions may be used as the representative tone values. Even in the case wherein the tone value distribution within a group of pixels has a tone, if the tone is small (for example, if the difference in the tone values within the group of pixels is less than a specific value) a decision can be made to not split the group of pixels.

Moreover, more generally a decision may be made as to whether or not there is an edge within the group of pixels, and to split the group of pixels if there is an edge. When determining whether or not there is an edge, an edge can be determined if the difference between tone values within a group of pixels exceeds a specific value. Conversely, a so-called differential-type image filter may be used to judge the edge in a group of pixels that includes pixels wherein the absolute value of the differential value is greater than a specific amount.

In Steps S204, S206, and S212, shown in FIG. 11, the decision as to whether or not to split the group of pixels is performed based on the tone values of the individual pixels within the group of pixels, and if the decision is not to split the group of pixels (S204: NO), a representative tone value is determined for the group of pixels (S206), where, if the decision is to split the group of pixels (S204: YES) then the group of pixels is split and a process is performed to determine representative tone values for each of the regions generated (S212).

In this way, a classification number is determined for the group of pixels, and after either one representative tone value or a plurality of representative tone values (two tone values in the present embodiment) have been determined for the group of pixels, then a table for multilevel halftoning, described below, is referenced to convert the representative tone value or values into a multilevel halftoning resultant value or values (Step S208 or Step S214). As will be described in detail below, the table for multilevel halftoning stores, in advance, appropriate multilevel halftoning resultant values by establishing associations with combinations of classification numbers for groups of pixels and representative tone values. Consequently, finding the classification number and the representative tone value can make it possible to find immediately the multilevel halftoning resultant value by referencing the table for multilevel halftoning. Moreover, when the group of pixels is split, this corresponds to obtaining a plurality (two in present embodiment) of representative tone values, and a plurality of multilevel halftoning resultant values are obtained for the group of pixels.

Once the multilevel halftoning resultant values have been found as described above, the multilevel halftoning resultant values obtained for the groups of pixels are stored (Step S210). The data format for storing the multilevel halftoning resultant values will be described below. Next a decision is made to whether or not processing has been completed for all of the pixels in the image data (Step S218), and if there are pixels remaining to be processed (Step S218: NO), the processing returns to Step S200, a new group of pixels is generated, and the series of processes iterates thereafter. When these operations are iterated and a decision is made that processing has been completed for all of the pixels (Step 218: YES) then the multilevel halftoning resultant values that have been obtained are outputted to the color printer 200 (Step S220) and the multilevel halftoning resultant value generation process in the first embodiment, shown in FIG. 11, is completed.

C-3. Method of Determining Classification Numbers

Here the method for determining the classification number of the group of pixels, in the process for generating the multilevel halftoning resultant values according to the first embodiment, described above, will be explained. In the below, first the approach to assigning classification numbers to the groups of pixels will be explained, followed by an explanation of the specific method for assigning the classification numbers.

Figure 13A:
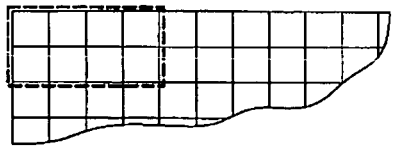
FIG. 13a through FIG. 13c are explanatory diagrams depicting an approach to determining a classification number for each pixel group.

FIG. 13 is an explanatory diagram illustrating the way of thinking for determining the classification numbers for each of the groups of pixels. FIG. 13a illustrates, conceptually, the situation wherein one group of pixels is generated by grouping together eight pixels, four pixels in the horizontal direction×two pixels in the vertical direction, in the top leftmost corner of the image.

Figure 13B:
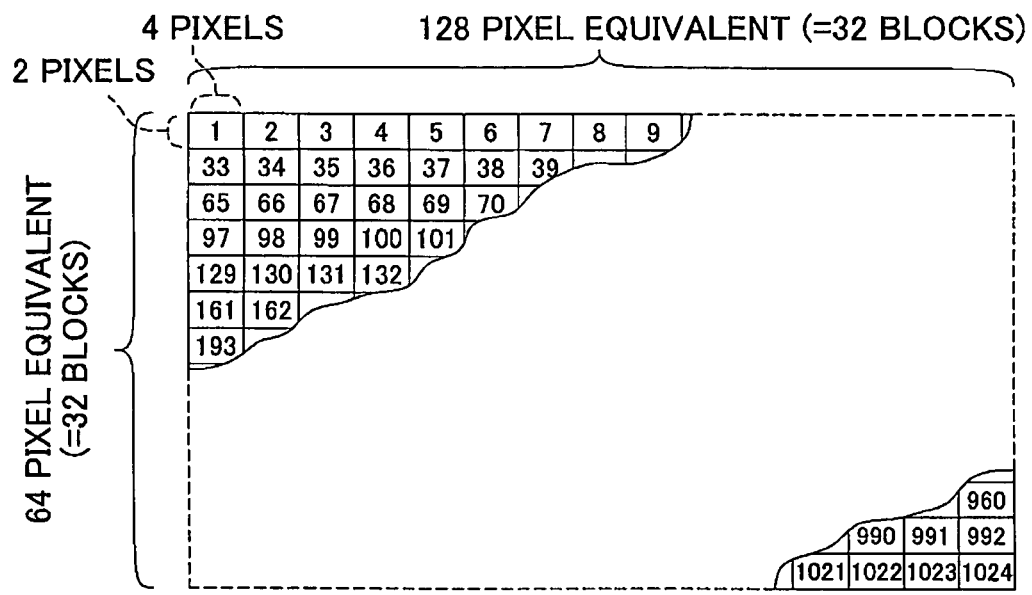

As was described above, a decision is made as to whether or not to form dots for each individual pixel by comparing, using the dithering process, the tone value for the image data assigned to a pixel to the threshold value established in the corresponding position in the dithering matrix. On the other hand, in the present embodiment, a specific number of adjacent pixels are gathered into a group of pixels, so blocks are produced by gathering together a specific number of threshold values, established in the dithering matrix as well, in the same number as in the group of pixels. FIG. 13b illustrates the situation wherein a plurality of blocks is generated by grouping together the threshold values, established in the dithering matrix shown in FIG. 6, in groups that are four in the horizontal direction and two in the vertical direction. The dithering matrix shown in FIG. 6 is 128 pixels in the horizontal direction (the primary scan direction) and 64 pixels in the vertical direction (the secondary scan direction) and so is provided with 8192 pixels worth of threshold values, and thus, if these threshold values are grouped into blocks that are four each in the horizontal direction and two each in the vertical direction, the dithering matrix will be divided into a total of 1024 blocks, 32 blocks both the vertical direction and the horizontal direction.

Figure 13C:
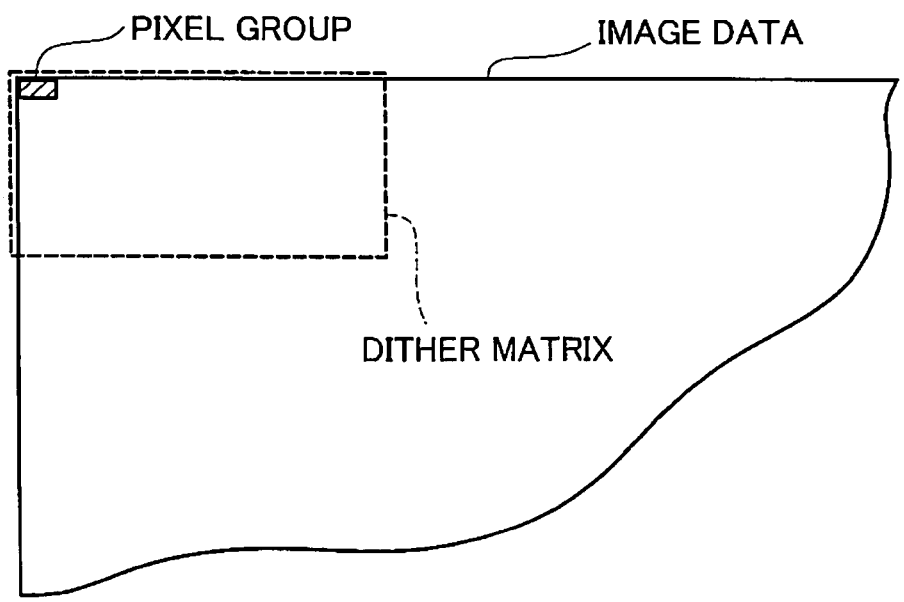

Now, as shown in FIG. 13b, these blocks are assigned serial numbers ranging from 1 through 1024. When the dithering matrix is applied to the image data, the serial numbers of the blocks that are applied to the positions of each of the groups of pixels are used to categorize the groups of pixels. For example, as is shown in FIG. 13c, the block with serial number 1 in FIG. 13b is applied to the group of pixels at the upper leftmost corner of the image, and so the group of pixels is categorized into a group of pixels with classification number 1.

the above is the fundamental approach when categorizing the groups of pixels. In Step S202 in FIG. 11, when the dithering matrix is applied to the image data in this way, each group of pixels is categorized by the serial number of the block that is applied to the group of pixels to perform the process of determining the corresponding classification numbers and assigning them to the groups of pixels.

The specific methods for determining the classification numbers of group of pixels will be explained next. FIG. 14 is an explanatory diagram showing the method for determining a classification number for a group of pixels. FIG. 14a illustrates a single group of pixels generated in the image. The method of determining the classification number will be explained here focusing on this group of pixels. Note that in the below, the group of pixels that is the focus for determining the classification number will be termed the "target group of pixels."

At this point, taking the upper leftmost corner of the image as the origin, the pixel positions are expressed in terms of the number of pixels from the origin the in primary scan direction and the secondary scan direction. Moreover, the position of the group of pixels is expressed by the pixel position of the pixel in the upper left corner of the group of pixels. FIG. 14a shows a black circle on the pixel that indicates the position of the target group of pixels. The pixel position of this pixel is defined as X, Y because the size of each of the groups of pixels is four pixels in the primary scan direction and two pixels in the secondary scan direction, there is an n and an m (where n and m are positive integers, no less than 0) such that X=4n+1 and Y=2 m+1. In other words, n groups of pixels are lined up on the left side of the target group of pixels, and m groups of pixels are lined up above the target group of pixels.

When the dithering matrix is applied to the image data, as described above, the group of pixels is categorized based on the serial number of the block that is applied to the target group of pixels (see FIG. 13), and so a method that applies the dithering matrix to the image data while moving the dithering matrix will categorize even the same group of pixels into categories with different classification numbers. In practice, any method wherein the dithering matrix is applied to the image data while moving may be used, but here, for convenience in explanation, the most simple method, or in other words, the movement of the dithering matrix in the sideways direction, will be explained. FIG. 14 illustrates, conceptually, the situation wherein the dithering matrix is moved a bit at a time in the sideways direction while being applied iteratively to the image data.

14c illustrates, conceptually, the case wherein the dithering matrix is applied to the target group of pixels, shown in FIG. 14a, while using the dithering matrix iteratively as shown in FIG. 14b. When the dithering matrix is moved in this way, one of the blocks in the dithering matrix is applied to the target group of pixels. Here the row M, N block within the dithering matrix is applied to the target group of pixels. At this time, there are n groups of pixels on the left side of the target group of pixels, and n groups of pixels above the target group of pixels, as shown in FIG. 14a, and thus there is the relationships of $$N=n-int(n/32)\times 32+1 \text{ and}$$

$$M=m-int(m/32)\times 32+1$$

between N and n and between M and m, respectively. Here the int is an operator indicating integerizing through truncating any fractional part after the decimal. In other words, int(n/32) represents the integer portion obtained through truncating the numbers after the decimal point from the results of the n/32 calculation. In this way, if the position of the target group of pixels is known, then the block number of the block that is the M row and N column of the dithering matrix, where the values for M and N are calculated from the relationship described above and shown in FIG. 14, are used as the classification number for the target group of pixels. Most practically, the values for M and N can be calculated extremely conveniently, even without performing the calculations as shown in FIG. 14d.

FIG. 15 is an explanatory diagram showing, in specifics, the method of determining the classification number for the target group of pixels. With the position of the target group of pixels defined as (X, Y), X and Y are expressed with 10 bits. (a) in FIG. 15 illustrates, conceptually, ten bits of binary data expressing the value X. In the figure, ten serial numbers, 1 through 10 are assigned, from the first bit through the last bit in order to identify each bit.

As described above using FIG. 14, the quantity n of the groups of pixels to the left of the target group of pixels can be obtained by subtracting 1 from the quantity X and then dividing by four. Here the division by 4 can be performed by shifting two bits worth to the right, and thus 1 should be subtracted from the quantity X and the binary data thus obtained should be shifted by two bits worth to the right. Moreover, the quantity X does not take an arbitrary value, but rather is, of necessity, a value that can be expressed by the formula 4n+1, and so the quantity of groups of pixels n can be obtained through merely bit shifting the binary data two bits worth to the right, without subtracting the 1. (b) in FIG. 15 illustrates, conceptually, the binary data for the quantity n obtained through bit shifting the quantity X in this way.

Next, int (n/32) will be calculated. In to other words, an operation is performed wherein the quantity n is divided by 32 and any digits after the decimal point are truncated. Dividing by 32 can be performed by bit shifting the binary data by five bits worth to the right, and if the data is handled in an integer format, the numbers after the decimal point will be truncated automatically. Essentially, the binary data for int (n/32) can be obtained through simply bit shifting the binary data for the quantity n by five bits to the right. (c) in FIG. 15 illustrates, conceptually, the binary data for int (n/32) obtained through bit shifting the quantity n.

The int (n/32), obtained in this way, is multiplied by 32. Multiplying by 32 can be performed by bit shifting the binary data by five bits to the left. (d) in FIG. 15 illustrates, schematically, the binary data for int (n/32)×32, obtained by bit shifting the quantity n.

Following this, the quantity N, described above, can be obtained by subtracting the quantity n from int (n/32)×32. As is clear by comparing the binary data for the quantity n (see (b) in FIG. 15) with the binary data for int (n/32)×32 (see (d) in FIG. 15), these two binary data are the same in the top five bits, but the value on the side where the subtraction has been performed is 0 for all of the last five bits. Consequently, extracting the bottom five bits from the quantity on the subtraction side (the number n) can produce the desired quantity M. In other words, by merely calculating the logical product of the binary data shown in (b) of FIG. 15 and the mask data shown in (f) of FIG. 15, the quantity N can be obtained extremely easily. Conversely, the quantity N can be obtained through also extracting directly the fourth through eighth bit data through the logical product of the binary data for the quantity x, which indicates the position of the target group of pixels in (a) in FIG. 15, by the mask data such as in (g) in FIG. 15.

While in FIG. 15 there was an explanation of the case wherein the quantity N, which indicates the block position within the dithering matrix, is calculated from the quantity X of the coordinate values (X, Y) that indicate the position of the group of pixels of interest, and the quantity M, which indicates the block position, can be calculated in the exact manner from the quantity Y. Fundamentally, if the position of the target group of pixels is known, then it is possible to know the corresponding block in terms of row and column of the target pixel in the dithering matrix by merely extracting from the binary data the data for the specific bit position, and possible to determine rapidly the classification number of the target group of pixels from the serial number of this block.

C-4. Table for Multilevel Halftoning

As was explained above using FIG. 11, in Step S206 or Step S214 of the process for generating the multilevel halftoning resultant values in the first embodiment performs multilevel halftoning of the representative tone value through referencing a table for multilevel halftoning from the classification number of the group of pixels, obtained in this way, and the representative tone value.

FIG. 16 is an explanatory diagram that illustrates, conceptually, the table for multilevel halftoning in the first embodiment, referenced in order to obtain the multilevel halftoning resultant values from the classification number and representative tone value for the group of pixels. As is shown in the figure, relationships are established in the table for multilevel halftoning, in the first embodiment, with combinations of classification numbers of groups of pixels and representative tone values, where the appropriate multilevel halftoning resultant values are stored. As was described using FIG. 13, there the group of pixels is categorized into any of classification numbers 1 through 1024. Moreover, if the image data is 1-byte data, then the representative tone value will be a tone value between 0 and 255, and thus there will be 1024×256=262,144 combinations of classification numbers and representative tone values. Multilevel halftoning resultant values for all of these combinations are stored in the table for multilevel halftoning. Note that in the present embodiment the multilevel halftoning resultant values are stored in a table that uses the classification number and the representative tone values as the respective parameters, but it is not necessarily a requirement to store the multilevel halftoning resultant values in the form of a table insofar as it is possible to determine the one corresponding multilevel halftoning resultant value given that the classification number and the representative tone value have been determined.

Figure 17:
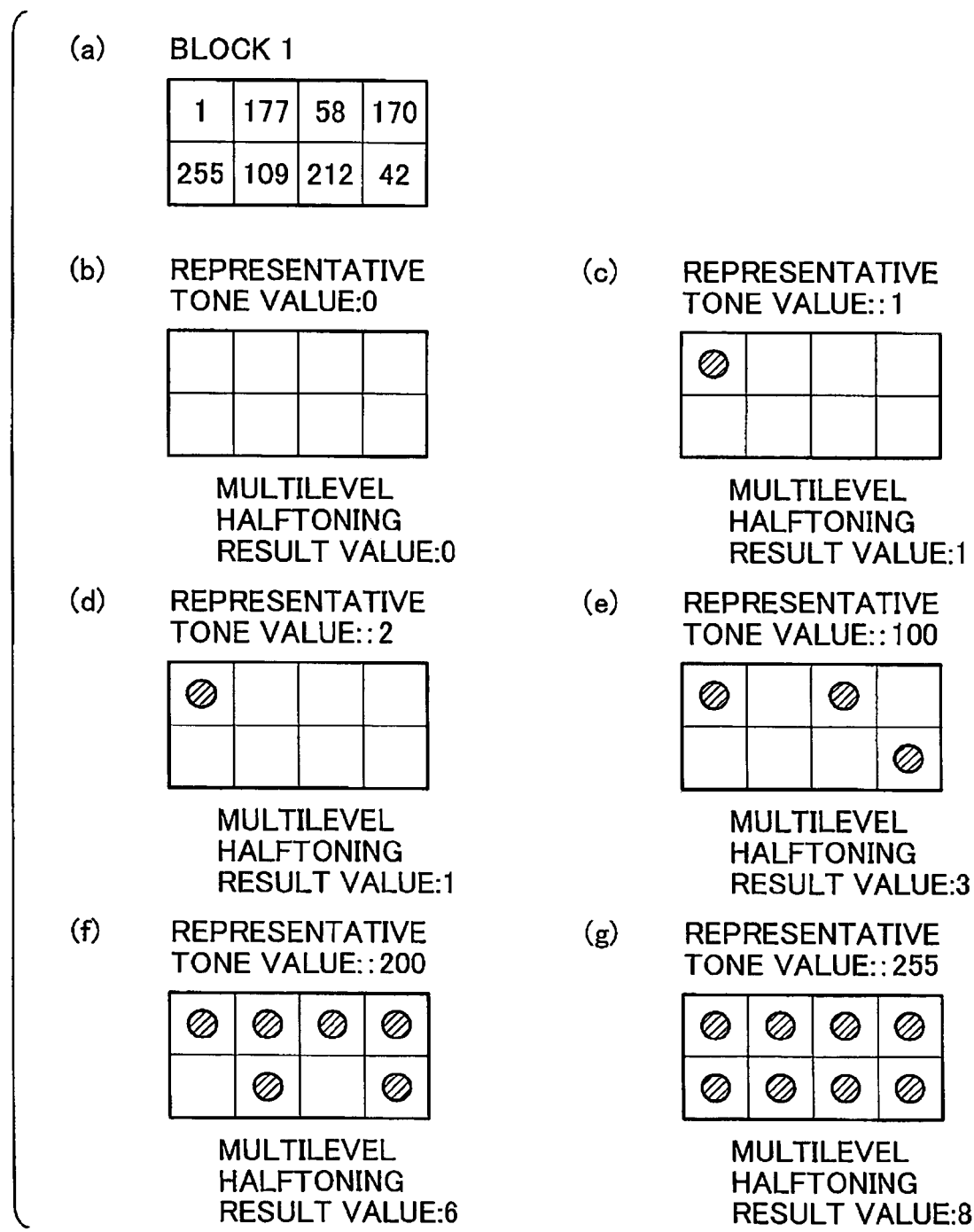
FIG. 17 is an explanatory diagram illustrating conceptually determination of appropriate multilevel halftoning result values according to combinations of representative tone values and pixel group classification numbers.

FIG. 17 is an explanatory diagram illustrating, conceptually the situation wherein the appropriate multilevel halftoning resultant value is determined according to a combination of the classification number of the group of pixels and the representative tone value. As one example, the classification number of the group of pixels shall be assumed to be 1. The block with the serial number of 1 in the dithering matrix is applied to the groups of pixels that have the classification number 1. (a) in FIG. 17 shows the threshold values that are established for the block with the serial number of 1.

Here let us assume that the representative tone value in 0. In this case, all of the pixels in the group of pixels have image data with a tone value of 0. Comparing the tone values of the individual pixels (which are each 0) with the threshold values shown in FIG. 17 (a), the determination is made to form dots for any pixels wherein the tone value is the larger (or the same). After the determination has been performed for each of the individual pixels in the group of pixels, the number of dots is counted, and the number that is obtained is defined as the multilevel halftoning resultant value. All of the threshold values shown in (a) in FIG. 17 are greater than the tone value 0, and thus there are no pixels for which the decision is to form a dot. Given this, the multilevel halftoning resultant value of 0 is set for the combination of the representative tone value of 0 and the classification number. (b) in FIG. 17 shows, conceptually, the situation wherein 0 has been determined as the multilevel halftoning resultant value for the representative tone value 0 in this way.

(c) in FIG. 17 illustrates, conceptually, the situation wherein the multilevel halftoning resultant value is determined for a representative tone value 1 and classification number 1. In this case, all of the pixels in the group of pixels have image data with tone values of 1, and the tone values for the individual pixels are compared to the thresholds shown in (a) in FIG. 17. The result, in the pixel at the upper left corner within the group of pixels is that the tone value for the image data is equal to the threshold value, and so it is determined that a dot will be formed, where, for the other pixels, it is determined that no dots will be formed. The circle marked with the diagonal lines, shown in (c) of FIG. 17 indicates that the decision is that a dot will be formed in that pixel. The result is that, for the combination of the classification number of 1 and the representative tone value of 1, the multilevel halftoning resultant value is set to 1.

The multilevel halftoning resultant values are determined by performing these operations for all representative tone values from 0 to 255. For example, if the representative tone value is 2, then, as shown in (d) in FIG. 17, the multilevel halftoning resultant value would be 1, and if the representative tone value were 100, then, as shown in (e) in FIG. 17, the multilevel halftoning resultant value would be 3. (f) in FIG. 17 and (g) in FIG. 17 illustrate, conceptually, a situation wherein the multilevel halftoning resultant values are determined for the cases wherein the representative tone value are 200 and 255, respectively. The multilevel halftoning resultant values that are set up corresponding to the respective representative tone values in the part of the table for multilevel halftoning, shown in FIG. 16, that is the row (the field that extends in the horizontal direction in the figure) that applies to classification number 1 are values determined in this way. Repeating these operations for all of the classification numbers from 1 through 1024 can ultimately determine the multilevel halftoning resultant values for all possible combinations of classification numbers and representative tone values. The multilevel halftoning resultant values that correspond to the combinations of classification numbers and representative tone values are stored in advance in the table for multilevel halftoning shown in FIG. 16.

C-5. Data Format for the Multilevel Halftoning Resultant Values

As described above using FIG. 11, in Step S210 or Step S216 in the process of generating the multilevel halftoning resultant values in the first embodiment, the multilevel halftoning resultant values obtained are stored, and then, in Step S220, the multilevel halftoning resultant values that have been stored are outputted to the color printer 200. If a group of pixels has not been split, then a single multilevel halftoning resultant value is outputted for the group of pixels, but if a group of pixels has been split, then a plurality of multilevel halftoning resultant values (two multilevel halftoning resultant values in the present embodiment) will be outputted for the group of pixels. Here, as shown in FIG. 16, the table for multilevel halftoning, which is referenced in order to obtain the multilevel halftoning resultant values, is still referenced regardless of whether or not the group of pixels has been split, and as a result, the same types of multilevel halftoning resultant values are obtained regardless of whether or not a group of pixels has been split. Given this, the multilevel halftoning resultant values obtained in Step S210 or Step S216 in FIG. 11 are stored with the following data format in order to discriminate between the multilevel halftoning resultant values obtained for whole groups of pixels and multilevel halftoning resultant values obtained for individual regions within groups of pixels.

Figure 18:
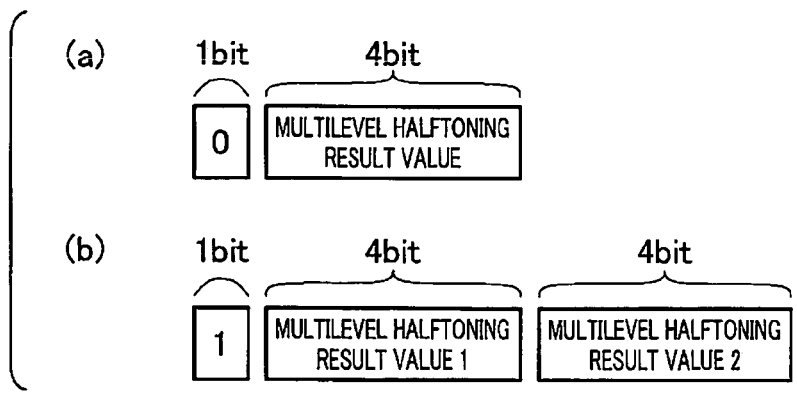
FIG. 18 is an explanatory diagram illustrating an example of a data format for storing multilevel halftoning result values.

FIG. 18 is an explanatory diagram illustrating an example of a data format for storing the multilevel halftoning resultant values. In the example in the figure, the multilevel halftoning resultant value is stored in a state wherein a bit that indicates whether or not the group of pixels has been split is added to the beginning of the multilevel halftoning resultant value. If, for example, the group of pixels has not been split, the one bit of value (0) data is added to the beginning of the multilevel halftoning resultant value, as shown in (a) in FIG. 18. Here the groups of pixels are structured from eight individual pixels, and the multilevel halftoning resultant values represent the number of dots that will be formed within the group of pixels, and thus, as described above, 4 bits are sufficient for a single multilevel halftoning resultant value. Consequently, for those groups of bits that are not split, the multilevel halftoning resultant value will be stored with a total of five bits of data, including the additional one bit at the beginning.

Moreover, when the group of pixels has been split, the multilevel halftoning resultant values are stored sequentially for the respective regions following one bit of value (1) data, as shown in (b) in FIG. 18. In the present embodiment, the only splitting pattern is one wherein the group of pixels is split into two regions, one on the left and one on the right, and so if the first bit is 1, then two multilevel halftoning resultant values, each comprising four bits, will follow, corresponding to the left and right regions.

Consequently, for a group of pixels that has been split, the multilevel halftoning resultant values will be stored with a total of nine bits of data. Note that the patterns for splitting groups of pixels are not necessarily limited to patterns wherein the group of pixels is split into regions, but rather splitting into a larger number of regions is also possible. For example, if the group of pixels is split into four regions, then following the one bit of data indicating that the group of pixels is split there would be four sets of 4-bit data indicating the multilevel halftoning resultant values for the respective regions, so that the multilevel halftoning resultant values would be stored in data totaling 17 bits long.

Figure 19:
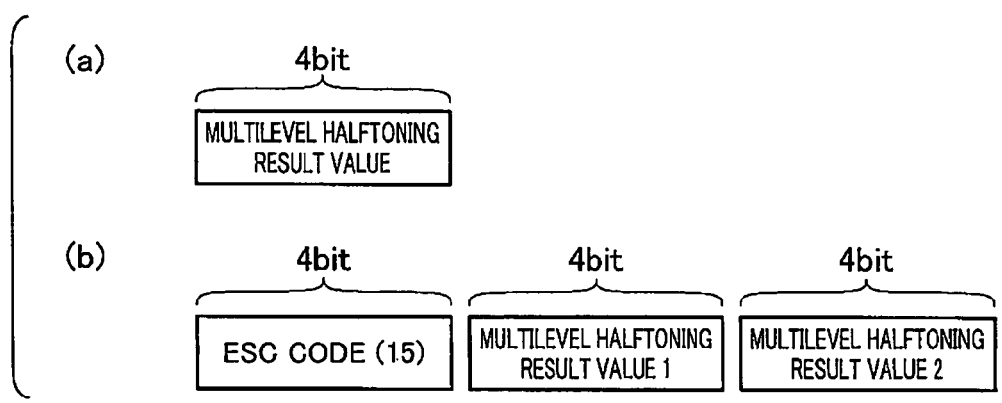
FIG. 19 is an explanatory diagram illustrating another example of a data format for storing multilevel halftoning result values.

FIG. 19 is an explanatory diagram illustrating another example of a data format for storing the multilevel halftoning resultant values. As is shown in the figure, the multilevel halftoning resultant values may be stored along with data indicating that there has been a split only when the group of pixels has been split. In other words, for those groups of pixels that have not been split, only the multilevel halftoning resultant values are stored as is, as shown in (a) in FIG. 19. On the other hand, for those pixels that have been split, the multilevel halftoning resultant values for the individual regions may be stored following special data that indicates that the group of pixels has been split, such as shown in (b) in FIG. 10. It does not matter what data is used as the special data that indicates that the group of pixels has been split (where this type of data is termed an "ESC code," below) insofar as the data can be discriminated from the multilevel halftoning resultant values. For example, in the present embodiment, the multilevel halftoning resultant values are expressed in 4-bit data, and so there are 16 different states that can be expressed; however, the multilevel halftoning resultant values can actually only assume one of nine different states, and thus it is calculated that there are five unused states leftover. Given this, one of the unused states can be selected for use as the ESC code that indicates that a group of pixels has been split. In the example shown in FIG. 19, data wherein all four bits are 1's (which, in decimal notation, is a 15) is used as the ESC code.

Figure 20:
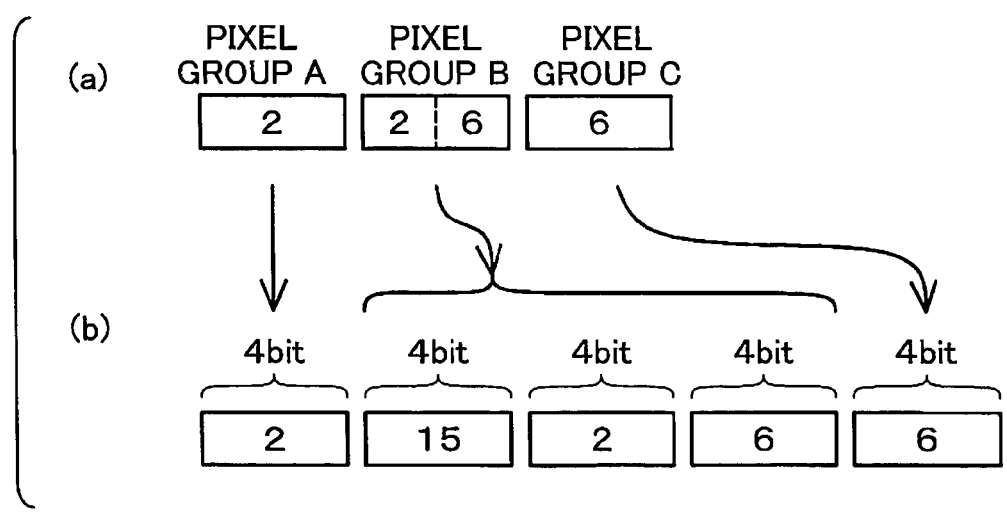
FIG. 20 is an explanatory diagram depicting storage of multilevel halftoning result values together with ESC codes.

FIG. 20 is an explanatory diagram showing the state wherein the multilevel halftoning resultant value is stored along with an ESC code.

The example shown in (a) in FIG. 20 assumes that there are three groups of pixels, and that the center group of pixels has been split. The multilevel halftoning resultant value obtained for the group of pixels on the left is 2, the multilevel halftoning resultant value obtained for the group of pixels on the right is 6, and the respective multilevel halftoning resultant values obtained for the group of pixels in the middle are 2 and 6. When storing these multilevel halftoning resultant values, the group of pixels on the left have not been split, so the multilevel halftoning resultant value of 2 is first stored as is. The next group of pixels has been split, and so first the ESC code 15, which indicates that the group of pixels has been split is stored, followed by the multilevel halftoning resultant value 2, which was obtained for the region on the left, and then by the multilevel halftoning resultant value 6, which was obtained for the region on the right. In other words, for a group of pixels that has been split, the data length is the same as that of three groups of pixels that have not been split. Following this, the multilevel halftoning resultant value is stored for the group of pixels on the right. Because this group of pixels has not been split, the multilevel halftoning resultant value 6 that has been obtained may be stored as is.

When storing the multilevel halftoning resultant values, either the data format shown in FIG. 18 or the data format shown in FIG. 19 may be used, and there will be the following characteristics depending on the format of the data that is used. That is, given the data format in FIG. 18, one bit of data may be added, in addition to the multilevel halftoning resultant values for each region, to indicate that a group of pixels has been split, while, in contrast, in the data format according to FIG. 19, it is necessary to add a 4-bit ESC code to the multilevel halftoning resultant values for each region. Because of this, the use of the data format in FIG. 18 makes it possible to conserve three bits worth of data per group of pixels for those groups of pixels that are split. On the other hand, for those groups of pixels that are not split, in the data format in FIG. 18 it is necessary to add, to the multilevel halftoning resultant value for the group of data, one bit of data indicating that the group of data is not split, where, in contrast, in the data format in FIG. 19 the multilevel halftoning resultant value for the group of data can be stored as is. Consequently, for those groups of pixels that are not split, the use of the data format in FIG. 19 is able to conserve one bit of data volume for each group of pixels. Given this, when there are many groups of pixels that are split, the method of storing the multilevel halftoning resultant values using the data format in FIG. 18 is able to conserve data volume, while, conversely, if few groups of pixels are split, then the use of the data format in FIG. 19 can be seen to conserve data volume. Because, as described above, in image data similar tone values are often obtained for neighboring pixels, the proportion of groups of pixels that will be split is not particularly high, and thus usually the use of the data format shown in FIG. 19 will enable the storage of the multilevel halftoning resultant values with smaller data volumes.

Figure 21:
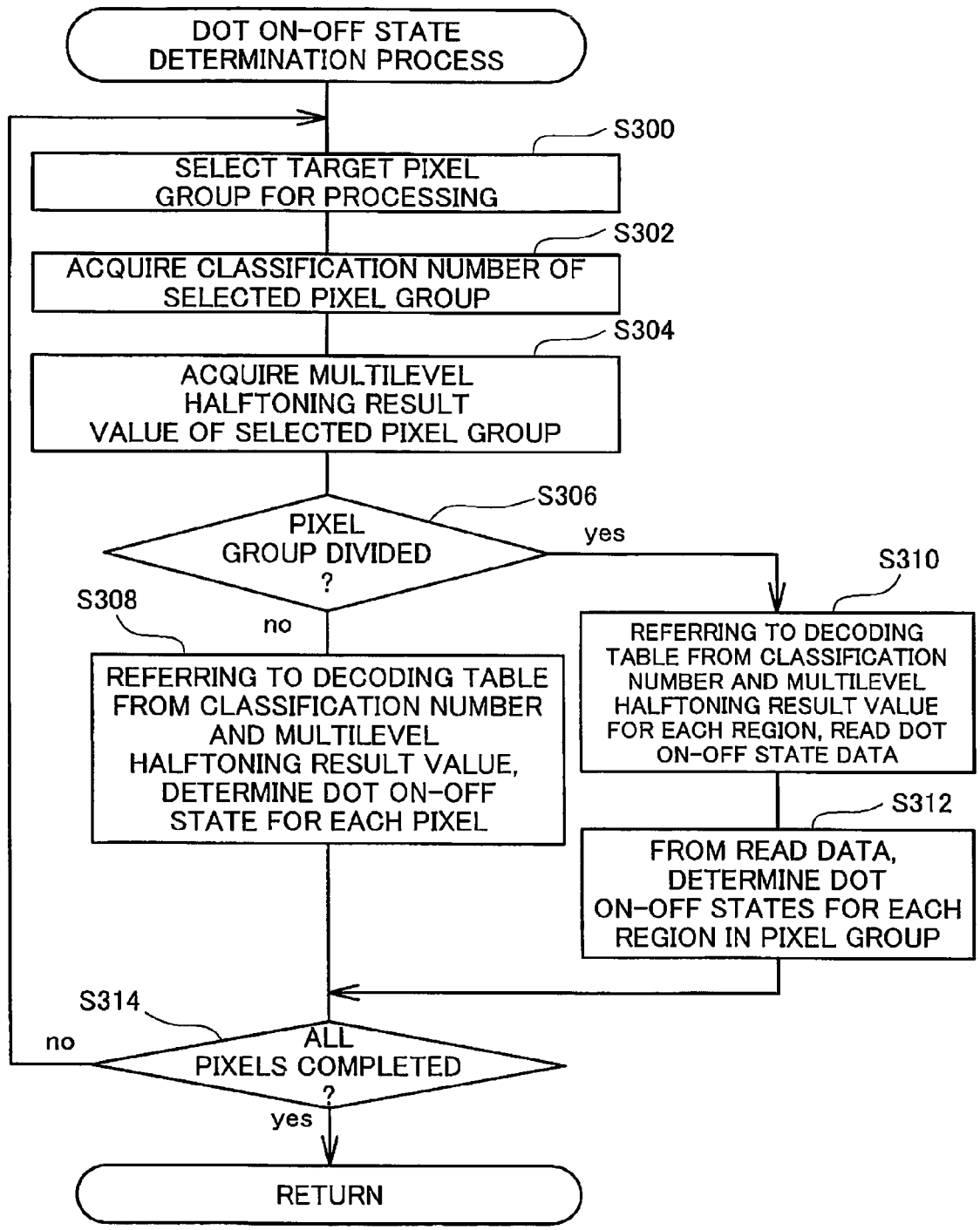
FIG. 21 is a flowchart illustrating the flow of the process for determining dot on-off states in First Embodiment.

C-6. Dot On-Off State Determination Process of First Embodiment:

Next, the description shall turn to the process of determining dot on-off state for each pixel in a pixel group based on the multilevel halftoning resultant values, in the image printing process of The first embodiment discussed above (Step S108 in FIG. 5). FIG. 21 is a flowchart illustrating the flow of the process for determining dot on-off states in The first embodiment. The process is executed by a CPU housed in the control circuit 260 of the color printer 200. The process of determining dot on-off state for the individual pixels within the pixel group, based on the multilevel halftoning resultant values, will be explained below, in accordance with the flowchart.

Once the process for determining dot on-off state is initiated, first, a single pixel group is selected for processing (Step S300), and a classification number for the pixel group is acquired (Step S302). As in the dot on-off state determination process of The first embodiment discussed earlier, a classification number for the pixel group can be acquired quickly from the location of the pixel group in the image.

FIG. 22a through FIG. 22c are explanatory diagrams depicting the method for determining the classification number of a pixel group. Let it be assumed that the pixel group currently targeted for determination of dot on-off state is situated at the location of the i-th pixel group in the primary scan direction, and of the k-th pixel group in the secondary scan direction, from the uppermost left corner of the image, as depicted in FIG. 22a. The location of this pixel group shall be represented by the coordinates (i, j). Since the size of a dither matrix is not typically large like the image, the dither image can be used repeatedly while moving it in the primary scan direction, as discussed earlier with reference to FIG. 14b.

Since the dither matrix contains 32 blocks each in the primary scan and secondary scan directions (see FIG. 13b), where the location of the target pixel group within the dither matrix is row I, column J, I and J can be derived respectively by the following equations.

$$I=i-int(i/32)\times 32$$

$$J=j-int(j/32)\times 32$$

Here, int is the operator described earlier, representing by rounding to the decimal point. Accordingly, by applying the above equations to the coordinates (i, j) to derive I, J, it is determined that the pixel group is situated in row I, column J in the dither matrix. Thus, the classification number can now be calculated from:

$$I+(J-1)\times 32 \qquad (1)$$

The value I, J representing the location of the pixel group within the dither matrix can also be calculated in an extremely simple fashion without carrying out calculations like those described above, simply by extracting a predetermined number of bits of data from the binary representation i, j. FIG. 23 is an explanatory diagram depicting a specific method for calculating the location of a pixel group within a dither matrix, from the coordinates (i, j) of the pixel group. In FIG. 23, (a) depicts conceptually data consisting of a 10-bit binary string representing the numerical value i. (a) in FIG. 23, in order to identify each bit, they are shown assigned serial numbers from 1 to 10, in order from the highest-order bit to the lowest-order bit.

During calculation of the value I representing the location of the pixel group, first, int (i/32) is calculated. This operation can be carried out by bit shifting the binary data of i by 5 bits to the right (see (b) in FIG. 23). Next, int (i/32)×32 is calculated. This operation can be carried out by bit shifting the binary data of int (i/32) by 5 bits to the left (see (c) in FIG. 23). Finally, by subtracting int (i/32)×32 from the numerical value i, the desired numerical value I can be derived. Ultimately, this procedure merely entails extracting only the five lowest-order bits from the binary data of the numerical value i, making it possible to derive the numerical value I extremely easily. Similarly, it is possible to derive the numerical value J extremely easily, by extracting only the five lowest-order bits from the binary data of the numerical value j. Once the numerical values I and J have been derived in this way, a classification number can be calculated using Eq. (1) given previously. In Step S302 of FIG. 21, the classification number of the pixel group selected as the target for processing is acquired in the above manner.

Next, after acquiring the multilevel halftoning result value derived for the selected pixel group (Step S304), it is decided, on the basis of the read-in multilevel halftoning result value, whether the pixel group has been divided (Step S306). As described with reference to FIG. 18, in the event that the multilevel halftoning result value is of a form having appended to its head a bit indicating division/no division of a pixel group, if the lead bit is "0" it can be decided that the pixel group is not divided, whereas if the lead bit is "1" it can be decided that the pixel group is divided. On the other hand, where pixel group division/no division is represented using an ESC code as depicted in FIG. 19, if the lead data of the read-in multilevel halftoning result value is an ESC code, it can be decided that the pixel group is not divided, whereas if not it can be determined to be undivided. Here, since the only pattern for dividing the pixel groups is a pattern that divides the pixel groups into regions which are equal left and right halves, for divided pixel groups, it suffices to read in two multilevel halftoning result values.

Of course, the form of dividing the pixel groups is not limited to a pattern dividing the pixel groups in two left to right, it being possible instead to divide them in two vertically, or into a greater number of regions, for example.

It is additionally possible to use multiple division patterns in a selective manner. Specifically, where multilevel halftoning result values are stored in memory in the data format depicted in FIG. 18, by increasing the number of bits of data appended to the head, it is possible to specify not only division/no division of a pixel group, but also division patterns; a number of multilevel halftoning result values corresponding to the division pattern specified by this data would then be read in. Where multilevel halftoning result values are stored in memory in the data format depicted in FIG. 19, it is possible to increase the number of types of ESC codes to enable different division patterns to be specified, and where a pixel group is divided, to read in a number of multilevel halftoning result values corresponding to the division pattern. A fuller description of the case where multiple division patterns have been prepared will be made later.

Where a pixel group is not divided (Step S306: no), the dot on-off state of each pixel within the pixel group is determined by unit of referring to a decoding table on the basis of the multilevel halftoning result value and classification number of the pixel group (Step S308). The decoding table stores data representing dot on-off state for each pixel in the pixel group, and by reading out the data it is possible to determine dot on-off states quickly.

FIG. 24 is an explanatory diagram illustrating conceptually a decoding table referred to in the dot on-off state determination process of the first embodiment. As illustrated, the decoding table referred to in the first embodiment contains data representing dot on-off state for each pixel within the pixel group data, associated with combinations of pixel group classification numbers and multilevel halftoning result values. Hereinafter, the data representing the dot on-off state for each pixel shall sometimes be referred to as dot data DD. Dot data DD (i, j) denotes dot data for the pixel group having the i-th classification number and whose multilevel halftoning result value is "j."

FIG. 25a and FIG. 25b are explanatory diagrams depicting the data structure of dot data DD established in the decoding table of the first embodiment. As shown in FIG. 25a, dot data DD is 8-bit data in which each bit has been previously associated with one of eight pixels in a pixel group. In the illustrated example, the lead bit of the dot data DD (the bit labeled (1) in the drawing) is associated with the pixel in the upper left corner of the pixel group, and the second bit from the beginning (the bit labeled (2) in the drawing) is associated with the second pixel from the left in the upper row of the pixel group. The remaining bits are similarly associated with the other pixels within the pixel group. In this way, in this embodiment the dot data DD is composed of 8-bit data so as to correspond to the fact that pixel groups are composed of eight pixels. Accordingly, where N is the pixel count within pixel groups, the dot data DD will be composed of N-bit data.

In the dot data DD, bits set to "1" denote that a dot is formed on the corresponding pixel, and bits set to "0" denote that no dot is formed on the corresponding pixel. In the dot data DD shown in FIG. 25a, the lead bit and the seventh bit have been set to "1", while the other bits have been set to "0" bits, representing the fact that, as depicted in FIG. 25b, a dot is formed on the pixel at the upper left edge of the pixel group and on the third pixel from the left in the lower row. In Step S308 in FIG. 21, by unit of reading out this kind of dot data DD by referring to the decoding table depicted in FIG. 24, a process of determining dot on-off state for each pixel in the pixel group currently selected as the processing target is carried out. The method for setting up as decoding table like that depicted in FIG. 24 will be described later.

On the other hand, where a pixel group has been divided (Step S306: yes), multilevel halftoning result values will have been derived for each region produced by division of the pixel group. In this embodiment, where a pixel group has been divided, it will have been divided into regions which are equal left and right halves (see FIG. 12), and thus two multilevel halftoning result values will have been derived for the divided pixel group. Accordingly, by combining each of the multiple derived multilevel halftoning result values with the classification number of the pixel group, and referring to the decoding table depicted in FIG. 24, dot data DD corresponding to each combination is read out (Step S310). That is, for a divided pixel group, multiple items of dot data DD will be derived as well. By extracting data for each region from these multiple items of dot data DD, the dot on-off state for each pixel in the pixel group is determined (Step S312).

Figure 26:
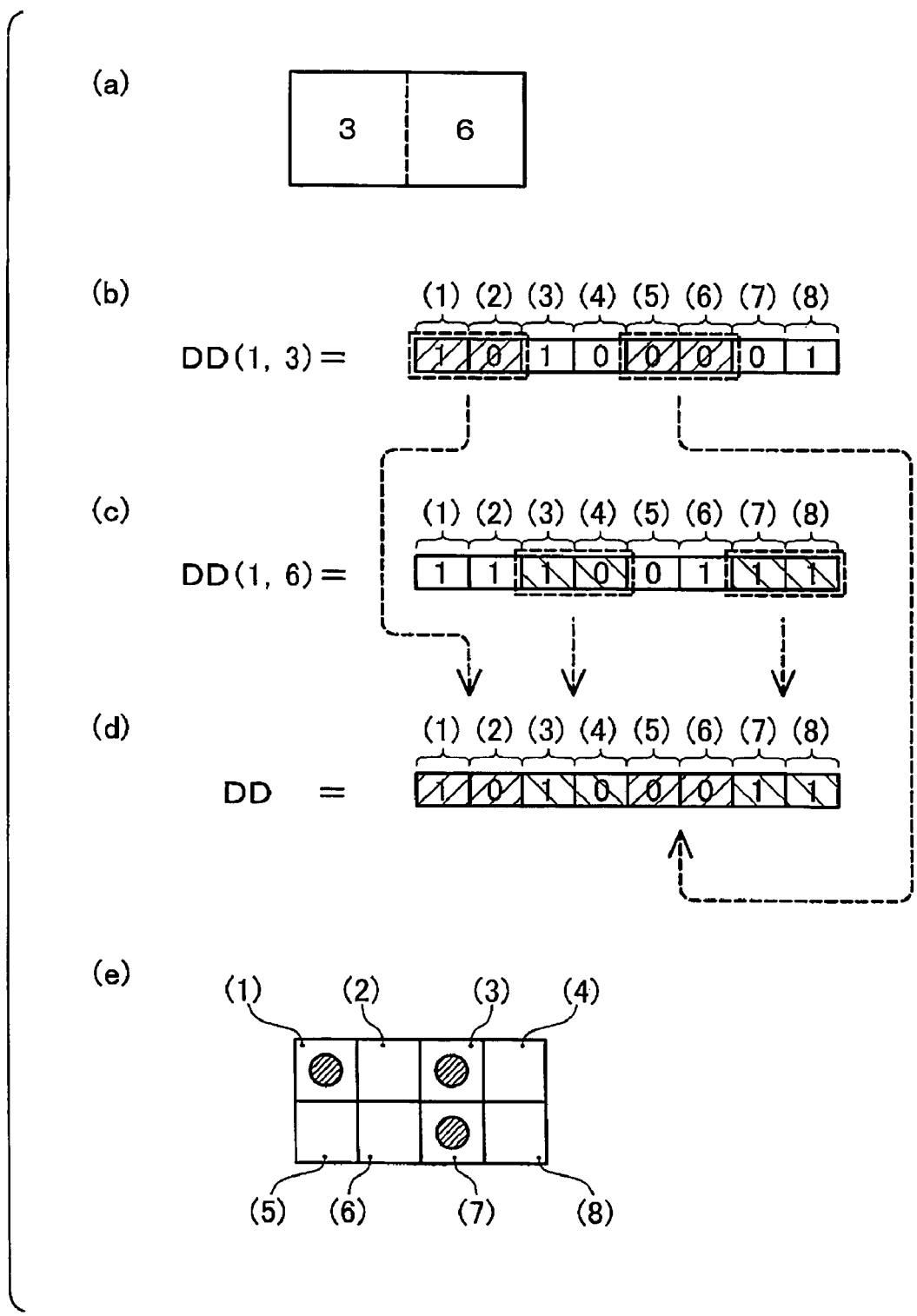
FIG. 26 is an explanatory diagram illustrating determination of dot on-off state for each pixel in a pixel group, by combining multiple items of dot data DD.

FIG. 26 is an explanatory diagram illustrating determination of dot on-off state for each pixel in a pixel group, by combining multiple items of dot data DD. Here, the classification number of the pixel group is "1"; as shown in FIG. 26 (a), the multilevel halftoning result value for the region on the left is "3", and the multilevel halftoning result value for the region on the right is "6."

First, by referring to the decoding table, the dot data derived from the region at left in the pixel group is acquired. Since the classification number of the pixel group is "1" and the multilevel halftoning result value for the region on the left is "3", for the region on the left, there is derived dot data DD (1, 3) corresponding to this combination. Similarly, for the region on the right in the pixel group, there is derived dot data DD (1, 6) corresponding to the combination of the classification number of 1 and the multilevel halftoning result value of 6.

As described previously with reference to FIG. 25, each bit of dot data DD is associated with a pixel in the pixel group. In this embodiment, since the divided pixel group is divided into regions which are equal left and right halves, in the dot data DD (1, 3) derived for the region on the left, the data which is actually used consists only of the lead bit, and the second, fifth, and sixth bits after the lead bit. The reason is that these bit are associated with the pixels of the region on the left side. In FIG. 26 (b), those bits that are actually used in the dot data DD derived for the region on the left side are represented with hatching. Similarly, for the dot data DD (1, 6) derived for the region on the right, two equal regions, in the dot data DD (1, 3) derived for the region on the left, the data which is actually used consists only of the third, fourth, seventh, and eighth bits from the beginning. In FIG. 26 (c), those bits that are actually used in the dot data DD derived for the region on the right side are represented with hatching.

By extracting and combining the data of the portions that will actually be used from dot data derived for the left and right regions respectively in this way, there can be derived final dot data DD for the pixel group targeted for processing. FIG. 26 (d) depicts conceptually final dot data DD synthesized in this way. FIG. 26 (e) shows dots formed on pixels in the pixel group, in accordance with the final dot data DD.

In the preceding description, the four bits making up the first half of the dot data DD are associated with the four pixels in the upper row of the pixel group (i.e., the pixels numbered 1 through 4 in FIG. 25b), while the four bits making up the latter half of the dot data DD are associated with the four pixels in the lower row of the pixel group (i.e., the pixels numbered 5 through 8 in FIG. 25b). In this embodiment, however, since where a pixel group is divided it is divided into two regions left and right, bits of dot data DD may be associated with pixels in consideration of this division pattern.

Figure 27A:
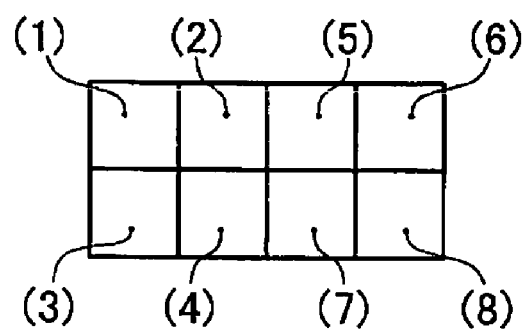
FIG. 27a and FIG. 27b are explanatory diagrams depicting association of bits of dot data and with the pixels in a pixel group, in consideration of the division pattern of the pixel group.
Figure 27B:
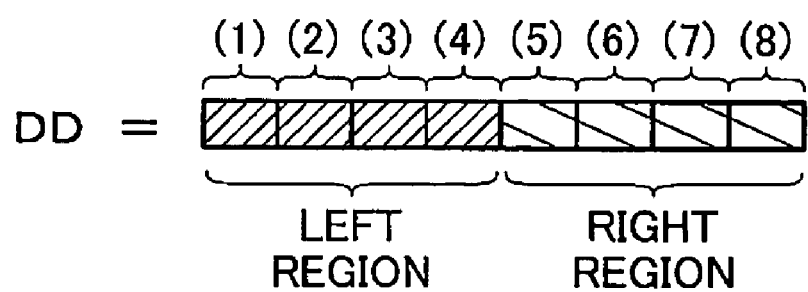

FIG. 27a and FIG. 27b are explanatory diagrams depicting association of bits of dot data and with the pixels in a pixel group, in consideration of the division pattern of the pixel group. FIG. 27a depicts pixels numbered from (1) to (8) in a pixel group. FIG. 27b depicts the pixels from (1) to (8) associated with the bits of dot data DD. In the example shown in FIG. 27, the four bits of the first half of the dot data DD are associated with the four pixels of the region to the left side of the pixel group, while the four bits of the latter half of the dot data DD are associated with the four pixels of the region to the right side of the pixel group. By so doing, when referring to the decoding table, the final dot data can be obtained not by reading out the dot data DD (1, 3) and the dot data DD (1, 6), but simply by reading out the first half portion and the second half portion of the dot data respectively, and combining them. FIG. 27b conceptually depicts final dot data synthesized in this way.

In Step S312 of FIG. 25, a process to determine the dot on-off state of each pixel in the pixel group is carried out by combining dot data obtained for each region in the manner described previously.

Once the dot on-off state of each pixel in the selected pixel group has been determined in this way, it is decided whether determination of dot on-off state has been made for all pixel groups contained in the image (Step S314). In the event that any unprocessed pixel groups remain (Step S314: no), the routine returns to Step S300, whereupon a new pixel group is selected and the series of processes described above is carried out. If after repeating the above procedure it is now decided that determination of dot on-off state has been made for all pixel groups (Step S314: yes), the dot on-off state determination process of the first embodiment depicted in FIG. 21 terminates, returning to the image printing process of FIG. 5.

At this point, the method of setting up the decoding table shown in FIG. 24 shall be described. The decoding table is set up based on the general principle described previously with FIG. 9, namely, the general principle of determining pixels on which dots are formed, using the number of dots formed within a pixel group, and threshold values established at locations corresponding to pixel groups in the dither matrix.

Figure 28:
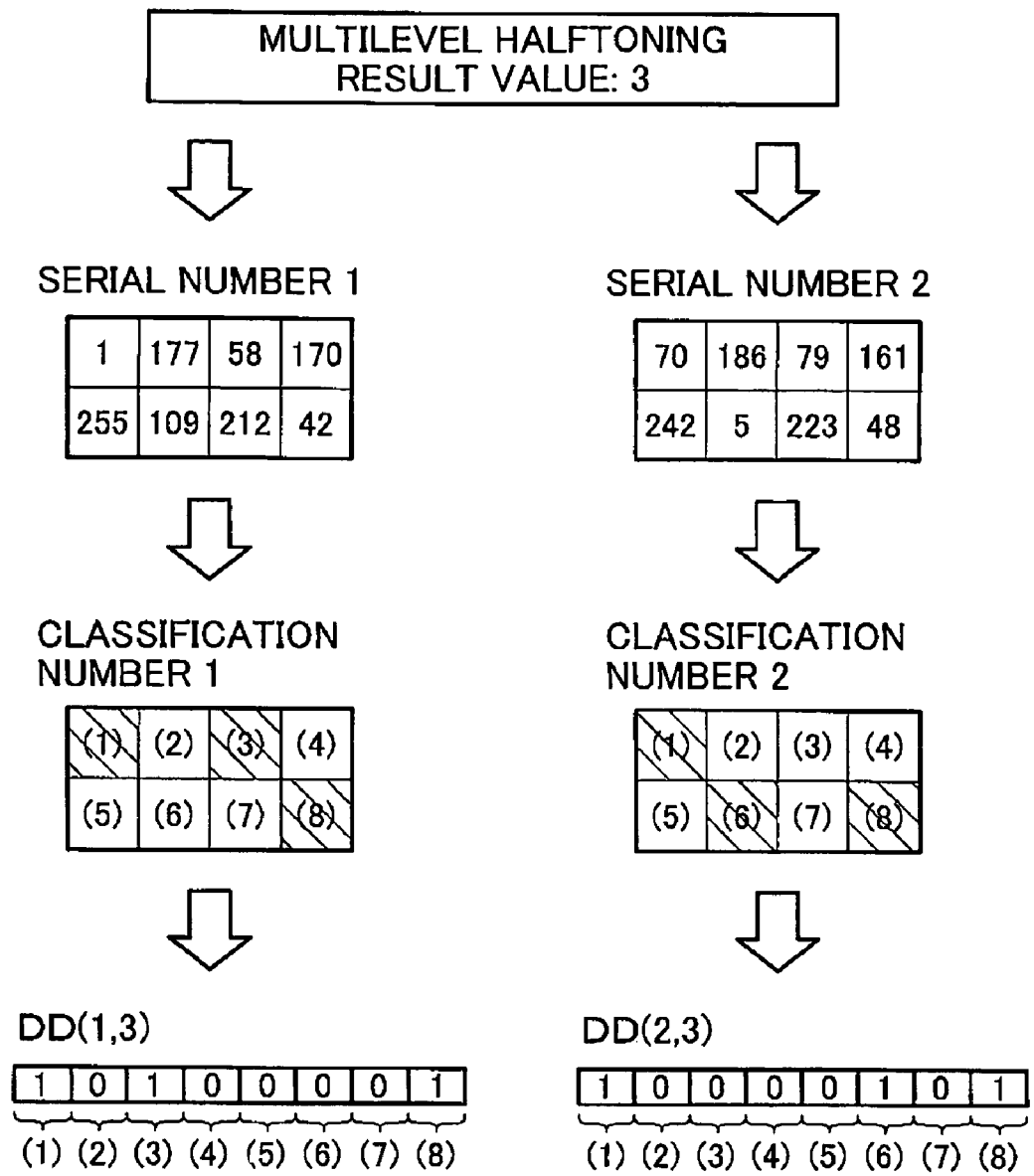
FIG. 28 is an explanatory diagram depicting a method for setting up the decoding table referred to in the dot on-off state determination process of First Embodiment.

FIG. 28 is an explanatory diagram depicting a method for setting up the decoding table referred to in the dot on-off state determination process of the first embodiment. Here, the multilevel halftoning result value of the pixel group is "3"; the left half of FIG. 28 depicts a situation in which dot data DD (1, 3) is determined for the pixel group of classification number 1, and the right half of FIG. 28 depicts a situation in which dot data DD (2, 3) is determined for the pixel group of classification number 2. As described previously with reference to FIG. 13, the block of serial number 1 in the dither matrix corresponds to the pixel group of classification number 1, and the block with serial number 2 corresponds to the pixel group with classification number 2. In the second row from the top in FIG. 28 there are shown threshold values established in the block of serial number 1 and threshold values established in the block of serial number 2, in the dither matrix.

As described previously with reference to FIG. 9, the threshold values established in the dither matrix can be thought of as representing the ease with which dots may be formed, with a smaller threshold value meaning that it is easier for a dot to be formed. Specifically, for the block with serial number 1, it will be easiest for a dot to be formed on the pixel having the threshold value "1", with dots being easier to form on the pixel having the threshold value "42", the pixel having the threshold value "58", and the pixel having the threshold value "109" in that order. The multilevel halftoning result value represents the dot count of the pixel group. Accordingly, for the pixel group of classification number 1, it can be decided to form dots on the pixel for which a threshold value of "1", on the pixel for which a threshold value of "42", and on the pixel for which a threshold value of "58" have been respectively established in the block of serial number 1. Similarly, for the pixel group of classification number 2, it can be decided to form dots on the pixel for which a threshold value of "5", on the pixel for which a threshold value of "48", and on the pixel for which a threshold value of "70" have been respectively established in the block of serial number 2. The third row from the top in FIG. 28 shows the results of determination of dot on-off states for pixels in the pixel groups in this way, with pixels on which dots are formed shown with hatching.

Once the dot on-off state for each pixel in the pixel group has been determined in this way, the data, expressed in the data format described with reference to FIG. 25, will be written to the applicable locations in the decoding table. For example, in the case of the pixel group of classification number 1 shown at left in FIG. 28, since dots are formed on the pixels numbered 1, 3, and 8, the dot data DD will consist of data in which the first, third, and eighth bits from the beginning are set to "1", with other bits being set to "0." This data is stored in the decoding table as dot data DD (1, 3). By carrying out the above procedure for combinations of all multilevel halftoning result values and all classification numbers, and storing the dot data items derived thereby in applicable locations, a decoding table like that shown in FIG. 24 can be established. In the dot on-off state determination process of the first embodiment described previously, the dot on-off states of pixels in a pixel group are determined while referring to the decoding table established in this way.

The process for generating multilevel halftoning result values (Step S106 in FIG. 5) and the process for determining dot on-off state (Step S108 in FIG. 5) in the image printing process of the first embodiment have been described in detail above. In the multilevel halftoning result value generation process described above, pixel groups that are sets of a specific number of pixels are generated, and after determining representative tone values and classification number for the pixel groups, multilevel halftoning result values are generated. As described above, pixel group classification numbers and representative tone values be derived easily, and multilevel halftoning result values can be obtained extremely easily by making reference to a multilevel halftoning table. Multilevel halftoning result values obtained in this way the represent a substantially smaller amount of data as compared to data indicating dot on-off states of individual pixels, thereby enabling data to be output extremely quickly from the computer 100 to the color printer 200.

Moreover, on the basis of the tone values of the pixels that make up a pixel group, a decision is made as to whether to divide the pixel group, and where it is decided to divide the pixel group, a plurality of multilevel halftoning result values are created. In this way, when a pixel group is divided, the number of the multilevel halftoning result values to be output for the pixel group increases, and there is a corresponding increase in the amount of data needing to be supplied to the printer 20; however, as described above, there is a tendency in image data for there to be similar tone values in neighboring pixels, and thus in actual practice the percentage of pixel groups that are divided is small, and so the increase in the amount of data is insignificant. Fundamentally, the multilevel halftoning result value creation process described above enables creation and output of multilevel halftoning result values to be carried out rapidly.

Additionally, in the dot on-off state determination process described above, when the multilevel halftoning result values are received rapidly from the computer 100, the dot on-off state of each pixel is determined by referring to the decoding table. Where determinations are made while referring to the decoding table in this way, it is possible to rapidly determine the dot on-off state of each pixel within a pixel group. Additionally, for divided pixel groups, upon receiving the multilevel halftoning result value of each divided region, the dot on-off state for each pixel in each respective region can be determined. Thus, even where tone values vary within a pixel group, dot on-off states can be determined appropriately depending on the tone value distribution, making it possible to obtain images of high picture quality.

Moreover, due to the ability to refer to a multilevel halftoning table or decoding table respectively, the process for creating multilevel halftoning result values and the process for determining dot on-off states of pixels in pixel groups are both relatively simple processes, and can be executed rapidly. Thus, for either process, it is possible for processing to be carried out at practicable speeds, even by a device not equipped with sophisticated data processing capabilities like those of the computer 100.

Additionally, in the image printing process described above, the multilevel halftoning table referred to when creating multilevel halftoning result values, and the decoding table referred to when determining dot on-off states, can respectively be the same regardless of whether or not a pixel group has been divided. Further, as will be discussed later in a Variation Example, even where a pixel group has been divided, the same multilevel halftoning table or decoding table can be referred to regardless of the sort of regions created by division. Thus, there is not need to store different multilevel halftoning tables and different decoding tables depending on whether a pixel group is divided or not, or for each different mode of division, and thus large memory capacity is not required. Consequently, the image printing process described above can be performed in a device that does not have a large memory.

C-7. Modifications of First Embodiment:

There are a variety of modifications of the image printing process according to the first embodiment described above. These modifications are described briefly below.

(1) First Modification:

In the first embodiment described above, there was described a case in which there is only a single pattern for dividing pixel groups. However, a multiplicity of division patterns may be prepared, and an appropriate pattern selected depending on the distribution of tone values within the pixel group. The first modification shall be described below.

Figures 29, 30:
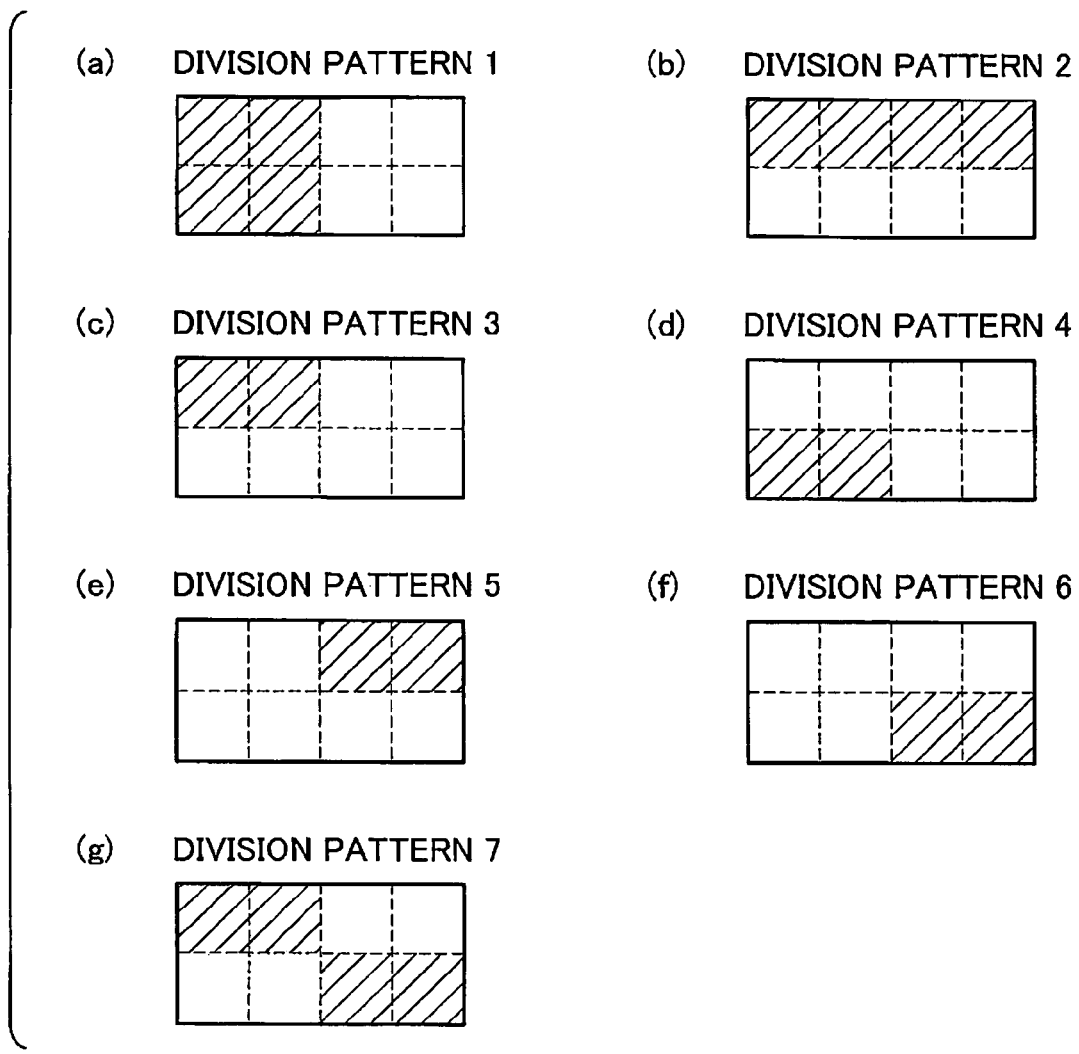
FIG. 29 is an explanatory diagram depicting division patterns used in an alternative embodiment of First Embodiment.
FIG. 30 is an explanatory diagram illustrating an example of ESC codes that indicate division patterns in an alternative embodiment of First Embodiment.

FIG. 29 is an explanatory diagram depicting division patterns used in the first modification of the first embodiment. As illustrated, seven types of division patterns are provided. Division pattern 1 depicted in (a) in FIG. 29 is a pattern wherein the pixel group is divided into two equal left and right regions, as in the embodiment described above. The division pattern shown in (b) of FIG. 29 divides the pixel group top and bottom into two equal regions. The next four division patterns are patterns in which four regions are created by splitting the pixel group into equal halves both vertically and horizontally, followed by bifurcation into one region selected from among these four, and another region. Specifically, the division pattern shown in (c) in FIG. 29 is a pattern wherein the pixel group is split into two parts, namely, a region in the upper left corner and another region. The division pattern shown in (d) of FIG. 29 divides the pixel group into a region in the upper right corner and another region; the division pattern shown in (e) of FIG. 29 divides the pixel group into a region in the lower left corner and the another region; and the division pattern shown in (f) of FIG. 29 divides the pixel group into a region in the lower right corner and another region.

The above four division patterns end up dividing the pixel group into regions of unequal size. The final division pattern shown in (g) of FIG. 29 is a division pattern dividing the pixel group into two regions selected in the diagonal direction from among the four regions in the pixel group, and another region crossing it.

In the first modification depicted in FIG. 29, seven types of division patterns are provided in this way, and the multilevel halftoning result values for the pixel group are created as described below. A brief description will be given below with reference to the flowchart in FIG. 11 used previously in describing the multilevel halftoning result value creation process in the first embodiment.

In the first modification of the first embodiment, when creating multilevel halftoning result values, first, the pixel groups are created and classification numbers are determined (corresponds to Steps S200 and S202 in FIG. 11). Next, based on tone value distributions within pixel groups, decisions are made whether to divide pixel groups, and in the event of a decision to divide pixel group, a pattern for dividing it is decided upon, from among these seven division patterns (corresponds to Step S204). In the event of a decision not to divide a pixel group, a multilevel halftoning result value is derived in the same manner as in the first embodiment described previously. Specifically, a representative tone value for the pixel group is calculated, the representative tone value is subjected to multilevel halftoning by referring to the multilevel halftoning table, and the multilevel halftoning result value derived thereby is stored in memory (corresponds to Steps S206, S208, and S210).

If the other hand the decision is to divide the pixel group (corresponding to Step 204: yes) then at the same time, a decision is made as to which of the patterns shown in FIG. 29 to use for division. Next, once representative tone values have been determined for each of the regions into which the pixel group has been divided, reference is made to the multilevel halftoning table to convert the respective representative tone values into multilevel halftoning result values (corresponds to Steps S212 and S214). Then, when storing the multilevel halftoning result values thus obtained, first an ESC code that indicates the division pattern is stored, and then following the ESC code, the multilevel halftoning result values derived for the regions are stored.

FIG. 30 is an explanatory diagram illustrating an example of ESC codes that indicate division patterns in the first modification of the first embodiment. As noted, multilevel halftoning result values are represented by 4-bit data, and in decimal representation can represent values of "0" to "15." Of these, values of "9" to "15" are allocated for the ESC codes, with the remaining values "0" to "8" allocated for multilevel halftoning result values. Here, the reason for assigning multilevel halftoning result values to the values "0" to "8" is that pixel groups are composed of eight pixels, with each pixel being able to assume only one of two states, i.e. dot on or off. The reason for assigning the ESC codes to the values of "9" to "15" is that four bits are needed to represent the multilevel halftoning result values "0" to "8", and of the representable values "0" to "15", the seven values of 9" to "15" not used for the multilevel halftoning result values are allocated for the ESC codes. The ESC code "15" is assigned to division pattern 1 shown in FIG. 29(a); the ESC code "14" is assigned to division pattern 2; and the ESC code "13" to division pattern 3, the ESC code "12" to division pattern 4, the ESC code "11" to division pattern 5, the ESC code "10" to division pattern 6, and the ESC code "9" to division pattern 7, respectively.

In the first modification, when storing multilevel halftoning result values for a divided pixel group, first, the ESC code indicating the division pattern is stored, and then the multilevel halftoning result values for each region are stored (corresponds to Step S216 of FIG. 11). For example, where a pixel group has been divided according to division pattern 2 shown in FIG. 29(b), the ESC code "14" corresponding to this division pattern is stored, followed by the multilevel halftoning result values for each region.

In the dot on-off state determination process of the first modification, when such multilevel halftoning result values are received, the dot on-off state for each pixel within the pixel group is determined in the following manner. A brief description will be given below, referring the flow chart in FIG. 21 used to illustrate the dot on-off state determination process of the first embodiment. First, a pixel group is selected for processing, and the classification number of the selected pixel group is obtained together with the multilevel halftoning result values for the pixel group (corresponds to Steps S300, S302, and S304 in FIG. 21). Where the value read as the multilevel halftoning resultant value is "9" to "15", the value is not a multilevel halftoning resultant value but is rather an ESC code indicating a division pattern for the pixel group, so it is decided that the multilevel halftoning result values for the regions must be stored following the ESC code (corresponds to Step S306: yes), and the multilevel halftoning result values are then read.

Where the pixel group is not divided (corresponds to Step S306: no), by referring to the decoding table on the basis of the pixel group classification number and multilevel halftoning result value, the dot on-off state of each pixel within the pixel group is determined (corresponds to Step S308). Where on the other hand the pixel group is divided (corresponds to Step S306: yes), each of the multiplicity of read in multilevel halftoning result values is combined with the classification number of the pixel group, and by referring to the decoding table, dot data DD corresponding to each combination is read out (corresponds to Step S310). Then, by extracting the data for each region from the dot data DD, the dot on-off state of each pixel in the pixel group is determined (corresponds to Step S312).

Once the dot on-off state of each pixel in the pixel group has been determined in this way, a decision is made as to whether the dot on-off state has been determined for all pixel groups in the image (corresponds to Step S314). In the event that any unprocessed pixel groups remain, the process returns to the beginning, one new pixel group is selected, and the series of processes described above is performed. If after repeating the above procedure it is now decided that determination of dot on-off state has been made for all pixel groups (corresponds to Step S314: yes), the dot on-off state determination process of the first modification terminates, returning to the image printing process of FIG. 5.

According to the first modification described above, it is possible to appropriately divide pixel groups according to the tone value distribution of the individual pixels that make up the pixel group, making it possible to obtain images of higher quality. Furthermore, even where the number of division patterns for pixel groups is increased, there is no corresponding increase in the amount of data required to output multilevel halftoning result values for divided pixel groups, or in the time required to determine the dot on-off state for each pixel from the multilevel halftoning result values. Consequently, notwithstanding the increase in the image quality relative to the image printing process of the first embodiment described above, images can nevertheless be output rapidly in the same manner as in the process in the first embodiment.

(2) Second Modification

In the embodiments described above, on the basis of the tone values of the individual pixels within a pixel group, a decision is made as to whether to divide the pixel group, and only in the event that a pixel group will be divided are multilevel halftoning result values created and dot on-off states determined on a region-by-region basis. However, on the assumption from the start that pixel groups will always be divided, it would be acceptable to create pixel groups that are sufficiently large in size that, in actual practice, they are never processed as single units.

As an example, in the resolution conversion process described above (Step S104 in FIG. 5), consider the case where resolution conversion has been carried out in the following manner. By converting the resolution of the image data to double the original resolution in both the primary scan direction and the secondary scan direction, so that each single pixel is now divided into two in both the horizontal and vertical directions, a total of four pixels is produced. In such a case, grouping these four pixels into a pixel group will result in all of the pixels within the pixel group having the same tone value. Consequently, by creating a multilevel halftoning result value for the pixel group and determining the dot on-off state for each of the individual pixels, it becomes possible to print the image with absolutely no degradation in quality.

Here, in the second modification of the first embodiment, rather than grouping these four pixels (in other words, two pixels each in the primary scan direction and the secondary scan direction) into a pixel group, a total of eight pixels, consisting of four pixels in the primary scan direction and two pixels in the secondary scan direction, are grouped into a pixel group.

With these pixel groups always divided into two regions left and right, the multilevel halftoning result value creation process and dot on-off state determination process described above are carried out on region-by-region basis.

As will be apparent from the method described above for setting up the multilevel halftoning table and the decoding table, if the number of pixels included in pixel groups differ, it will necessary to provide different multilevel halftoning tables and decoding tables as well. However, where pixel groups composed of eight pixels, and the pixel groups are always treated as being divided into two regions left and right, the multilevel halftoning table and decoding table used in the case where pixel groups contain eight pixels can be used as-is to carry out substantially the same process as where pixel groups contain four pixels each. That is, there is no need to set up a new multilevel halftoning table or decoding table for use where pixel groups contain four pixels each.

This situation is not limited to the case where pixel groups are composed of groups of four pixels. For example, it would also hold true where pixels are grouped in twos into pixel groups, or where different numbers of pixels are grouped into pixel groups, and in each case, there would be no need to set up a dedicated multilevel halftoning table decoding table.

Additionally, according to the second modification of the first embodiment it is possible to reduce the amount of data in the multilevel halftoning table. For example, as shown in FIG. 16, the multilevel halftoning table of The first embodiment discussed previously provides multilevel halftoning result values for each combination of 1024 pixel groups and the 256 possible representative tone values. Because the multilevel halftoning result values can assume nine different values from 0 to 8, individual multilevel halftoning result values each consists of 4-bit data. Consequently, a single multilevel halftoning table contains 1 Mbit of data.

Where pixel groups are each composed of four pixels, on the other hand, the pixel group count doubles to 2048. Since multilevel halftoning result values can assume any of five different values from 0 to 4, despite the fact that data length of the individual multilevel halftoning result values is reduced somewhat to three bits, ultimately the amount of data for one multilevel halftoning table is 1.5 Mbit, which represents an increase of 1.5 times. In other words, when a multilevel halftoning table is set up with pixel groups composed of four pixels, it is necessary to have a data capacity of 1.5 Mbit in order to store a single table, whereas when pixel groups are composed of eight pixels, and the pixel groups are always divided during processing, it is possible to reduce the data capacity required to store the multilevel halftoning table down to 1 Mbit.

D. Second Embodiment

In The first embodiment discussed previously, there was described a case in which the color printer 200 is capable of producing only a single type of dot. However, for the purpose of increasing the image quality, printers capable of producing several types of dot (so called halftone dot printers), such as dots with variable size or dots with variable ink density, enjoy widespread use nowadays. The invention can be highly effective when implemented in such a halftone dot printer. Implementation of the invention in a half-tone dot printer will be explained below, by way of a second embodiment.

D-1. Overview of Image Printing Process of Second Embodiment:

In terms of the flowchart, the image printing process according to the second embodiment is the analogous to the image printing process according to The first embodiment shown in FIG. 5. An overview of the image printing process according to second embodiment will be explained briefly below, again referring to the flowchart in FIG. 5.

When the image printing process according to second embodiment is initiated, first, the image data is read into the computer 100, and a color conversion process is performed (corresponding to Step S100 and Step S102 of FIG. 5). Next, the resolution conversion process is performed, and after the resolution of the image data has been converted to the print resolution (corresponding to Step S104), the process of generating the multilevel halftoning result values is performed to convert the representative tone values of the pixel groups into multilevel halftoning result values (corresponding to Step S106).

As mentioned above, in The first embodiment, the color printer 200 was capable of forming only one type of dot, and the multilevel halftoning resultant value represented the number of dots to be formed within a pixel group. In the second embodiment on the other hand, the color printer 200 is capable of forming three different types of dots of different size, namely, large dots, medium dots and small dots. In view of this capability, multilevel halftoning result values in the second embodiment represent combinations of numbers of dots of each type formed in pixel groups. Moreover, in the multilevel halftoning result value creation process of the second embodiment, there is performed a process by which representative tone values of pixel groups are converted to multilevel halftoning result values that express combinations of numbers of dots of each type. Where it has been decided that a pixel group will be split, a multilevel halftoning result value is determined for each of the regions that will result from the division. The specifics of the multilevel halftoning result value creation process of the second embodiment will be described below.

When the CPU in the control circuit 260 of the color printer 200 receives the multilevel halftoning result values supplied by the computer 100, it initiates the dot on-off state determination process (corresponds to Step S108 in FIG. 5). While the specifics will be described later, generally, in the dot on-off state determination process of the second embodiment, a process of referring to the decoding table to determine from multilevel halftoning result values whether large, medium, or small dot is to be formed, for each pixel in the pixel group.

Once dot on-off states for the large, medium, and small dot types have been determined in this way, dots are formed on the print medium according to the dot on-off state determinations (corresponds to Step S110 in FIG. 5). As a result, an image is printed according to the image data.

D-2. Multilevel Halftoning Result Value Creation Process of Second Embodiment:

The description now turns to the process for generating multilevel halftoning result values by unit of multilevel halftoning of the representative tone value for each pixel group or for each region within a pixel group, in the image printing process of the second embodiment discussed above. As described previously, in the multilevel halftoning result value creation process of the second embodiment, multilevel halftoning result values can be generated extremely easily by referring to the multilevel halftoning table using the classification numbers and representative tone values of the pixel groups. In order to explain why this is possible, first, a brief description of the process for determining, with the dither method, numbers of large, medium and small dots to be formed within a pixel group. On the basis of an understanding of this process, the specifics of the process of the multilevel halftoning result value creation process of the second embodiment will then be described.

Figure 31:
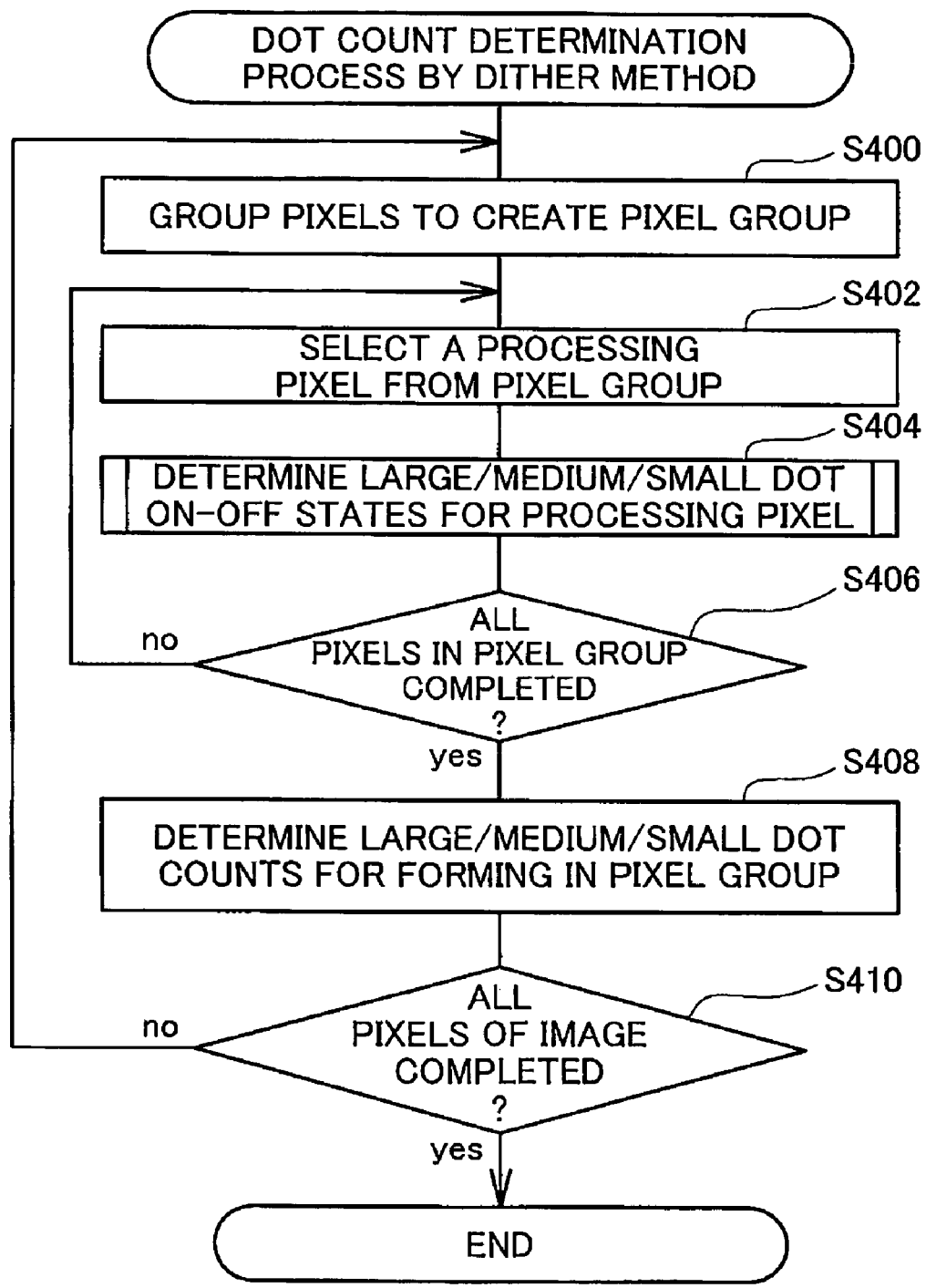
FIG. 31 is a flowchart illustrating the flow of the process for determining, by application of the dither method, numbers of large dots, medium dots, and small dots to be formed in a pixel group.

D-2-1. Large/Medium/Small Dot Count Determination Process Using Dither Method:

FIG. 31 is a flowchart illustrating the flow of the process for determining, by application of the dither method, numbers of large dots, medium dots, and small dots to be formed in a pixel group. The specifics of the process of applying the dither method to determine large, medium, and small dot on-off states are disclosed in Japanese Patent 3292104. In other words, the process illustrated in FIG. 31 can be viewed as carrying out the method disclosed in Japanese Patent 3292104, on pixel group units. In the case of determining the large, medium, and small dot counts as well, prior to commencing the process, neighboring pixels in predetermined number are first grouped together into pixel groups (Step S400). Here a total of eight pixels, namely four pixels in the primary scan direction and two pixels in the secondary scan direction, are grouped together into pixel groups in the same manner as in the embodiments described previously.

Next, for the purpose of determining the dot on-off state, a single pixel for process is selected from a pixel group (Step S402), and dot on-off states for large dots, medium dots, and small dots for the selected pixel are determined (Step S404). Large, medium, and small dot on-off states are determined as follows.

Figure 32:
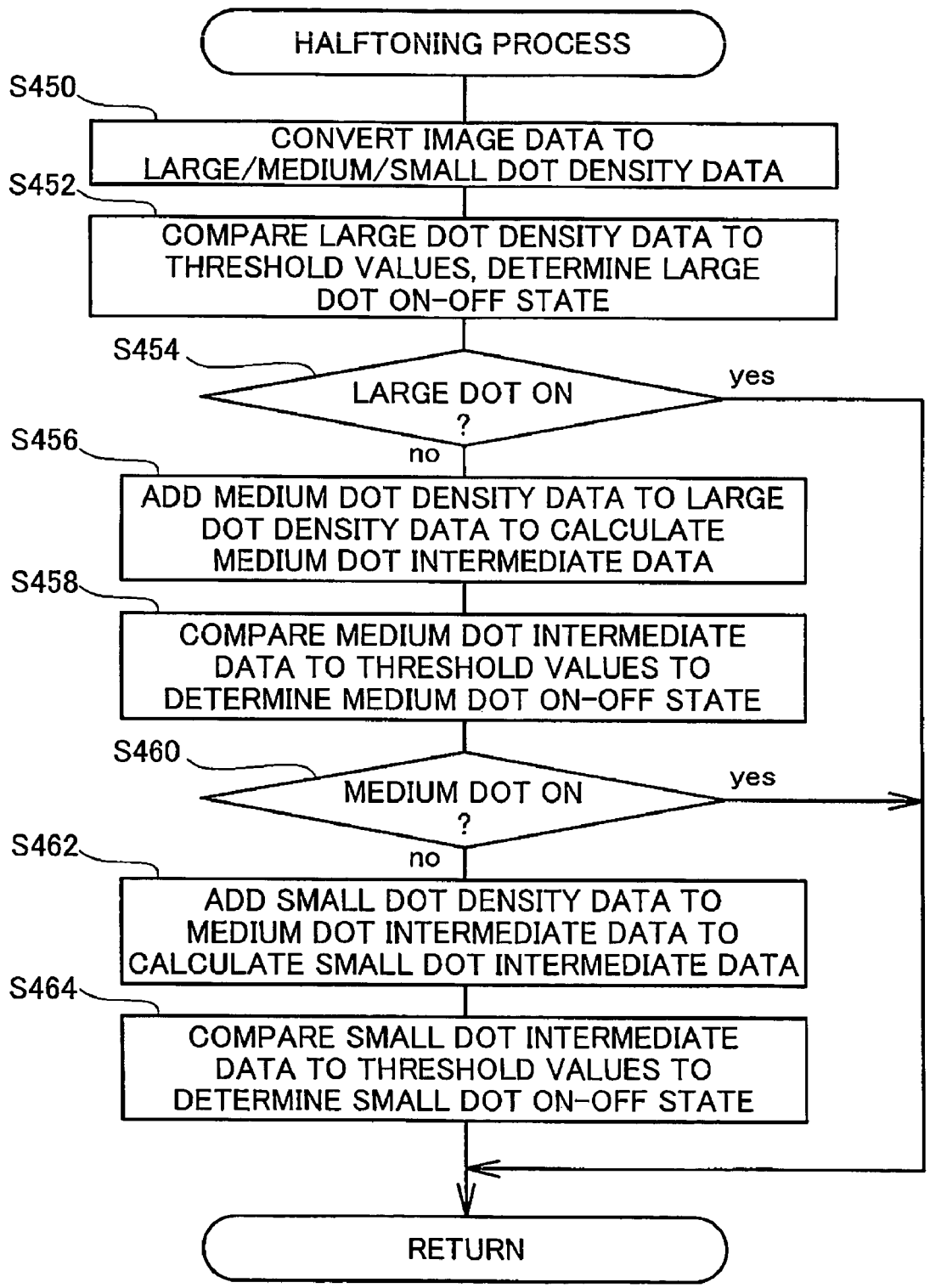
FIG. 32 is a flowchart illustrating the flow of the process for determining large dot, medium dot, and small dot on-off states by performing halftone processing for a selected pixel.

FIG. 32 is a flowchart illustrating the flow of the process for deciding dot on-off states of large dots, medium dots, and small dots, by performing halftone processing for a selected pixel. When the large/medium/small dot halftone process is initiated, first, the image data for the pixels targeted for processing is converted into density data for large dots, medium dots, and small dots (Step S450). Here, density data refers to data that indicates the density at which dots should be formed. Density data represents the fact that dots are formed at higher density, the greater the tone value. For example, a tone value of "255" for the density data indicates that the dot formation density is 100%, or in other words, that dots will be formed on all pixels, whereas a the tone value of "0" for the density data indicates a dot formation density of 0%, i.e. that no dot will be formed on any pixel. Such conversion to density data can be performed by referring to a numerical table known as a dot density conversion table.

Figure 33:
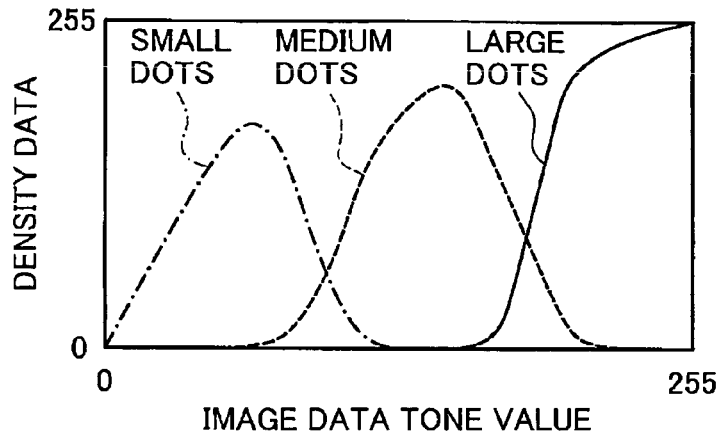
FIG. 33 is an explanatory diagram illustrating conceptually a dot density conversion table for converting tone values of image data into density data for large, medium, and small dots.

FIG. 33 is an explanatory diagram illustrating conceptually a dot density conversion table for converting tone values of image data into density data for large, medium, and small dots. As shown in the figure, the dot density conversion table has established therein density data for small dots, medium dots, and large dots is specified in the dot density conversion table, for tone values of the image data obtained by color conversion. In regions of image data of tone values close to "0", the density data for both medium dots and large dots will be set to tone value of "0". Density data for small dots increases along with larger tone values of image data, but once the image data reaches a certain tone value, it now begins to decrease, and the density data for medium dots begins to increase instead. As the tone values of the image data increase further to a certain tone value, density data for the small dots assumes a tone value of "0", density data for medium dots begins to decrease, and density data for large dots begins to increase gradually instead. In Step S450 of FIG. 32, a process to convert tone values for image data to large dot density data, medium dot density data, and small dot density data is carried out, while referring to the dot density conversion table.

In this way, once density data for large, medium, and small dots has been obtained for a pixel targeted for processing, first, a decision is made regarding the large dot on-off state (Step S452 in FIG. 32). This decision is made by comparing the large dot density data with a threshold value in a dither matrix established at a location corresponding to the pixel targeted for processing. If the density data is greater, the decision is made to form a large dot on the target pixel. As a result, in the case that a large dot will be formed, the decision in Step S454 is "yes", and the system exits the halftone process and returns to the dot count determination process shown in FIG. 31.

Conversely, if the threshold value is greater than the large dot density data, in Step S452, it is decided not to form a large dot on the target pixel. If as result of the decision a large dot is not formed (Step S454: no), a process for determining medium dot on-off state now commences. In determining the medium dot on-off state, the large dot density data and the medium dot density data are added together to calculate medium dot intermediate data (Step S456).

The medium dot intermediate data is then compared with the threshold value of the dither matrix in order to determine the medium dot on-off state (Step S458). In the event that the medium dot intermediate data is greater, the decision is made to form a medium dot on the target pixel. If as result a medium dot will be formed, the decision in Step S460 is "yes", and the system exits the halftone process and returns to the dot count determination process shown in FIG. 31.

Conversely, if the threshold value is greater than the medium dot intermediate data, in Step S458, it is decided not to form a medium dot on the target pixel. If as result of the decision a medium dot is not formed (Step S460: no), a process for determining small dot on-off state now commences. In determining the small dot on-off state, the medium dot intermediate data and the small dot density data are added together to calculate small dot intermediate data (Step S462). This small dot intermediate data is then compared with the threshold value of the dither matrix in order to determine the small dot on-off state (Step S464). If as a result, the small dot intermediate data is greater, the decision is made to form a small dot on the target pixel; and conversely if the threshold value is greater than the small dot intermediate data, no dot of any kind is formed. By carrying out processes such as the above, it can be decided, for the current target pixel, whether to form a large dot, a medium dot, a small dot, or whether to form no dot at all; thus, the system now exits the halftone process shown in FIG. 32 and returns to the dot count determination process of FIG. 29.

The following supplemental description regarding the situation of determining dot on-off states for large, medium, and small dots while performing the process described above makes reference to FIG. 34. FIG. 32 is an explanatory diagram illustrating conceptually determination of large dot, medium dot, and small dot on-off states for each pixel in a pixel group, while applying the dither method. To avoid excessively complex description, it is here assumed that all of the pixels in the pixel group have the same tone value, and that accordingly density data for the large, medium, and small dots has identical tone values. (a) in FIG. 34 shows density data for large, medium, and small dots obtained for the pixels in the pixel group; for each pixel, the large dot density data is "2", the medium dot density data is 90", and the small dot density data is "32."

Figure 34:
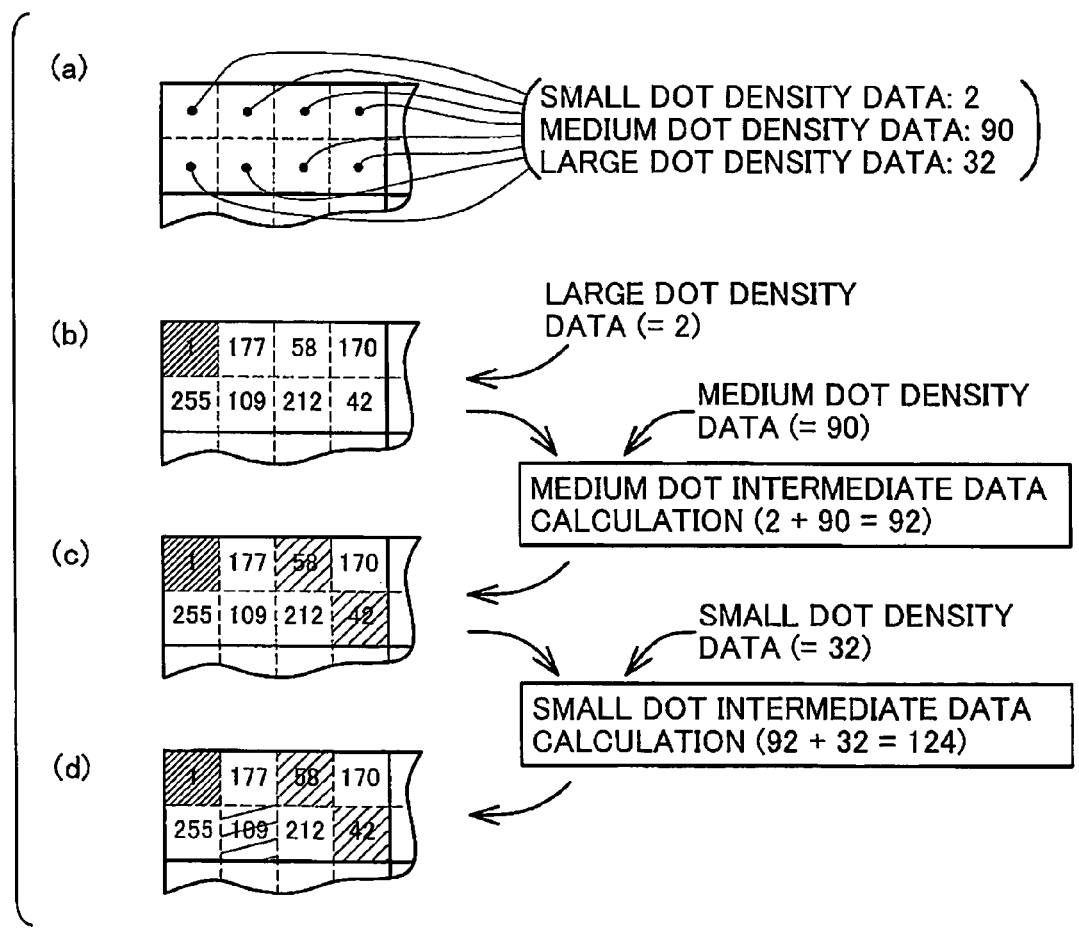
FIG. 34 is an explanatory diagram illustrating determination of large dot, medium dot, and small dot on-off states, by performing halftone processing for a selected pixel.

(b) in FIG. 34 shows threshold values that are stored in the dither matrix, at locations corresponding to the pixel group. When determining the large dot on-off state, the large dot density data is compared to these threshold values. Here, since the large dot density data is "2", only that pixel for which a threshold value of "1" has been established is determined to be the pixel on which a large dot will be formed. In (b) in FIG. 34, the pixel on which it was decided to form a large dot is indicated by fine hatching. As regards the other pixels, it is conceivable that either medium dots or small dots, no dots at all, will be formed. Accordingly, medium dot on-off state for these pixels is decided at this point.

When determining the medium dot on-off state, the large dot density data "2" and the medium dot density data "90" are added together to calculate the medium dot intermediate data, and the intermediate data "92" thus derived is compared with the threshold values. As a result, it is decided to form medium dots on just two of the pixels, namely, the pixel whose threshold value of "42" and the pixel whose threshold value of "58". In FIG. 34 (c) the pixels on which it was decided to form medium dots are indicated by medium hatching. For those pixels on which neither large dots nor medium dots are formed, it is conceivable that either small dots will be formed, or no dots at all.

At this point, the medium dot intermediate data "92" and the small dot density data "32" are added together to compute the small dot intermediate data, and this intermediate data "124" is compared with the threshold values. As a result, it is decided to form a small dot on just one of the pixels, namely, the pixel whose threshold value is "109." In FIG. 34 (d), the pixel on which it was decided to form a small dot is indicated by large hatching.

In Steps S402-S406 of the dot count determination process depicted in FIG. 21, determinations of on-off states for large, medium, and small dots are made while calculating intermediate data for each pixels within the pixel group, as described above. Once determinations have been completed for all pixels in the pixel group (Step S406: yes), then the dot counts of large dots, medium dots, and small dots to be formed within the pixel group are determined (Step S408). For the exemplary pixel group shown in FIG. 34, it is determined that there is one large dot, two medium dots, and one small dot.

Once dot counts for the large, medium, and small dots have been derived in this way, a decision is made as to whether the above process has been performed for all of the pixels in the image (Step S410). If any unprocessed pixels remain, the process returns to Step S400 and the series of processes is repeated until it is decided that the processes have been completed for all of the pixels in the image, whereupon the dot count determination process of by the dither method shown in FIG. 31 now terminates. As a result, the image data is divided into a plurality of pixel groups, and the dot counts for large dots, medium dots, and small dots to be formed in each of the groups of pixels are obtained. FIG. 31 is an explanatory diagram illustrating, conceptually, the situation wherein the numbers of large dots, medium dots, and small dots to be formed in each of the groups of pixels have been obtained. FIG. 35 is an explanatory diagram illustrating conceptually large dot, medium dot, and small dot formation counts having been derived for each pixel group.

D-2-2. Specifics of Multilevel Halftoning Result Value Creation Process of the Second Embodiment:

The multilevel halftoning result value creation process of the second embodiment is based on the process of determining the dot on-off states for large dots, medium dots, and small dots using the dither method described above; assuming each pixel in the pixel group to have a representative tone value, a multilevel halftoning process that converts the representative tone values to values indicating large, medium, and small dot counts is carried out. In other words, in the second embodiment, the multilevel halftoning result values represent combinations of dot counts of the various dot types formed pixel groups. Accordingly, the description turns first to the correspondence relationships between the multilevel halftoning result values and combinations of various dot types formed pixel groups in the second embodiment.

FIG. 36 is an explanatory diagram illustrating a correspondence relationship between multilevel halftoning result values and combinations of counts of each type of dot to be formed in a pixel group, in the second embodiment. In the second embodiment there are a total of 165 possible combinations of dot counts of large dots, medium dots, and small dots that can be formed in a pixel group, and a multilevel halftoning resultant value is associated with each of these combinations. Here, there are three types of dot that can be formed on a single pixel, namely, a large dot, a medium dot, or a small dot; because a pixel group contains eight individual pixels, it might simplistically be assumed that the combinations of dots that can be formed in a single pixel group equal $3^8$ (=6,561). However, in actual practice there are only 165 possible combinations, as shown in FIG. 36. The reason for this is as follows.

Although a large dot, a medium dot, or a small dot may be formed on any pixel in a pixel group, since more than one dot cannot be formed on any single pixel, the total dot count cannot exceed the pixel count in the pixel group (which is eight in the embodiment described above). Accordingly, since the possible number of combinations of large, medium, and small dot counts is equal to the number of combinations when selecting eight times, with repetition allowed, from among the four possible states of "form a large dot," "form a medium dot," "form a small dot," or "form no dot," this number can be calculated as:

$$_4H_8(=_{4+8-1}C_8)$$

and thus there are 165 possible combinations. Here $_nH_r$ is a mathematical operator for calculating the number of possible combinations (repeated combinations) that can be derived when selecting r times with repetition allowed, from among n types. $_nC_r$ is a mathematical operator for calculating the number of possible combinations when selecting r times, with no repetition allowed, from among n types.

Where there are 165 possibilities, these can be represented on eight bits, and accordingly the multilevel halftoning result values of the second embodiment are 8-bit data. Where it is possible to produce three types of dots, namely large, medium, and small, each pixel can assume one of four possible states, namely, having a large, medium, or small dot formed thereon, or no dot at all; thus, in order to represent these states, two bits per pixel will be required. Because there are eight pixels in a pixel group, 16 bits will be required to represent the possible states assumable by each individual pixel in the pixel group. Accordingly, by outputting multilevel halftoning result values instead of outputting the dot on-off state of each pixel, it is possible to reduce the amount of data by half.

Figure 37:
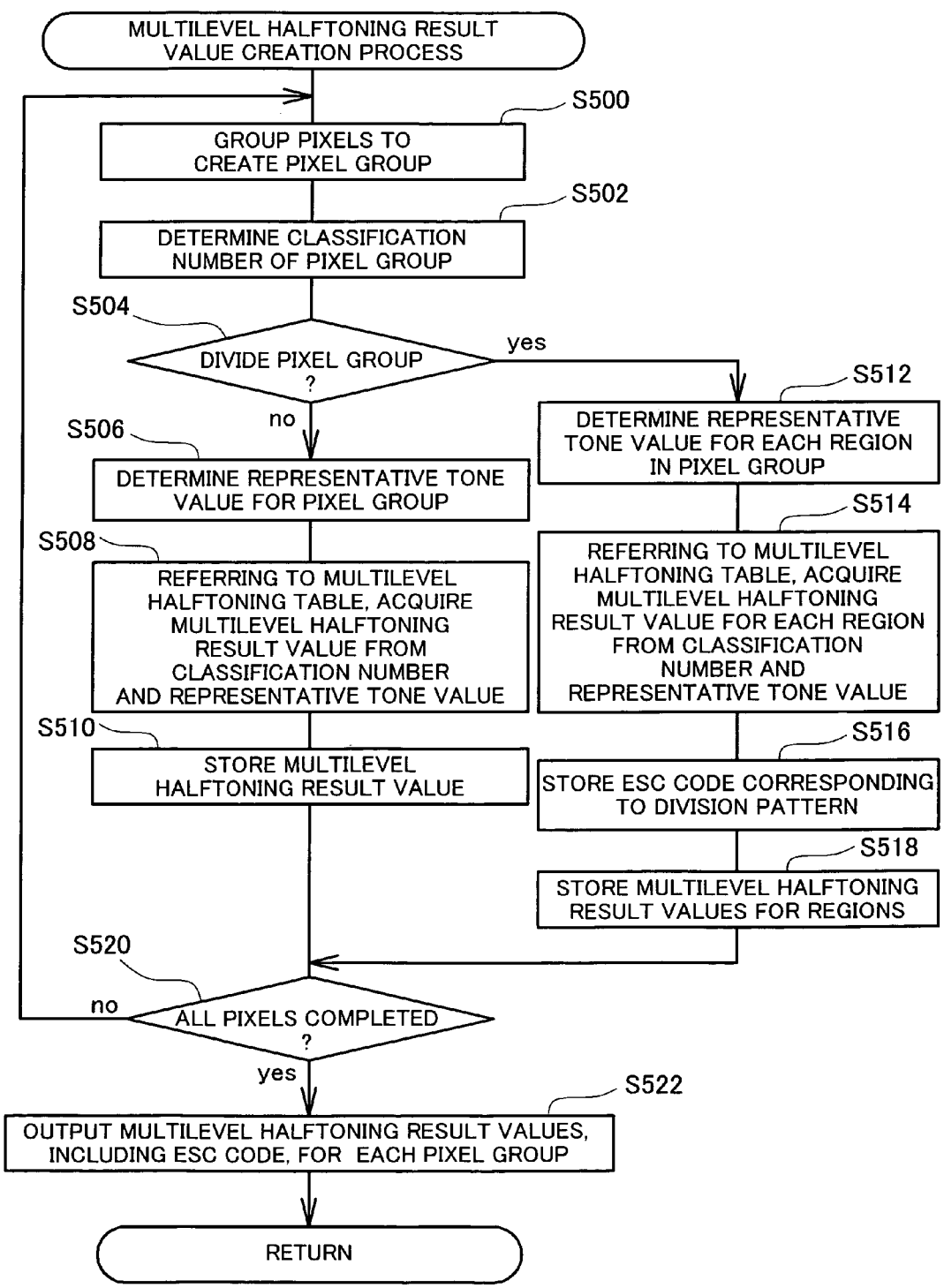
FIG. 37 is a flowchart illustrating the flow of the multilevel halftoning result value creation process in the second embodiment.

FIG. 37 is a flowchart illustrating the flow of the multilevel halftoning result value creation process of the second embodiment. The multilevel halftoning result value creation process of the second embodiment is substantially similar to the process of The first embodiment discussed previously, except that a different multilevel halftoning table is referred to. That is, whereas in The first embodiment it is possible to form only one type of dot, in the second embodiment, the number of dot types increases to three, namely large, medium, and small; despite this fact, however, it is possible to create the multilevel halftoning result values of the second embodiment rapidly, by unit of a simple process very similar to that in The first embodiment. The following description refers to the flowchart of FIG. 37.

When the multilevel halftoning result value creation process of the second embodiment is initiated, after first creating pixel groups that group together a predetermined number of neighboring pixels (Step S500), classification numbers are determined based on the locations of the pixel groups within the image (Step S502). Next, decisions as to whether to divide pixel groups are made on the basis of tone values of the individual pixels in the pixel groups (Step S504). Here, as in The first embodiment, for convenience the description assumes that there is only a single division pattern which divides the pixel group into two equal left and right regions; however, a number of different division patterns, such as those shown by way of example in FIG. 29, may be provided instead. Where the decision is made to not split a pixel group (Step S504: no), after determining the representative tone value for the pixel group (Step S506), reference is made to the multilevel halftoning table in order to acquire the multilevel halftoning result value corresponding to the classification number of the pixel group and the representative tone value of the pixel group. Multilevel halftoning resultant values for pixel groups can be determined in the same manner as in The first embodiment described above.

Figures 38, 39:
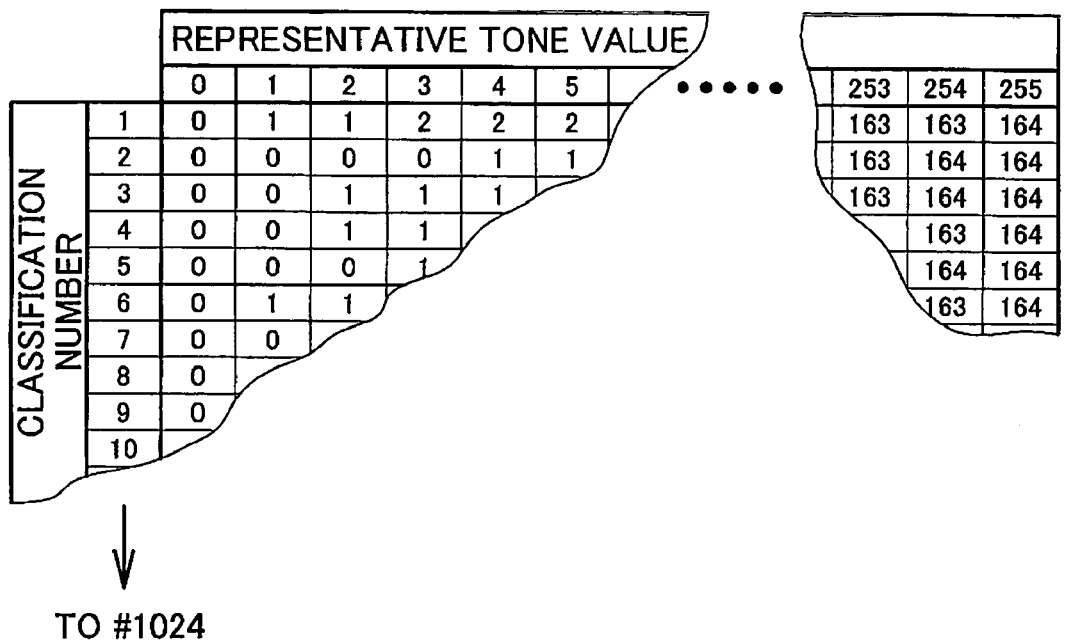
FIG. 38 is an explanatory diagram illustrating conceptually the multilevel halftoning table referred to in the multilevel halftoning result value creation process in the second embodiment.
FIG. 39 is an explanatory diagram illustrating assignment of multilevel halftoning result values and ESC codes in the second embodiment.

FIG. 38 is an explanatory diagram illustrating conceptually the multilevel halftoning table referred to in the multilevel halftoning result value creation process in the second embodiment. As is shown in the figure, in the multilevel halftoning table of the second embodiment, multilevel halftoning result values are defined in association with classification numbers and representative tone values for the pixel groups. These multilevel halftoning result values are values obtained by calculating dot formation counts of each dot type by the method described in FIG. 31 through FIG. 34, on the assumption that all pixels in a pixel group have the representative tone value; and then converting the resultant dot count combinations in accordance with the correspondence relationships shown in FIG. 36. In the multilevel halftoning table depicted in FIG. 38, multilevel halftoning result values derived in this way have been established in advance, and thus in the multilevel halftoning result value creation process of the second embodiment, multilevel halftoning result values can be acquired immediately from the pixel group classification number and representative tone value, simply by referring to the table. Where it has been decided not to split a pixel group, the multilevel halftoning result value obtained through this process is stored (Step S510 in FIG. 37).

On the other hand, where the decision is made to divide a pixel group (Step S504: yes), after determining representative tone values for each of the regions created by dividing the pixel group (Step S512), a multilevel halftoning result value is obtained for each of the regions by referring to the multilevel halftoning table, using the respective combinations of pixel group classification number and representative tone value (Step S514). Next, an ESC code indicating the division pattern is stored in memory (Step S516).

FIG. 39 is an explanatory diagram illustrating assignment of multilevel halftoning result values and ESC codes in the second embodiment. As noted above, multilevel halftoning result values can assume any of 165 possible values, and when values or "0" through "164" are assigned to multilevel halftoning result values, the values "165" through "255" are left unassigned. Accordingly, a value selected arbitrarily from among the unassigned values (in this case, "255") is assigned to the ESC code. When a plurality of pixel group division patterns have been prepared, multiple values corresponding to the different types of division patterns may be assigned to the ESC codes. In Step S516 of FIG. 37, ESC codes assigned in association with particular division patterns for the groups of pixels are stored in memory.

Once an ESC code has been stored in this way, the multilevel halftoning result values obtained for each of the regions are stored following (Step S518). A multilevel halftoning result value is obtained for each of the regions created by dividing the pixel group. Consequently, where a pixel group has been divided into N regions, the number of multilevel halftoning result values stored following the ESC code will also be N. Also, where patterns that divide pixel groups into different numbers of regions have been prepared as division patterns, it may occur that the number of multilevel halftoning result values stored following the ESC code will vary depending on the division pattern.

FIG. 40a through FIG. 40c are explanatory diagrams depicting creation of multilevel halftoning result values for three pixel groups. FIG. 40a depicts the tone values of pixels contained in three pixel groups. FIG. 40b depicts a condition in which pixel group division/non-division have been determined according to tone value distribution within pixel groups, and representative tone values have been determined. As illustrated, all of the pixels making up Pixel Group A have the same value as the representative tone value of "97", and thus the decision is made that it is unnecessary to divide this pixel group, and the representative tone value of the pixel group is determined to be "97." In the case of Pixel Group B on the other hand, an appreciable change in tone value is observed in the middle, with pixels in the right half having a tone value of "97" and pixels in the right half having a tone value of "135." Accordingly, it is decided to divide this pixel group into two regions left and right, determining a representative tone value of "97" for the region on the left and a representative tone value of "135" for the region on the right. For Pixel Group C, since all of the pixels have a tone value of "135", the decision is made that it is unnecessary to divide this pixel group, and the representative tone value of the pixel group is determined to be "135." In Steps S504, S506, and S512 shown in FIG. 37, a process to determine a representative tone value for a pixel group or each region within a pixel group is carried out.

Next, once the representative tone values have been converted to multilevel halftoning result values by unit of referring to the multilevel halftoning table depicted in FIG. 38, the resultant multilevel halftoning result values are stored in memory. Where a pixel group has been divided, the multilevel halftoning result values derived for its regions are stored in memory, together with an ESC code indicating the division pattern. FIG. 40c depicts storage of multilevel halftoning result values or an ESC code for the three Pixel Groups A, B and C. For example, for Pixel Group A, since the pixel group is undivided and yields a representative tone value of 97, a multilevel halftoning result value of 85, derived from the classification number and the representative tone value of 97 for Pixel Group A, is stored in memory. For Pixel Group B, since the pixel group is divided into equal left and right halves, first, the ESC code 255 which corresponds to this division pattern is stored in memory, then following it are stored the multilevel halftoning result value 92 for the left region and the multilevel halftoning result value 141 for the right region. Ultimately, the multilevel halftoning result value for Pixel Group B contains an amount of data equivalent to three multilevel halftoning result values for Pixel Group A. The fact that, despite the representative tone value of Pixel Group A and the representative tone value of the left region of Pixel Group B both being 97, their respective multilevel halftoning result values differ, i.e. "85" and "92", is due to the different classification numbers of Pixel Group A and Pixel Group B. For Pixel Group C, since the pixel group is undivided and yields a representative tone value of 135, the multilevel halftoning result value of 132 obtained by referring to the multilevel halftoning table is stored as-is. In Steps S508, S510, S514, S516, and S518 of FIG. 37, a process for storing in memory multilevel halftoning result values or ESC codes on a per-pixel group basis is carried out in this manner.

Once a pixel group multilevel halftoning result value has been stored in memory as described above, a decision is made as to whether or not processing has been completed for all of the pixels of the image data (Step S520), and if any unprocessed pixels remain (Step S520: no), the process returns to Step S500, a new pixel group is created, and the subsequent series of processes repeats. This operation is repeated until it is determined that processing has been completed for all pixels (Step S520: yes), whereupon, for undivided pixel groups, the multilevel halftoning result value alone, or for divided pixel groups, the multilevel halftoning result values together with an ESC code indicating the division pattern, are output to the color printer 200 (Step S522), and the multilevel halftoning result value creation process of the second embodiment depicted in FIG. 37 terminates.

Figure 41:
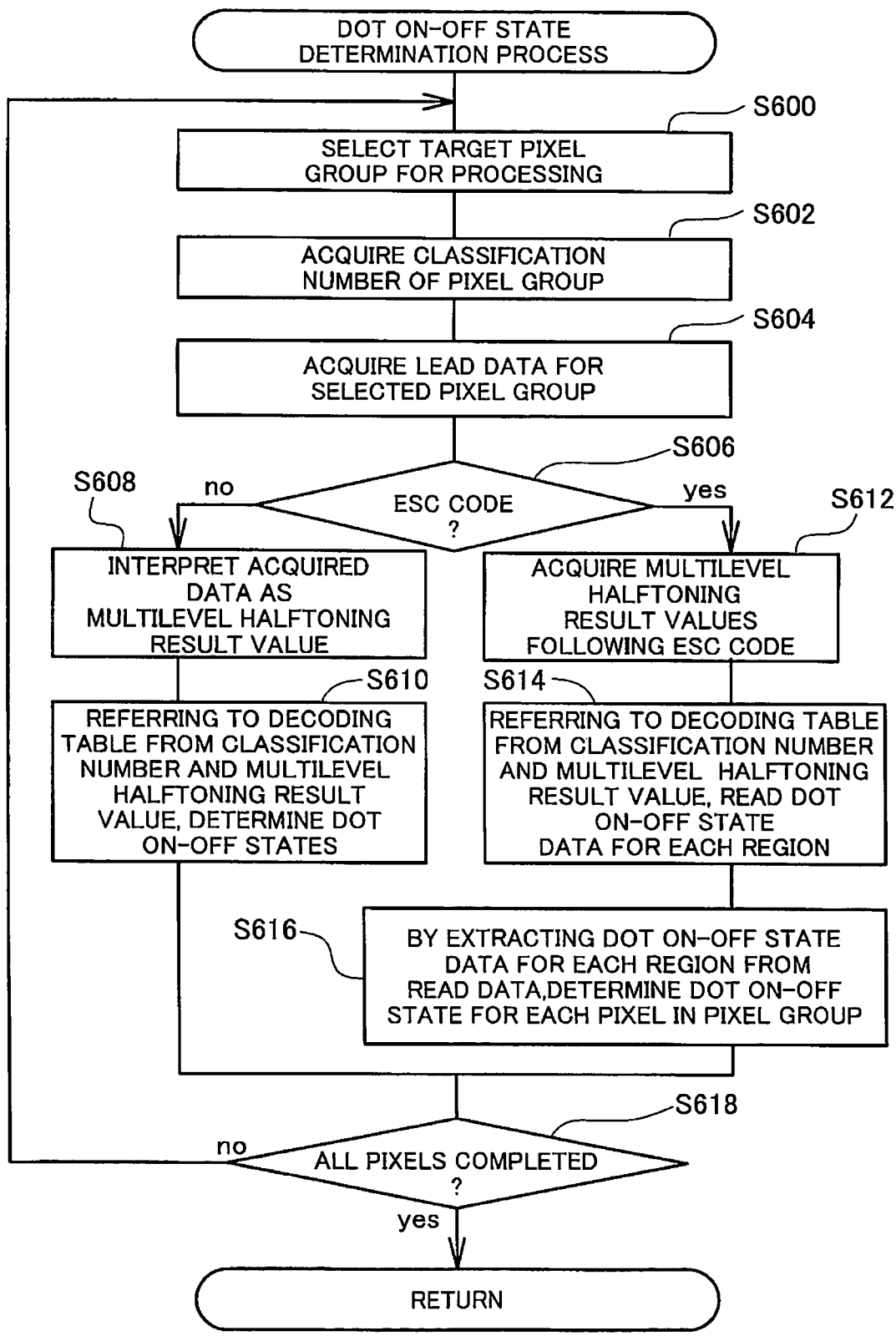
FIG. 41 is a flowchart depicting the flow of the dot on-off state determination process of the second embodiment.

D-3. Dot On-Off State Determination Process of Second Embodiment:

Next, the process of receiving multilevel halftoning result values and determining large/medium/small dot on-off states in the color printer 200 of the second embodiment will be described. FIG. 41 is a flowchart depicting the flow of the dot on-off state determination process of the second embodiment. The following description of the dot on-off state determination process of the second embodiment refers to the flowchart.

When the dot on-off state determination process of the second embodiment is initiated, first, one pixel group is selected for processing (Step S600), and the classification number of the pixel group is acquired (Step S602). The classification number of the pixel group can be acquired in the same manner as in the dot on-off state determination process of The first embodiment described previously.

Next, after acquiring the lead data supplied as the multilevel halftoning result value for the selected pixel group (Step S604), it is determined whether the acquired data is an ESC code (Step S606). Here, since only a single type of pixel group division pattern is provided, and this division pattern is assigned the ESC code "255", in Step S606 it is determined whether the read data is "255."

In the event that the read data is not an ESC code (Step S606: no), the decision is made that the pixel group is undivided, and the data is interpreted as a multilevel halftoning resultant value (Step S608). Then, by referring to the decoding table from the classification number and multilevel halftoning result values acquired for the pixel group, the dot on-off state is determined for each pixel of the pixel group (Step S610). Here, the decoding table referred to the dot on-off state determination process of the second embodiment is substantially the same as the decoding table of The first embodiment described previously with reference to FIG. 24. However, in response to the fact that in the second embodiment it is possible to form dots of three types, namely large, medium, and small, the dot data DD established in the decoding table of the second embodiment is data additionally indicating whether a large dot, medium dot, or small dot is to be formed on each pixel in a pixel group.

Figure 42A:
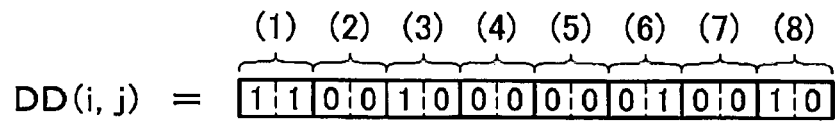
FIG. 42a and FIG. 42b are explanatory diagrams illustrating the data structure of dot data established in the decoding table of the second embodiment.
Figure 42B:
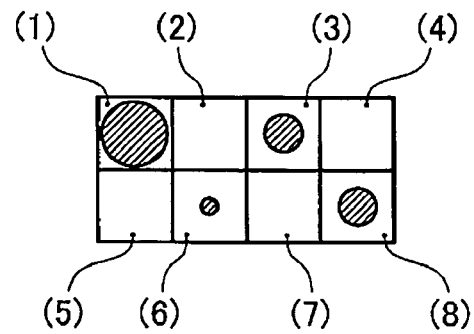

FIG. 42a and FIG. 42b are explanatory diagrams illustrating the data structure of dot data DD established in the decoding table of the second embodiment. The dot data DD of the second embodiment is 16-bit data composed of 8 groups of 2 bits per group, with each group corresponding to a pixel in the pixel group. The 2-bit data "11" represents formation of a large dot, the 2-bit data "10" represents formation of a medium dot, the 2-bit data "01" represents formation of a small dot, and the 2-bit data "00" represents that no dot will be formed.

For example, let it be assumed that the dot data DD is data like that depicted in FIG. 42a. Since the value "11" is established in the group numbered 1 in the dot data DD, a large dot will be formed on the corresponding pixel in the pixel group (the pixel numbered 1 in FIG. 42b). Since the value "00" is established in the group numbered 2 in the dot data DD, no dot will be formed on the pixel numbered 2 in the pixel group. In this way, the data established in each group of the dot data DD represents the type of dot to be formed on the pixels in the pixel group. This manner of dot data DD is established in the decoding table referred to in the dot on-off state determination process of the second embodiment.

In Step S610 shown in FIG. 41, by unit of referring to the decoding table on the basis of the classification number and multilevel halftoning result values of the pixel group, and reading out dot data DD like that illustrated in FIG. 42, the dot on-off state of each pixel in the pixel group is determined. The method for setting up the decoding table referred to during the dot on-off state determination process of the second embodiment will be discussed later.

If on the other hand, the read data is an ESC code (Step S606: yes) it is decided that the pixel group is divided, and the specific number of multilevel halftoning result values stored following the ESC code are read in (Step S612). These multilevel halftoning result values are the multilevel halftoning result values derived from the representative tone values of the regions produced by dividing the pixel group.

Next, by referring to the decoding table, each acquired multilevel halftoning result value is converted to dot data DD (Step S614). Then, partial data corresponding to each of the regions is extracted from the dot data DD that was derived from the multilevel halftoning result value of each region, and this data is combined to determine the dot on-off state of each pixel in the pixel group (Step S616).

Figure 43:
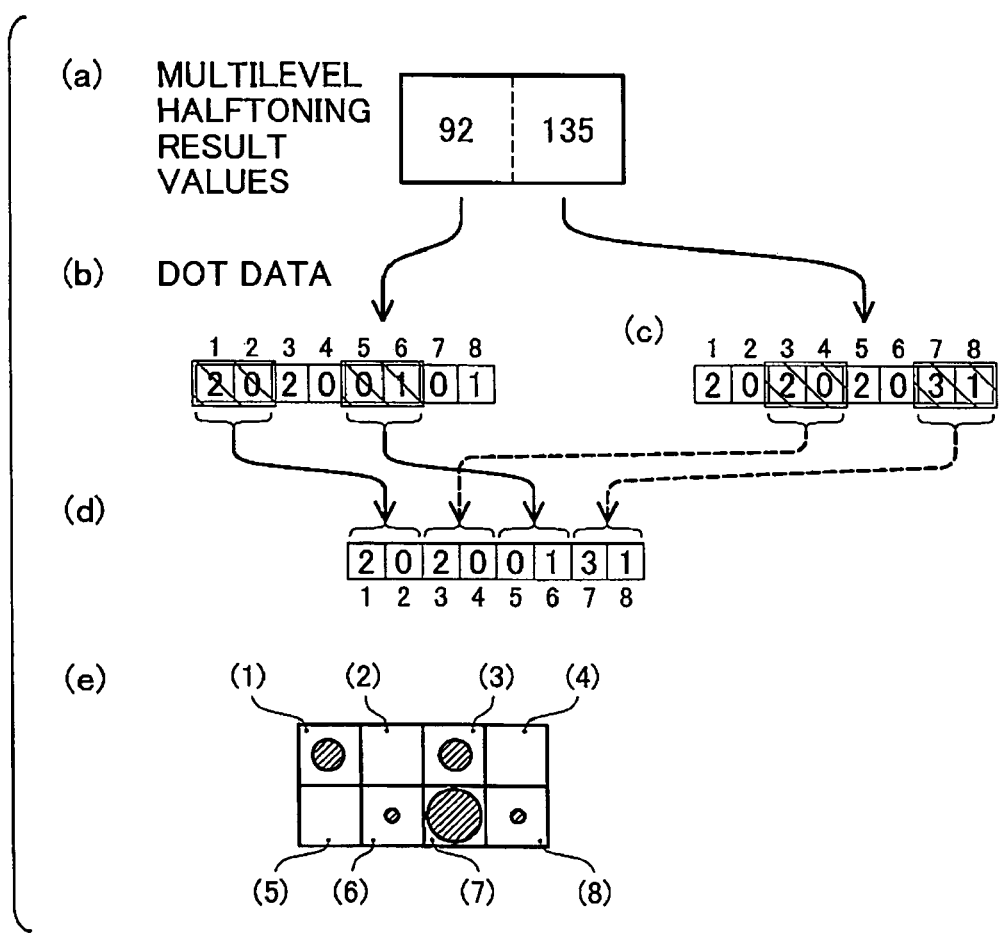
FIG. 43 is an explanatory diagram illustrating determination of dot on-off state for each pixel in a pixel group, from multiple items of dot data.

FIG. 43 is an explanatory diagram illustrating determination of dot on-off state for each pixel in a pixel group, from multiple items of dot data DD. Here, let it be assumed that, as shown in (a) in FIG. 43, a multilevel halftoning result value of 95 and a multilevel halftoning result value of 135 are derived respectively for the regions resulting from division of the pixel group into equal left and right halves. Next, by referring to the decoding table, these multilevel halftoning result values are converted to dot data DD. In FIG. 43, (b) and (c) respectively depict the dot data DD derived from the multilevel halftoning result values of the left and right regions. In Step S614 shown in FIG. 41, a process to convert multilevel halftoning result values to dot data DD in this manner is carried out. As noted, the dot data DD of the second embodiment is 16-bit data composed of groups of 2 bits each (see FIG. 42); however, in order to avoid complicated illustration, in FIG. 43 the 2-bit data of each set is shown in decimal representation. That is, in FIG. 43 the 2-bit data "11" representing a large dot is shown as "3", the 2-bit data "10" representing a medium dot is shown as "2", the 2-bit data "01" representing a small dot is shown as "1", and the 2-bit data "00" indicating that no dot is formed is shown as "0."

Next, partial data corresponding to each region is extracted from each set of dot data DD, and combined to synthesize dot data DD for the divided pixel group. Specifically, the dot data DD depicted in (b) in FIG. 43 is that derived for the left region, and from this dot data DD is extracted partial data corresponding to the four pixels which make up the left region. In the example depicted in FIG. 43, the four pixels (1), (2), (5), and (6) correspond to the pixels of the left region. The dot data DD depicted in (c) in FIG. 43 has been derived for the right region, by extracting partial data corresponding to the four pixels that make up the right region. In the example of FIG. 43, the four pixels (3), (4), (7), and (8) correspond to the pixels of the right region. The data extracted from each set of dot data DD is then combined to synthesize new dot data DD. In FIG. 43, (d) depicts dot data DD for the divided pixel group, synthesized in this way. Also, in FIG. 43, (e) depicts dots formed on pixels in accordance with the synthesized dot data DD.

As shown in FIG. 43 (e), the left half region has smaller and sparser dots than does the right half region. That is, the dot distribution appropriately reflects the multilevel halftoning result values shown in (a) of FIG. 43. In Step S616 of FIG. 41, the dot on-off state determination process for each pixel is carried out by synthesizing dot data DD for the divided pixel group in this manner.

Once the dot on-off state for each pixel of the selected pixel group has been determined in the manner described above (Steps S610, S616), a decision is made as to whether the process has been completed for all pixel groups (Step S618). In the event that any unprocessed pixel groups remain (Step S618: no), the process returns to the Step S600, a new pixel group is selected, and the series of processes described above is performed to determined dot on-off states. If after repeating the above procedure it is now decided that the process has been made for all pixel groups (corresponds to Step S618: yes), the dot on-off state determination process of the second embodiment shown in FIG. 41 terminates.

Finally, the method for setting up the decoding table referred to in the dot on-off state determination process of the second embodiment will be described briefly. The decoding table of the second embodiment may be established in substantially the same manner as the decoding table of The first embodiment described previously. However, the second embodiment does differ from The first embodiment in that dot on-off state determinations are made for large, medium, and small dots.

Figure 44:
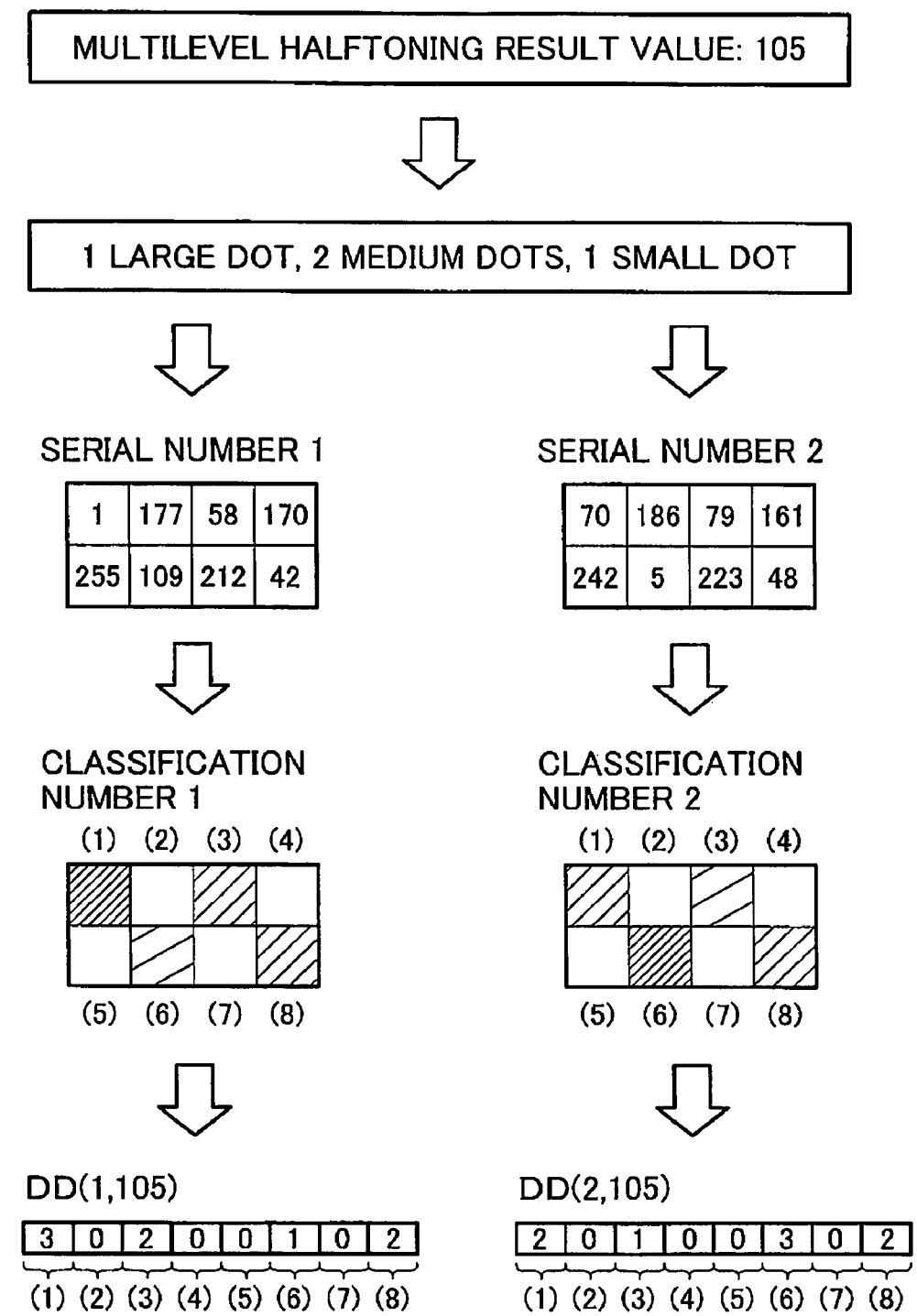
FIG. 44 is an explanatory diagram illustrating the method for setting up the decoding table referred to in the dot on-off state determination process of the second embodiment.

FIG. 44 is an explanatory diagram illustrating the method for setting up the decoding table referred to in the dot on-off state determination process of the second embodiment. Here, let it be assumed that the multilevel halftoning result value for a pixel group is "105." In the decoding table of the second embodiment there is established dot data DD for representing dot on-off states of large, medium, and small dots; thus, the multilevel halftoning result value is first converted to data representing dot counts of the several types of dot. Here, the conversion can be carried out readily on the basis of the correspondence relationships depicted in FIG. 36. Here, the multilevel halftoning result value 105 represents a combination of one large dot, one medium dot, and one small dot. Next, the pixels on which these dots will be formed in the pixel group are determined by referring to the threshold values in the dither matrix. FIG. 44 depicts a situation taking the example of the pixel group of classification number 1 and the pixel group of classification number 2, in which the pixels on which these dots will be formed in these pixel groups are determined, and the corresponding dot data DD is derived.

The right half of FIG. 44 depicts dot data DD (1, 105) derived for the pixel group of classification number 1. Here, dot data DD (1, 105) refers to dot data established corresponding to a combination of the pixel group classification number 1 and the multilevel halftoning result value 105. In order to derive the dot data DD for the pixel group of classification number 1, reference is made to the threshold values established in the block assigned serial number 1 in the dither matrix. The threshold values established in the block assigned serial number 1 are shown at left in the third row from the top in FIG. 44. As noted, these threshold values can be viewed as representing the ease with which dots are formed. Accordingly, pixel locations for forming large dots, medium dots, and small dots are determined in accordance with these threshold values. A more specific description will be provided later.

First, pixel locations for forming large dots are determined. Since the pixel whose threshold value is set to 1 is the pixel on which it is easiest to form a dot in the block assigned serial number 1, a large dot is formed on this pixel. Since there is only one large dot needing to be formed in this pixel, next, pixel locations for forming two medium dots are determined. In the block assigned serial number 1, the second and third easiest pixels for dot formation are the pixel whose threshold value is set to 42 and the pixel whose threshold value is set to 58, and thus it is decided to form medium dots on these pixels. Finally, pixel locations for forming small dots are determined. In the block assigned serial number 1, the fourth easiest pixel for dot formation is the pixel whose threshold value is set to 109, and thus a dot is formed on this pixel. Pixel locations for forming large, medium, and small dots determined for the pixel group assigned classification number 1 in this manner are shown at right in the fourth row from the top in FIG. 44. In the drawing, large dots are formed on pixels indicated by fine hatching, medium dots are formed on pixels indicated by somewhat larger hatching, and small dots are formed on pixels indicated by large hatching; pixels shown with no hatching have no dot formed thereon. Once the dot on-off state for each pixel in the pixel group has been determined in this way, this dot arrangement is represented by dot data in the data format shown in FIG. 42, and established in the decoding table as dot data DD (1, 105) corresponding to the classification number 1 and the multilevel halftoning result value 105.

For the pixel group with classification number 2 as well, dot data DD (2, 105) can be established in the same manner. Specifically, threshold values in the block assigned serial number 2 are acquired. Then, in accordance with these threshold values, pixel locations for forming large dots, medium dots, and small dots are determined in that order, after which the dot arrangement, represented in the data format depicted in FIG. 42, is stored as dot data DD (2, 105) in the decoding table. By carrying out the above procedure for all combinations of multilevel halftoning result values and classification numbers, and storing the resultant data in the applicable locations, there can be set up a decoding table for reference during the dot on-off state determination process of the second embodiment.

The multilevel halftoning result value creation process (FIG. 37) and dot on-off state determination process (FIG. 41) carried out during the image printing process of the second embodiment have been described above. In the image printing process of the second embodiment, images of high picture quality can be printed by unit of forming dots of large, medium, and small type. In this way, since baseline picture quality in the second embodiment is improved over that in The first embodiment, the advantages of improved picture quality through determination of dot on-off state for pixel groups divided according to tone value distribution can be more effectively realized.

Typically, the process for determining dot on-off state becomes more complex the greater the number of types of dots that can be formed; additionally, the amount of data that must be supplied from the computer to the printer increases. Thus, even though high quality images can be obtained, inevitably print speed will tend to be slower. However, although the image printing process of the second embodiment has multilevel halftoning result value data length that is longer than in The first embodiment, i.e. increased from 4 bits to 8 bits, the process of creating multilevel halftoning result values per se differs only that reference is made to the multilevel halftoning table from the representative tone value and the classification number of the pixel group, so that multilevel halftoning result values can be output rapidly through an extremely simple process. Moreover, even though multilevel halftoning result values are 8-bit, when compared to the 16-bit values that would be necessary to represent large, medium and small dot on-off states on a pixel-by-pixel basis, the amount of data is less by half. Consequently, multilevel halftoning result values can be provided rapidly to the color printer 200 from the computer 100, enabling rapid output of high quality images.

Meanwhile, despite the fact that during determination of dot on-off states as well, the dot data DD of embodiment is 16-bit whereas the dot data DD of The first embodiment is 8-bit, since reference is made to the decoding table in either case, dot on-off states of each pixel in pixel groups can be determined rapidly. Thus, images can be output rapidly, without complicated processing and without a drop in processing speed, despite formation of multiple types of dots (large, medium, and small) so as to be able to output high quality images.

Additionally, because in the second embodiment, as in The first embodiment, both the multilevel halftoning valuation result value creation process and the dot on-off state determination process can be performed using simple processes, they can be performed at eminently practical speeds, even on devices that lack the sophisticated processing capabilities of a computer, for example.

In the image printing process of the second embodiment described above, as with the process in the second modification of the first embodiment described previously, images processing can be performed with pixel groups that are always divided. By doing so it is possible, for example, to employ as-is the multilevel halftoning result value table and decoding table for pixel groups that contain eight pixels, to essentially carry out processing of pixel groups with fewer pixels.

Additionally, on the assumption that pixel groups are always divided, by creating pixel groups that are larger in size than the actual processing units, it is possible to reduce the amount of data in the multilevel halftoning table, in the same way as in the second modification of the first embodiment described previously. For example, as shown in FIG. 38, the multilevel halftoning table of the second embodiment described above has established therein multilevel halftoning result values for each combination of 1024 pixel groups and 256 possible representative tone values, with each individual multilevel halftoning resultant value consisting of 8 bits, so the total amount of data in the multilevel halftoning table is 2 Mbit. In other words, where sets of eight pixels are grouped into pixel groups, 2 Mbit of memory capacity is required to store the multilevel halftoning table.

On the other hand, where sets of four pixels are grouped into pixel groups, the number of pixel groups increases to 2048. Because the range of values that can be assumed by the individual multilevel halftoning result values is 35, i.e. from 0 to 34, multilevel halftoning result values can be represented on 6 bits. That is, as compared to the case where pixel groups contain eight pixels, the number of pixel groups is double while the data length of individual multilevel halftoning result values increases by a factor 6/8, so the amount of data in the multilevel halftoning table increases by a factor of 1.5, i.e. to 3 Mbit.

Ultimately, whereas when pixels in sets of four are grouped into pixel groups, 3 Mbit is needed to store the multilevel halftoning table, where pixels in sets of eight are grouped into pixel groups, and pixel groups are treated as always being divided in two, 2 Mbit will suffice, and thus it is possible to reduce the memory capacity required to store the multilevel halftoning table.

E. Third Embodiment

In the first embodiment or the second embodiment discussed previously, the meaning of a multilevel halftoning result value can be interpreted in the same way regardless of the pixel group for which the result value is derived. For example, in The first embodiment, a multilevel halftoning result value of 3 represents formation of three dots within the pixel group, regardless of which pixel group the result value was derived for. In the second embodiment, a multilevel halftoning result value of 125 represents that large dots, medium dots, and small dots will be formed in certain numbers respectively within the pixel group, depending on the correspondence relationship depicted in FIG. 36. Where multilevel halftoning result values derived for different pixel groups have the same value in this way, their meaning can be interpreted in the same way. However, the specific meaning of multilevel halftoning result values can also be made to differ depending on the pixel group. By so doing it becomes possible to reduce the amount of data of the multilevel halftoning result values. In particular, when the multilevel halftoning result values can assume a large number of values such as 165 in the second embodiment, by reducing the amount of data of the multilevel halftoning result values, the multilevel halftoning result values can be supplied more quickly. The image printing process according to the third embodiment will be explained below. In the third embodiment as well, it is assumed that, as in the second embodiment described above, the color printer 200 is capable of forming three different types of dots, i.e. large, medium, and small.

E-1. Multilevel Halftoning Result Value Creation Process of Third Embodiment:

Although multilevel halftoning result value creation process of the third embodiment makes reference to a different multilevel halftoning table than does the multilevel halftoning result value creation process of the second embodiment described above, the flow of the process overall is essentially the same. In this way, even where process content is complex and sophisticated, in most instances the image printing process can be made to deal with such instances, simply by modifying can be the multilevel halftoning table, so that the actual process flow is simple. The following description of the multilevel halftoning result value creation process of the third embodiment makes reference to FIG. 37.

When the multilevel halftoning result value creation process of the third embodiment is initiated, pixel groups are formed by grouping together specific numbers of neighboring pixels (corresponds to Step S500), and classification numbers are determined for the groups of pixels (corresponds to Step S502). Next, decisions are made as to whether to divide pixel groups, based on the tone values of the individual pixels grouped into the pixel groups (corresponds to Step S504). Here, for convenience in description, it is assumed that the only division pattern is a pattern that divides the pixel group into equal regions on the left and the right. Of course, several types of division patterns may be prepared, and the appropriate pattern selected depending on the distribution of tone values. A scenario where multiple division patterns are used will be described later. When a decision is made to not divide a pixel group, after first determining a representative tone value for the pixel group in the same way as in the embodiments described above (corresponds to Step S506), reference then is made to the multilevel halftoning table to obtain a multilevel halftoning result value corresponding to the classification number and representative tone value of the pixel group.

FIG. 45 is an explanatory diagram illustrating the multilevel halftoning table referred to in the multilevel halftoning result value creation process of the third embodiment. As will be apparent from a comparison of this multilevel halftoning table with the multilevel halftoning table to which reference is made in the multilevel halftoning result value creation process of the second embodiment (see FIG. 38), the multilevel halftoning result values established in the multilevel halftoning table of the third embodiment are smaller values than the multilevel halftoning result values of the second embodiment. This is because whereas in the second embodiment multilevel halftoning result values can be interpreted the same regardless of pixel group, in the third embodiment, values are established in such a way that a multilevel halftoning result value can be interpreted only once the pixel group for which it is derived has been identified (more correctly, once the classification number of the pixel group has been identified).

Figure 46:
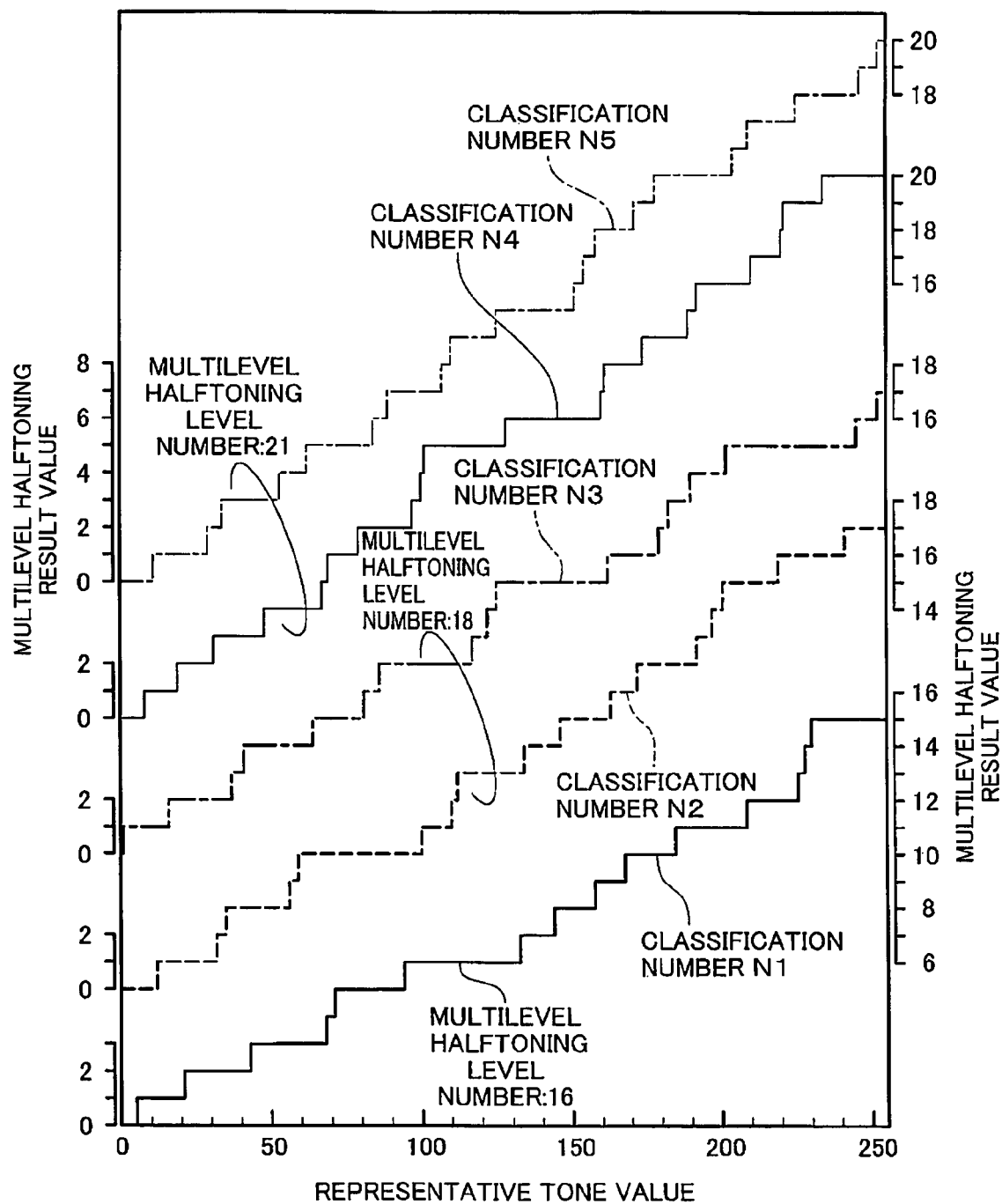
FIG. 46 is an explanatory diagram depicting exemplary correspondence relationships of multilevel halftoning result values and representative tone values established for each pixel group classification number in the multilevel halftoning table of the third embodiment.

FIG. 46 is an explanatory diagram depicting exemplary correspondence relationships of multilevel halftoning result values and representative tone values established for each pixel group classification number in the multilevel halftoning table of the third embodiment. In the drawing, multilevel halftoning result values established for representative tone values are represented using a graph with representative tone values plotted on the horizontal axis and multilevel halftoning result values plotted on the vertical axis. In the drawing, multilevel halftoning result values are shown for five pixel groups having different classification numbers N1-N5; in order to avoid the line plots of the pixel groups from overlapping and becoming difficult to distinguish from one another, the location of the origins of the multilevel halftoning result values are shown offset slightly in the vertical direction.

The line plot shown by the heavy solid line in FIG. 46 indicates the correspondence relationship between multilevel halftoning resultant values and representative tone values for the pixel groups of classification number N1. For pixel groups of classification number N1, a multilevel halftoning result value of 0 is established for representative tone values of 0 through 4. A multilevel halftoning result value of 1 is established for representative tone values of 5 through 20. Next, as the representative tone value increases to the range of 21 through 42, the multilevel halftoning resultant value increases to "2", and as the representative tone value increases to the range of 43 through 69, the multilevel halftoning resultant value increases to "3." In this way, multilevel halftoning resultant values increase in stepwise fashion with larger representative tone values, until ultimately the multilevel halftoning resultant value increases to "15." Similarly, for pixel groups of classification number N2 represented by the heavy dashed line in the figure, and for pixel groups of classification number N3 represented by the heavy dot-and-dash line, multilevel halftoning result values increase stepwise from 0 through 17 as the representative tone values increase from 0 to 255. Further, for pixel groups of classification number N4 represented by the thin solid line, and pixel groups of classification number N5 represented by the thin dot-and-dash line, multilevel halftoning result values increase stepwise from 0 through 20 as the representative tone values increase from 0 to 255. As a result, for pixel groups of classification number N1 for example, multilevel halftoning to any multilevel halftoning result value from 0 through 15 (16-level quantization) is carried out; for pixel groups of classification numbers N2 and N3, multilevel halftoning to any multilevel halftoning result value from 0 through 17 (18-level quantization); and for pixel groups of classification numbers N4 and N5, multilevel halftoning to any multilevel halftoning result value from 0 through 20 (21-level quantization).

In this way, in the multilevel halftoning result value creation process of the third embodiment, the number of levels for multilevel halftoning (the number of states that can be assumed as the result of multilevel halftoning) are not the same for all pixel groups; rather multilevel halftoning is performed with a particular number of levels depending on the classification number of the pixel group. As a result, the same given representative tone value, when subjected to multilevel halftoning, will give different result values for pixel groups with different classification numbers so that the number of multilevel halftoning levels differs.

Moreover, even where the number of levels for multilevel halftoning is the same, this does not mean that multilevel halftoning result values obtained will be the same. For example, as will be apparent by comparing pixel groups of classification number N2 and the pixel groups of classification number N3 shown in FIG. 46, though the each of the representative tone values for these groups of pixels has undergone 18-level quantization, in most cases the representative tone values replaced by the multilevel halftoning result values change will not be the same. Similarly, for pixel groups of classification number N4 and pixel groups of classification number N5, though each of the representative tone values for these pixel groups has undergone 21-level quantization, in most cases the representative tone values replaced by the multilevel halftoning result values change will not be the same. Thus, even though the number of multilevel halftoning levels of the pixel group is the same, if the classification numbers are different, different multilevel halftoning result values will be obtained.

In this way, the multilevel halftoning result values that are established in the multilevel halftoning table of the third embodiment shown in FIG. 45 have correspondence relationships between representative tone values and multilevel halftoning result values, that differ for each pixel group classification number.

In other words, the multilevel halftoning result values of the third embodiment are values that can be interpreted only after identifying the classification number of the pixel group which gives the result value in question. By making multilevel halftoning result values dependent on pixel group in this way, it becomes possible to reduce the number of values assumable by the multilevel halftoning result values. In the example shown in FIG. 46, there exist only 21 different possibilities, namely "0" through "20", for multilevel halftoning result values, even for pixel groups of classification number N4 and pixel groups of classification number N5, which have the greatest number of multilevel halftoning result values. In actual practice, the number of possible values that multilevel halftoning result values can assume will not exceed 30, even when estimating on the high end, with 30 possibilities, these can be amply represented on 5 bits. As compared with the 8 bits required for representing multilevel halftoning result values in the second embodiment, this represents a 5/8 reduction in the amount of data of multilevel halftoning result values. The method for setting up the multilevel halftoning table in the third embodiment depicted in FIG. 45 will be discussed later.

In the multilevel halftoning result value creation process of the third embodiment, for a pixel group that it is decided not to divide, after obtaining a multilevel halftoning result value by referring to the multilevel halftoning table shown in FIG. 45 (corresponds to Step S508 in FIG. 37), the multilevel halftoning result value so obtained is stored (corresponds to Step S510).

On the other hand, in the multilevel halftoning result value creation process of the third embodiment, for a pixel group that it is decided to divide, after a representative tone value has been determined for each of the regions generated through division of the pixel group (corresponds to Step S512), reference is made to the multilevel halftoning table based on the classification number of the pixel group and on the respective representative tone values, to derive a multilevel halftoning result value for each of the regions (corresponds to Step S514). That is, multilevel halftoning result values are created in a number equal to the number of regions produced through division of the pixel group. Next, an ESC code that indicates the division pattern is stored, followed by the multilevel halftoning result values generated for the regions (corresponds to Steps S516 and S518).

Figures 47, 48:
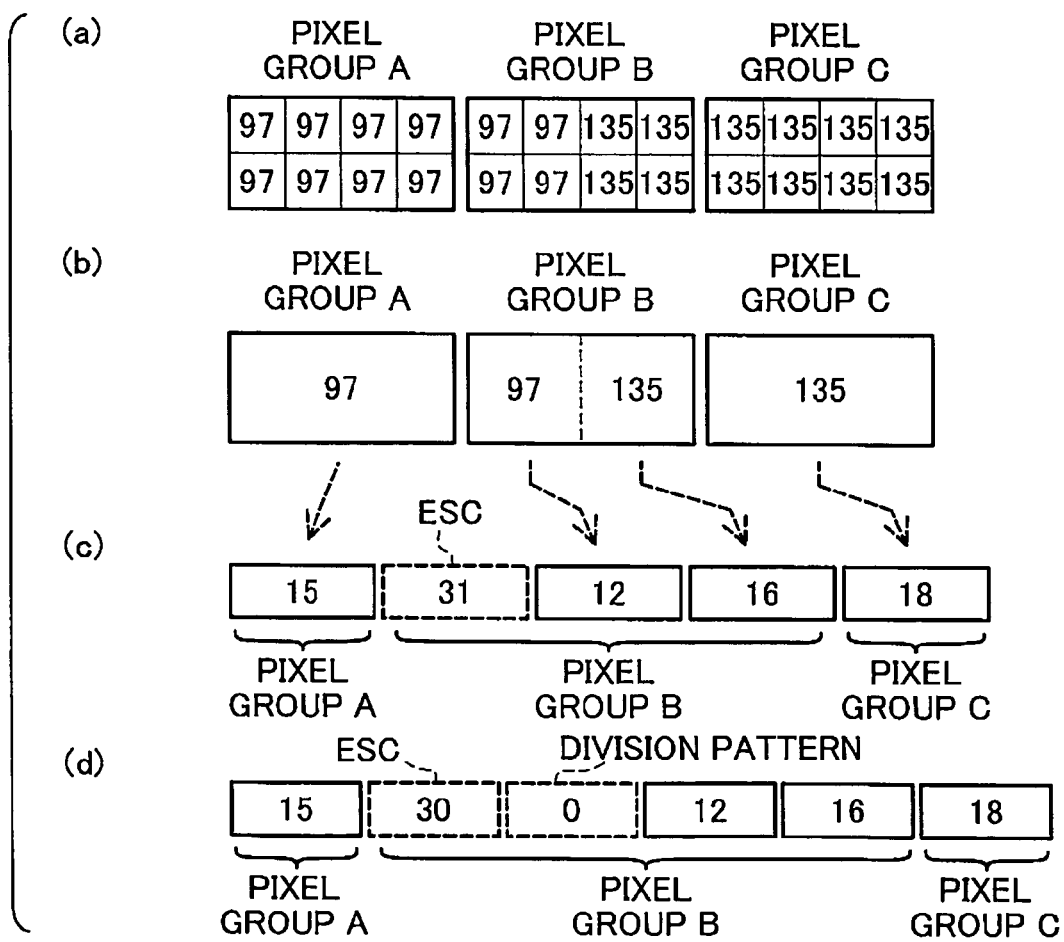
FIG. 47 depicts association of a division pattern with multilevel halftoning result values, represented on 5-bit data.
FIG. 48 is an explanatory diagram depicting conversion of image data making up pixel groups, into multilevel halftoning result values by unit of the multilevel halftoning result value creation process of the third embodiment.

FIG. 47 depicts association of a division pattern with multilevel halftoning result values, represented on 5-bit data. As noted previously, in the third embodiment, multilevel halftoning result values are values established uniquely for each pixel group classification number, and thus even estimating on the high end, there will be at most 30 possible multilevel halftoning result values for each classification number, allowing for representation on 5 bits. Accordingly, data representing "31", which is not used as a multilevel halftoning resultant value, is assigned to the ESC code. Here, since there is only a single division pattern for pixel groups, a single ESC code can be used both to indicate that a pixel group is divided, and at the same time to indicate the division pattern.

Once the multilevel halftoning result value(s) for a pixel group have been stored in memory in the manner described above, it is decided whether processing has been completed for all of the pixels of the image data (corresponds to Step S520), and if any unprocessed pixels remain, a new pixel group is generated, after which the series of processes is repeated. Once this operation has been repeated until processing has been completed for all of the pixels, there are then output to the color printer 200 either multilevel halftoning result values alone (for undivided pixel groups), or multilevel halftoning result values together with an ESC code indication the division pattern (for divided pixel groups) (corresponds to Step S522), whereupon the multilevel halftoning result value creation process of the third embodiment terminates.

FIG. 48 is an explanatory diagram depicting conversion of image data making up pixel groups, into multilevel halftoning result values by unit of the multilevel halftoning result value creation process of the third embodiment. In FIG. 48, (a) depicts pixels grouped into pixel groups in sets of eight. In Pixel Group A, all pixels have tone values of "97." For Pixel Group B, pixels in the left half region have tone values of "97", whereas pixels in the right half region have tone values of "135." For the neighboring Pixel Group C, all pixels have tone values of "135." (b) in FIG. 48 depicts representative tone values determined for these pixel groups. A representative tone value of 97 has been derived for Pixel Group A. Pixel Group B has been divided left to right into two regions, with a representative tone value of 97 derived for the left region and a representative tone value of 135 for the right region. A representative tone value of 135 has been derived for Pixel Group C.

(c) in FIG. 48 depicts these representative tone values converted to multilevel halftoning result values, and the multilevel halftoning result values derived thereby stored in memory. The lead value "15" is the multilevel halftoning result value for Pixel Group A. The next value "31" is an ESC code indicating that Pixel Group B following Pixel Group A is divided. Here, since there is only one pixel group division pattern, namely a pattern of division into equal left and right regions, when a pixel group is indicated as being divided, simply by this fact the division pattern is indicated at the same time. The two values following the ESC code "31" represent respectively the multilevel halftoning result value for the left region and the multilevel halftoning result value for the right region. For Pixel Group B, ultimately, three items of data including the ESC code will be indicated. While Pixel Group A and the left region of Pixel Group B identical representative tone values, since the classification numbers of the pixel groups differ, the multilevel halftoning result values derived for them will assume different values.

The multilevel halftoning result value for Pixel Group C is stored following the three values indicating the multilevel halftoning result values for Pixel Group B. Since this value "18" is not an ESC code, Pixel Group C is not considered to be divided. Accordingly, it is simply determined that the multilevel halftoning result value of this pixel group is "18"; the next value indicates the multilevel halftoning result value for Pixel Group D. In the multilevel halftoning result value creation process of the third embodiment, multilevel halftoning result values are created in this way for output to the color printer.

In the preceding description, preparation of only a single division pattern for pixel groups was described; however, it would be possible to prepare a greater number of division patterns. For example, whereas in the description above, the value "31", which is not included among the multilevel halftoning result values, is employed as the ESC code, the value "30" is also an unused value, as shown in FIG. 47. Accordingly, the value "30" could be assigned to an ESC code indicating a second division pattern. For example, the ESC code "30" may be used to indicate a pattern wherein the pixel group is split top to bottom into two equal regions, and where a pixel group has been split top to bottom into two equal regions, the multilevel halftoning result values for the respective regions may be stored following the ESC code "30."

Where an even greater number of splitting patterns are provided, the following is possible. For example, whereas in the preceding description multilevel halftoning result values consist of 5-bit data as shown in FIG. 47, these may be increased by one bit to form 6-bit data. Because 6-bit data enables representation of values from 0 through 63, values from 30 through 63 can be assigned to different division patterns.

Alternatively, division patterns may be expressed through combinations of multiple ESC codes, in the following manner. For example, because the pixel groups in this embodiment are pixel groups that are longer in the horizontal direction, being composed four pixels in the primary scan direction (the horizontal direction in the drawing) and two pixels in the secondary scan direction (the vertical direction in the drawing), when a pixel group is divided, it is contemplated that the most common case will be division into two regions left and right.

Accordingly, of the two ESC codes "30" and "31", one of these codes (for example, "31") can be assigned to the division pattern expected to be encountered most often. The other division pattern may then be represented by a combination of the other ESC code (for example "30") with new 5-bit data. In other words, as depicted in the example of (d) in FIG. 48, where the lead data for the pixel group B is "30", this will be considered to indicate that the pixel group has been divided in a pattern other than division in two left and right, with the specific division pattern being indicated by the data following ("0" in the example shown in the drawing). Of course, if the lead data for the pixel group B is "31", it will be decided that the pixel group is split into two equal regions left and right, with the two multilevel halftoning result values following being interpreted as the multilevel halftoning result values derived respectively for the left region and right region. By so doing it is possible to hold down the extent of increase in the overall amount of data entailed in increasing the number of division patterns, while allowing the selective use of a greater number of division patterns.

E-2. Dot On-Off State Determination Process of Embodiment 3:

As described above, in the multilevel halftoning result value creation process of Embodiment 3, in order to reduce the amount of data for multilevel halftoning result values, multilevel halftoning result values that are unique to each pixel group classification number are created and output to the color printer 200. That is, the meaning of a multilevel halftoning result value can only be interpreted after identifying the pixel group classification number. Consequently, when this type of multilevel halftoning resultant value is received by the color printer 200 of the third embodiment, a process to determine the dot on-off state for each pixel in pixel groups is carried out by unit of a dot on-off state determination process such as the following.

The dot on-off state determination process of the third embodiment is essentially the same as the process in the second embodiment described previously, except that a different decoding table is referred to. Accordingly, the dot on-off state determination process of the third embodiment will be described making reference to the flowchart of FIG. 41 depicting the dot on-off state determination process of the second embodiment.

When the dot on-off state determination process of the third embodiment is initiated, one pixel group is selected for processing, and after acquiring the classification number of the pixel group, the lead data supplied as the multilevel halftoning result value is acquired (corresponds to Steps S600, S602, S04). Next, it is decided whether the acquired data is an ESC code (corresponds to Step S606). In the event that the read data is not an ESC code, the decision is made that the pixel group is undivided, and the data is interpreted as a multilevel halftoning resultant value; then, by referring to the decoding table, the dot on-off state is determined for each pixel of the pixel group (corresponds to Steps S608, S610). The decoding table referred to at this time is a dedicated table which has been especially set up, for reference in the dot on-off state determination process of the third embodiment. The method for setting up this decoding table will be described later.

If on the other hand the read data is an ESC code, it is decided that the pixel group is divided. Accordingly, a specific number of multilevel halftoning result values stored following the ESC code are read in (corresponds to Step S612). Next, by referring to the decoding table, the dot data DD corresponding to the respective multilevel halftoning result values is read out, and these items of dot data are combined to determine the dot on-off state of each pixel in the pixel group (corresponds to Step S614, S616).

The dot on-off state of each pixel in the selected pixel group can be determined in the above manner. This kind of process is carried out for all pixel groups, and when it is decided that the process has been performed for all pixel groups, (corresponds to Step S618: yes), the dot on-off state determination process of the third embodiment terminates.

The multilevel halftoning result value creation process and dot on-off state determination process carried out in the image printing process of the third embodiment have been described above. As noted previously, in the third embodiment, in contrast to the second embodiment, multilevel halftoning result values are values that can be interpreted only after identifying the classification number of the pixel group for which the result value has been derived. Thus, the amount of data of the multilevel halftoning result values can be reduced, affording the advantage that faster image output is accordingly possible. Notwithstanding such advantages. the image printing process of the third embodiment involves simple processes essentially the same as those of the second embodiment, except that a different multilevel halftoning table and decoding table are referred to. Thus, multilevel halftoning result values can be created and supplied faster, so that images can be output faster. Additionally, since pixel groups are divided depending on the tone value distribution in a pixel group, the dot on-off state of each pixel in pixel groups can be determined appropriately, and hence images of high picture quality can be output. Further, the amount of data of the multilevel halftoning result values of the third embodiment is less than in the second embodiment, making possible even faster image output.

Finally, the discussion turns to the methods for setting up the multilevel halftoning table and decoding table referred to in the image printing process of the third embodiment.

E-3. Multilevel Halftoning Table Setup Process of Third Embodiment:

Hereinbelow, the method for setting up the multilevel halftoning table of the third embodiment will be described first, followed by a description of the method for setting up the decoding table of the third embodiment.

The multilevel halftoning table of the third embodiment is set up on the basis of the method disclosed in Japanese Patent No. 3292104 described previously with reference to FIG. 31 through FIG. 34, namely, a method using an advanced dither method so as to enable determination of dot on-off states of different dot types differing in size.

In the multilevel halftoning result value creation process described previously, by using a representative tone value to represent image data of pixels included in a pixel group, the pixel group as a whole is subjected to multilevel halftoning. Accordingly, when setting up the multilevel halftoning table of the third embodiment, first, on the assumption that all pixels in the pixel group have image data of the same value as the representative tone value, the dot on-off state for each type of dot, i.e. large, medium, or small, is determined for each pixel. Determinations of on-off state for each dot type are made according to the halftone process described previously with reference to FIG. 32.

Figure 49:
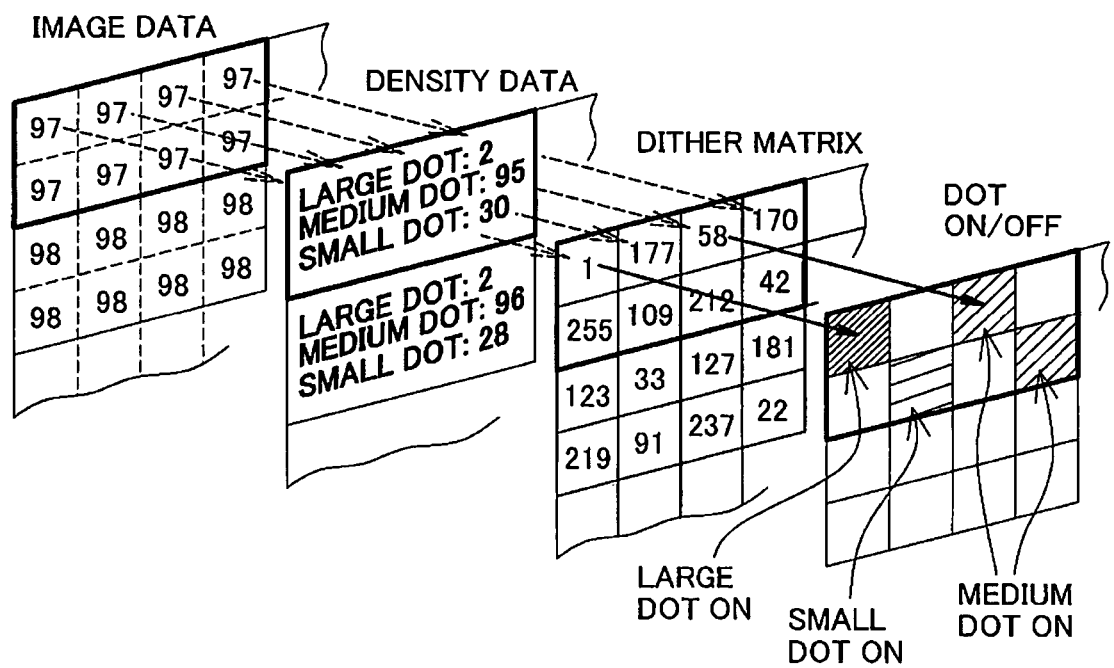
FIG. 49 is an explanatory diagram depicting conceptually determination of large, medium, and small dot on-off states for each pixel in a pixel group.

FIG. 49 is an explanatory diagram depicting conceptually determination of large, medium, and small dot on-off states for each pixel in a pixel group. In the drawing, the pixel group that is targeted for the half tone process is shown bordered by the heavy solid line. The pixel group is composed of eight individual pixels, and the image data of each individual pixel has the same value as the representative tone value (in the illustrated example, the tone value is 97). In order to determine dot on-off states for large, medium, or small dots, the image data is converted into density data for each type of dot. The conversion into density data is performed by referring to the dot density conversion table, described previously with FIG. 33. Here, since all of the pixels within the pixel group have the same image data, the density data for each dot type will also be identical for each individual pixel. In the illustrated example, there is shown a case where the tone value of the large dot density data is "2", the tone value of the medium dot density data is "95", and the tone value of the small dot density data for is "30."

Next, as was described previously using FIG. 32, the large dot density data, the medium dot intermediate data, or the small dot intermediate data is compared to the threshold values established in the dither matrix, to determine the dot on-off state of each dot type for each pixel. Here the dither matrix threshold values used for the comparison are threshold values that have been established in the dithering matrix, at locations that corresponding to the pixel group being processed. In the example shown in FIG. 49 for example, since the pixel group is situated in the upper left corner of the image, and so, for the threshold values as well, threshold values established for the pixel group in the upper left corner of the dither matrix are used.

For pixels which, of the eight threshold values established for the pixel group, have threshold values smaller than the large dot density data, the decision is made to form a large dot. Here, since the density data has a tone value of "2", the only pixel for which a large dot will be formed is the pixel with the threshold value of "1." In FIG. 49, the pixel on which it is decided to form a large dot is indicated by fine hatching. For pixels whose threshold value is greater than the large dot density data "2" and smaller than the medium dot intermediate data "97" derived by adding the large dot density data and the medium dot density, it is decided to form a medium dot. There are only two such pixels, namely, the pixel whose threshold value is "42" and the pixel whose threshold value is "58." In FIG. 49, the pixels on which it is decided to form medium dots are indicated by medium hatching. Finally, for pixels whose threshold value is greater than the medium dot intermediate data "97" and smaller than the small dot intermediate data "127" derived by adding the medium dot intermediate to the small dot density, the decision is made to form a small dot. There is only one such pixel, namely, the pixel whose threshold value is "109."In FIG. 49, the pixel on which it is decided to form a small dot is indicated by large hatching. In this way, as a result of determination of dot on-off states for large, medium, and small dots, where the representative tone value of the selected pixel group is "97", one large dot, two medium dots, and one small dot will be formed.

Where representative tone value differ appreciably, the numbers of large, medium, and small dots formed within a pixel group will differ as well. Where representative tone values vary between "0" and "255", numbers of large, medium, and small dots should change in several steps. Further, where pixel group classification numbers differ, the dither matrix threshold values will differ as well, and thus the manner of change in the numbers of dots should differ as well. The multilevel halftoning table of the third embodiment depicted in FIG. 45 has been set up by examining, on a per-classification number basis, the stepwise change behavior in the number of each dot type.

Figure 50:
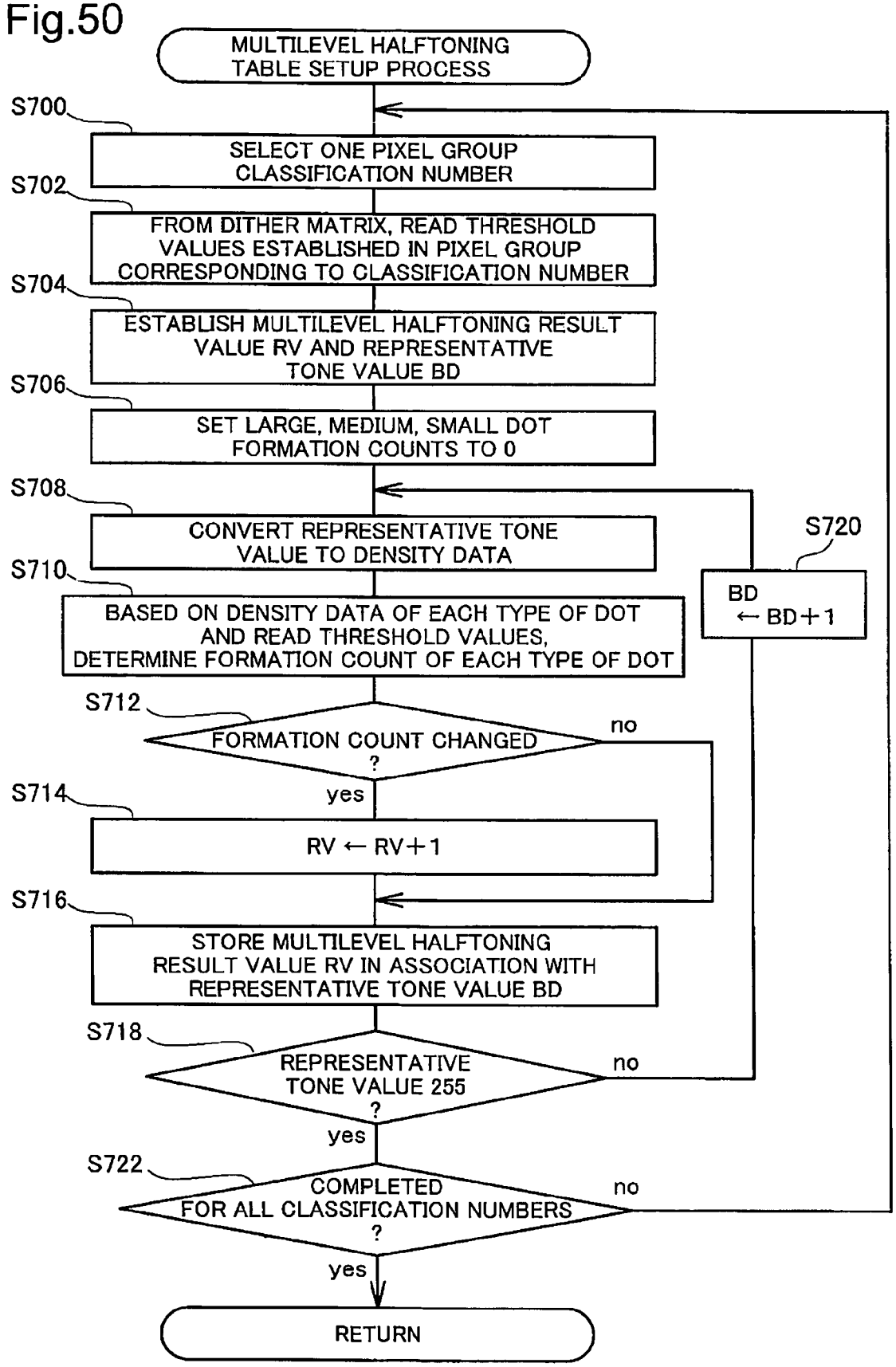
FIG. 50 is a flowchart depicting the flow of the process for setting up the multilevel halftoning table referred to in the multilevel halftoning result value creation process of the third embodiment.

FIG. 50 is a flowchart depicting the flow of the process for setting up the multilevel halftoning table referred to in the multilevel halftoning result value creation process of the third embodiment. The following description refers to the flowchart. When the multilevel halftoning table setup process is initiated, first, one pixel group classification number is selected (Step S800). For example, here, classification number 1 is selected.

Next, the threshold values corresponding to the selected pixel group classification number are read out from the dither matrix (Step S802). For example, here, since classification number 1 has been selected, the eight threshold values established at the block location labeled as #1 in FIG. 13b are selected from the exemplary dither matrix shown in FIG. 6.

Then, the multilevel halftoning result value RV and the representative tone value BD are set to "0" (Step S804), and the large, medium, and small dot counts are each set to "0" (Step S806).

Next, after converting the representative tone values to density data for large dots, medium dots, and small dots by referring to the dot density conversion table shown in FIG. 33 (Step S808), the large, medium, and small dot formation counts are determined on the basis of the density data and the threshold values read previously (Step S810). Specifically, as described with reference to FIG. 32 or FIG. 34, the number of threshold values that are smaller than the large dot density value is calculated, and the number so obtained is designated as the large dot formation count. Also, the number of threshold values that are greater than the large dot density data and smaller than the medium dot intermediate data is calculated, and this number is designated as the medium dot formation count. Finally, the number of threshold values that are greater than the medium dot intermediate data and smaller than the small dot intermediate data is calculated, and this number is designated as small dot formation count.

A decision is then made as to whether the dot formation counts for each dot type calculated in this way have changed relative to the formation counts established previously (Step S812). If it is decided that a formation count has changed (Step S812: yes), the multilevel halftoning resultant value RV is increased by "1" (Step S814), and the multilevel halftoning resultant value RV derived thusly is stored is memory, in association with the representative tone value BD (Step S816). IF on the other hand it is decided that there is no change in the dot formation counts (Step S812: no), the multilevel halftoning resultant value RV does not increase, and the existing value is stored in association with the representative tone value BD (Step 816).

Once a multilevel halftoning resultant value corresponding to a specific representative tone value has been stored in the above manner, a decision is made as to whether the representative tone value BD has reached a tone value of 255 (Step S818). If the tone value of 255 has not been reached (Step S818: no), the representative tone value BD is increased by "1" (Step S820), and the process returns to Step S808, whereupon once again the representative tone value BD is converted to density data, the subsequent series of processes is performed, and the multilevel halftoning resultant value RV is stored in association with a new representative tone value BD (Step S816). This operation is repeated until the representative tone value BD reaches the tone value 255. Once the representative tone value BD has reached the tone value 255 (Step S816: yes), all of the multilevel halftoning result values will have been established for the selected group number.

At this point, the decision is made as to whether the process such as that described above has been carried out for all classification numbers (Step S822); if there are any remaining unprocessed classification numbers (Step S822: no), the process returns to Step S800, and the process described above is performed again. Once the process has been repeated and it is now determined that all multilevel halftoning result values have been established for all of the classification numbers (Step S822: yes), the process of setting up the multilevel halftoning table shown in FIG. 50 is complete.

As will be apparent from the preceding description, multilevel halftoning result values are determined from density data for large, medium, and small dots obtained by converting the representative tone values; and threshold values stored in a dither matrix at locations corresponding to the pixel group.

Here, since the dot density conversion table shown in FIG. 33 is referenced is the same even if the pixel group classification numbers are different, density data for each dot with respect to representative tone values will be the same regardless of the classification number. However, the set of threshold values read out from the dither matrix will differ by classification number. The reason is that the dither matrix is set up so as to distribute threshold values as widely and as randomly as possible, in order to avoid adverse effects on picture quality that can occur due to dots occurring in a specific pattern in the image, or dots occurring clustered together at proximate locations. Thus, where a plurality of threshold values contained in a pixel group is viewed as a set, the probability of having an exactly identical combination is considered to be extremely low. For this reason, the multilevel halftoning table referred to in the multilevel halftoning result value creation process of the third embodiment will have representative tone value-to-multilevel halftoning result value correspondence relationships that differ on a per-classification number basis, and the frequency of change of multilevel halftoning result values (the number of multilevel halftoning steps shown in FIG. 46) will also vary depending on classification number.

Figure 51:
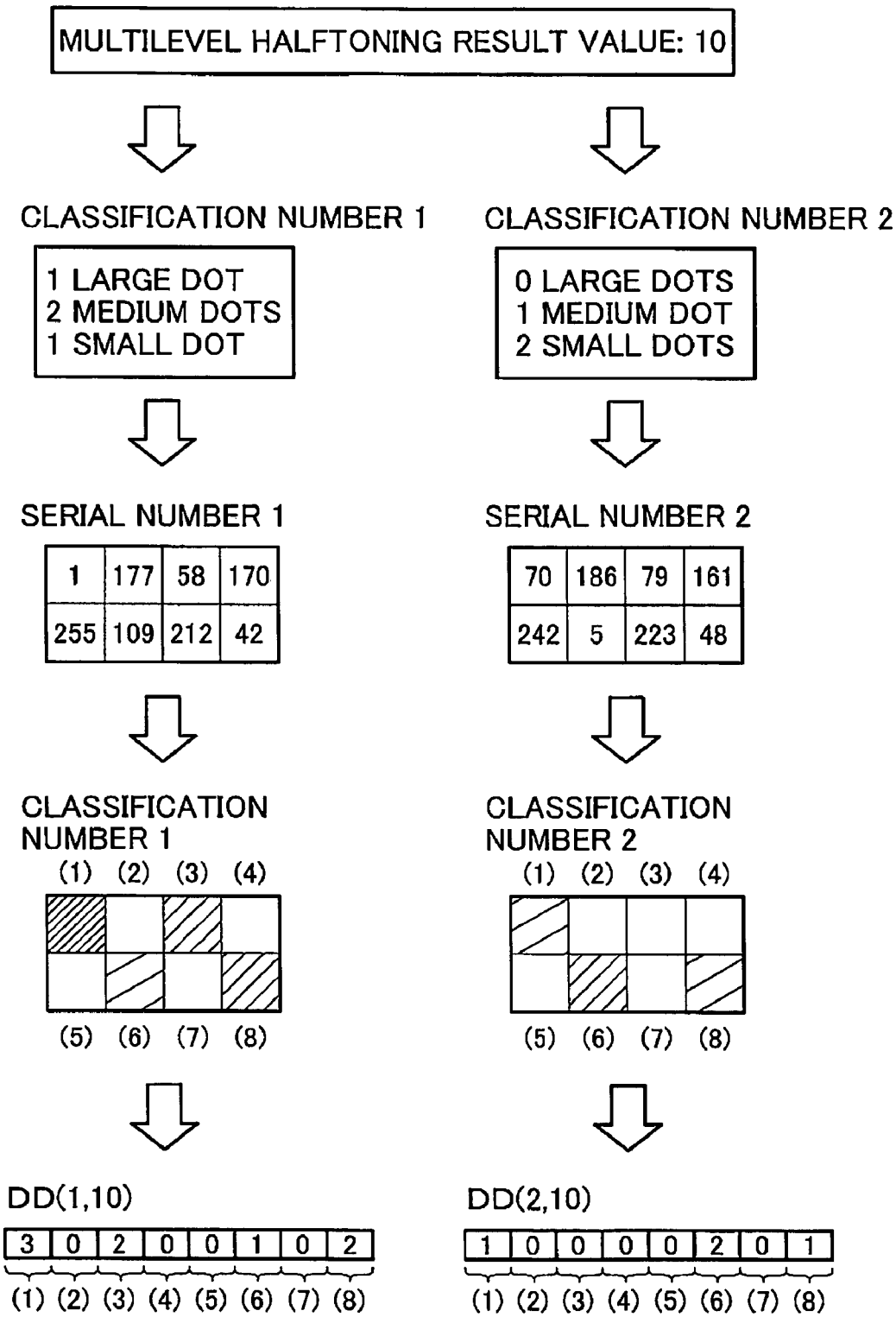
FIG. 51 is an explanatory diagram depicting setting up of the decoding table of the third embodiment.

The description now turns to a brief explanation of the method for setting up the decoding table of the third embodiment. FIG. 51 is an explanatory diagram depicting setting up of the decoding table of the third embodiment. The method for setting up of the decoding table of the third embodiment is essentially the same as the method for setting up of the decoding table of the second embodiment described previously with reference to FIG. 44. However, there is a significant difference in that since the multilevel halftoning result values of the third embodiment are interpretable only when the classification number of the pixel group is identified, multilevel halftoning result values are converted on a per-pixel group basis to data representing dot counts of large, medium, and small dots. The following description makes reference to FIG. 51.

In FIG. 51, assuming a multilevel halftoning result value of "10", there is depicted a method of determining dot data DD (1, 10), DD (2, 10) for a pixel group of classification number 1 and a pixel group of classification number 2, respectively. First, one multilevel halftoning result value is selected, and this multilevel halftoning result value is converted on an individual pixel group basis into dot counts of large, medium, and small dots. Specifically, since in the third embodiment the multilevel halftoning result value differs in significance for each pixel group classification number, multilevel halftoning result values are interpreted on an individual classification number basis. In the second row from the top in FIG. 51 are shown the results of interpreting multilevel halftoning result value content on an individual classification number basis.

Next, threshold values established in the blocks corresponding to each classification number are read out from the dither matrix. The third row from the top in FIG. 51 shows these read out threshold values of each block. In accordance with these threshold values, the pixel locations for forming dots are determined for large dots, medium dots, and small dots, in that order. The fourth row from the top in FIG. 51 depicts determinations of pixel locations for forming dots in each pixel group. In the drawing, a large dot is formed on the finely hatched pixel, medium dots are formed on the pixels shown with medium hatching, and small dots are formed on the pixels shown with large hatching; pixels with no hatching whatsoever represent that no dot is formed. Once dot on-off states for each pixel in a pixel group have been determined in this way, this dot arrangement is represented by dot data of the data format illustrated in FIG. 42. The dot data DD derived in this manner is stored at locations corresponding to combinations of multilevel halftoning result values and classification numbers. By carrying out above operation has been carried out for combinations of all multilevel halftoning result values and all classification numbers, and storing the dot data derived thereby in the relevant locations, the decoding table of the third embodiment can be set up.

E-4. Modification of Third Embodiment:

In the multilevel halftoning result value creation process of the third embodiment, reference is made to a multilevel halftoning table storing corresponding multilevel halftoning result values, for each representative tone value from a tone value of 0 through a tone value of 255. However, since multilevel halftoning result values simply increase in a stepwise manner in accordance with increasing representative tone values, multilevel halftoning result values for representative tone values can be calculated simply by storing the representative tone values which the multilevel halftoning result values replace. Such modification of the third embodiment will be described below.

FIG. 52 is an explanatory diagram depicting conceptually the threshold value table referred to in the multilevel halftoning result value creation process of the modification of the third embodiment. As illustrated, threshold values corresponding to multilevel halftoning result values are established, on an individual classification number basis, in the threshold value table. This threshold value represents the largest representative tone value that gives a particular multilevel halftoning result value, when the representative tone value is increased from 0 to 255. A pixel group of classification number 1 shall be described by way of an example. For classification number 1, a threshold value of "2" is established for the multilevel halftoning result value "0." This represents the fact that, for a pixel group of classification number 1, a representative tone value within the range of "0" through "2" gives a multilevel halftoning result value of "0." A threshold value of "15" is established for the multilevel halftoning result value "1." This represents the fact that, for a pixel group of classification number 1, a representative tone value within the range of "3" through "15" gives a multilevel halftoning result value of "1." Analogously, a threshold value of "243" is established for the multilevel halftoning result value "14", and a threshold value of "255" is established for the multilevel halftoning result value "15." This represents the fact that a representative tone value within the range of "244" through "255" gives a multilevel halftoning result value of "15", and that for a pixel group of classification number 1, the maximum value for the multilevel halftoning result value is "15."

In FIG. 52, threshold values for each individual classification number are established in correspondence with the respective multilevel halftoning result values. However, instead, mere sets of threshold values could be stored for individual classification numbers, without being specifically associated with multilevel halftoning result values. In this case, multilevel halftoning result values can be derived by counting the number of threshold values that are smaller than the representative tone value. For example, let it be assumed that the representative tone value is "20." Within the set of values established for classification number 1, there are three threshold values namely "20" are "2", "15", and "18", that are smaller than the tone value. From this fact it can be derived that the multilevel halftoning result value for the representative tone value 20 is "3."

In the multilevel halftoning result value creation process of the modification of the third embodiment discussed above, once the representative tone value and the classification number for a pixel group have been derived, a multilevel halftoning result value is created by unit of referring to the threshold value table depicted by way of example in FIG. 52. The threshold table can be stored with a smaller amount data than the multilevel halftoning table referred to in the multilevel halftoning result value creation process of the third embodiment described previously (see FIG. 45). Thus, the multilevel halftoning result value creation process of the alternative embodiment uses less memory than the process of the third embodiment. In contrast, the multilevel halftoning result value creation process of the third embodiment described previously can derive multilevel halftoning result values immediately, simply by referring to the multilevel halftoning table using the classification number and the representative tone value. That is, multilevel halftoning can be performed quickly, since there is no need to compare the representative tone value to the threshold values as in the process in the alternative embodiment.

In the image printing process of the third embodiment described above, image processing can be performed analogously to the process of Alternative the second embodiment of The first embodiment discussed previously, i.e., by performing image processing on the assumption that pixel groups are always divided. By so doing, the multilevel halftoning table and decoding table for pixel groups containing eight pixels, for example, can be used as-is for processing of pixel groups containing fewer pixels. Additionally, by assuming that pixel groups are always divided and creating pixel groups that are larger than the actual units for processing, it becomes possible to reduce the amount of data contained in the multilevel halftoning table, in the same way as in the second embodiment of The first embodiment discussed previously. For example, there shall be described a case of a process in which a single pixel group is divided into two, rather than creating a pixel group of half the size. In this case, the number of pixel groups included in the multilevel halftoning table will be reduced by half. On the other hand, for individual multilevel halftoning result values, data length will increase in size larger pixel group size. To explain in line with the third embodiment discussed previously, where the number of pixels included pixel groups is 4, individual multilevel halftoning result values are represented on four bits, but if the number of pixels included in pixel groups is increased to eight, multilevel halftoning result values will consist of 5-bit data. However, the extent of decrease in the number of pixel groups is greater than the extent of increase in the data length of the multilevel halftoning resultant values. Ultimately, by always dividing larger pixel groups in two for processing, rather than creating smaller pixel groups in the first place, it is possible to reduce to 5/8 the memory capacity needed to store the multilevel halftoning table.

While the invention has been shown hereinabove through certain preferred embodiments, it is no wise limited to the embodiments set forth herein, and may be reduced to practice in various other forms without departing from the spirit thereof.

For example, whereas the previous embodiments describe the case of printing images by forming dots on printer paper, the scope of application of the invention is not limited to printing of images. For example, the invention may be applied appropriately to liquid crystal display devices, for example, one that displays images by continuously varying tone values by unit of distributing luminescent spots over a liquid crystal display screen at an appropriate density.

What is claimed is:

1. An image processing system for performing certain image processing on image data and based on the results of said image processing, outputting dot data for forming dots on a recording medium, the image processing system comprising:

encoding preparation unit that prepares in advance multiple classes of encoding correspondence relationships for the purpose of acquiring code values associated with the results of multilevel halftoning for the pixels making up said pixel groups, on the basis of representative tone values which are tone values representing pixel groups composed of multiple pixels;

representative tone value determining unit that divides into multiple regions, each of which comprises multiple pixels, said pixel groups which have been extracted sequentially from said image, and determines for each region a representative tone value representing the tone value of said region;

encoding unit that, using said determined representative tone value for each region, derives a code value for each said region by unit of referring to said encoding correspondence relationship assigned to said pixel group to which said region belongs, said correspondence relationship being any one of said multiple classes;

decoding preparation unit that prepares in advance multiple classes of decoding correspondence relationships for the purpose of acquiring, from code values assuming a certain range of values, an output dot arrangement representing the dot on-off state for each pixel within said pixel group;

decoding unit that, for each pixel group, receives said code value acquired for each region belonging to said pixel group, and that on the basis of said received code value, refers to said decoding correspondence relationship corresponding to said encoding correspondence relationship assigned to said pixel group to which said region belongs, and acquires said output dot arrangement;

output unit for outputting said acquired output dot arrangement as dot data;

dot forming unit that forms dots on a medium on which said image can be formed; and image forming unit that receives said output dot data and actuates said dot forming unit in accordance with said dot data, to form said image on said medium, wherein said encoding correspondence relationship is defined as a threshold value group consisting of threshold values in a number corresponding to the number of pixels included in said pixel group, wherein said plurality of encoding correspondence relationships has been prepared by assembling said threshold value group from a plurality of threshold values selected from a dither matrix wherein threshold values of different values are arranged according to a predetermined characteristic, said selection being made while sequentially changing the extraction location, and wherein said dither matrix is a global dither matrix containing threshold values in a greater number than the tone number of said image.

2. An image processing device for creating control data for use by an image output device that forms dots to output image, for the purpose of determining on-off states of said dots, and for outputting said control data to said output device, comprising:

encoding preparation unit that, on the basis of representative tone values which are tone values representing pixel groups composed of multiple pixels, prepares in advance multiple classes of encoding correspondence relationships for the purpose of acquiring code values associated with the results of multilevel halftoning for the pixels making up said pixel groups;

representative tone value determining unit that divides said pixel groups extracted sequentially from said image into multiple regions, and determines for each region a representative tone value representing the tone value of said region;

encoding unit that, using said determined representative tone value for each region, derives a code value for each said region by unit of referring to said encoding correspondence relationship assigned to said pixel group to which said region belongs, wherein said correspondence relationship is any one from among said multiple classes; and control data output unit for outputting said acquired code value as said control data to said image output device, wherein said encoding preparation unit comprises:

classification number assigning unit for assigning a classification number to each said individual pixel group, by classifying said pixel groups into a plurality of classes depending their on location in said image; and unit for storing said representative tone values and said code values on a classification number-by-number basis, as said encoding correspondence relationships, wherein said encoding unit, using said classification numbers and said representative tone values identified by the locations of said pixel groups in said image, refers to said encoding correspondence relationships, wherein said encoding correspondence relationship is defined as a threshold value group consisting of threshold values in a number corresponding to the number of pixels included in said pixel group, wherein said plurality of encoding correspondence relationships has been prepared by assembling said threshold value group from a plurality of threshold values selected from a dither matrix wherein threshold values of different values are arranged according to a predetermined characteristic, said selection being made while sequentially changing the extraction location, and wherein said dither matrix is a global dither matrix containing threshold values in a greater number than the tone number of said image.

* * * * *